US008291832B2

(12) United States Patent
Fisher

(10) Patent No.: US 8,291,832 B2
(45) Date of Patent: *Oct. 23, 2012

(54) ADJUSTABLE PORTABLE TABLE APPARATUS

(76) Inventor: Scott E. Fisher, Tucson, AZ (US)

( * ) Notice: Subject to any disclaimer, the term of this patent is extended or adjusted under 35 U.S.C. 154(b) by 152 days.

This patent is subject to a terminal disclaimer.

(21) Appl. No.: 12/832,841

(22) Filed: Jul. 8, 2010

(65) Prior Publication Data

US 2011/0083587 A1 Apr. 14, 2011

Related U.S. Application Data

(63) Continuation-in-part of application No. 11/046,612, filed on Jan. 27, 2005, now Pat. No. 7,757,613.

(51) Int. Cl.
*A47B 23/00* (2006.01)

(52) U.S. Cl. ........................................................ 108/44

(58) Field of Classification Search .................. 108/44, 108/45, 43, 150, 50.12; 224/521, 400, 519, 224/518, 404, 524, 527, 314; 135/16; 296/26.09, 296/26.08
See application file for complete search history.

(56) References Cited

U.S. PATENT DOCUMENTS

| | | | | | |
|---|---|---|---|---|---|
| 5,460,304 | A | * | 10/1995 | Porter et al. | 224/521 |
| 5,470,131 | A | * | 11/1995 | Nolan et al. | 299/41.1 |
| 5,518,159 | A | * | 5/1996 | DeGuevara | 224/488 |
| 5,752,639 | A | * | 5/1998 | Rice | 224/521 |
| 5,820,004 | A | * | 10/1998 | Lane | 224/521 |
| 5,833,295 | A | * | 11/1998 | Farlow, Jr. | 296/22 |
| 5,857,741 | A | * | 1/1999 | Anderson | 108/44 |
| 5,938,092 | A | * | 8/1999 | Johnson | 224/521 |
| 5,950,617 | A | * | 9/1999 | Lorenz | 108/44 |
| 6,082,269 | A | * | 7/2000 | Padberg | 108/44 |
| 6,126,053 | A | * | 10/2000 | Shaver | 224/521 |
| 6,189,458 | B1 | * | 2/2001 | Rivera | 108/44 |
| 6,314,891 | B1 | * | 11/2001 | Larson | 108/44 |
| 6,336,413 | B1 | * | 1/2002 | Ball | 108/44 |
| 6,416,101 | B1 | * | 7/2002 | Bartch | 296/26.02 |
| 6,511,088 | B2 | * | 1/2003 | Kahlstorf | 224/521 |
| 6,662,983 | B2 | * | 12/2003 | Lane et al. | 108/44 |
| 6,722,380 | B1 | * | 4/2004 | Hafer | 224/505 |
| 6,739,269 | B1 | * | 5/2004 | Benton | 108/44 |
| 6,752,088 | B2 | * | 6/2004 | Poarch et al. | 108/44 |
| 6,805,462 | B1 | * | 10/2004 | Smith et al. | 362/192 |
| 6,902,088 | B2 | * | 6/2005 | Carey | 224/521 |
| 7,066,096 | B1 | * | 6/2006 | Harker et al. | 108/44 |
| 7,284,586 | B2 | * | 10/2007 | Howland | 224/400 |
| 7,757,613 | B2 | * | 7/2010 | Fisher | 108/44 |

* cited by examiner

*Primary Examiner* — Jose V Chen
(74) *Attorney, Agent, or Firm* — Dale F. Regelman; Quarles & Brady LLP

(57) ABSTRACT

A portable table apparatus which can be releaseably attached to a vehicle is disclosed. The portable table assembly comprises a horizontal assembly having a tubular member and a second member, wherein the second member is slidingly and rotatably disposed within the tubular member, and a fixturing means capable of releaseably attaching the second member to the tubular member. The portable table assembly further comprises a tubular vertical assembly attached to the second member and a table that can be releaseably attached to the vertical assembly, wherein by rotating the second member within the tubular member the vertical assembly is rotated with respect to the horizontal assembly and wherein the top surface of the table can be placed in a gravitationally level orientation by rotating the second member within the first member. The portable table assembly further comprises a shield assembly that can be releaseably attached to the table.

26 Claims, 56 Drawing Sheets

FIG. 1
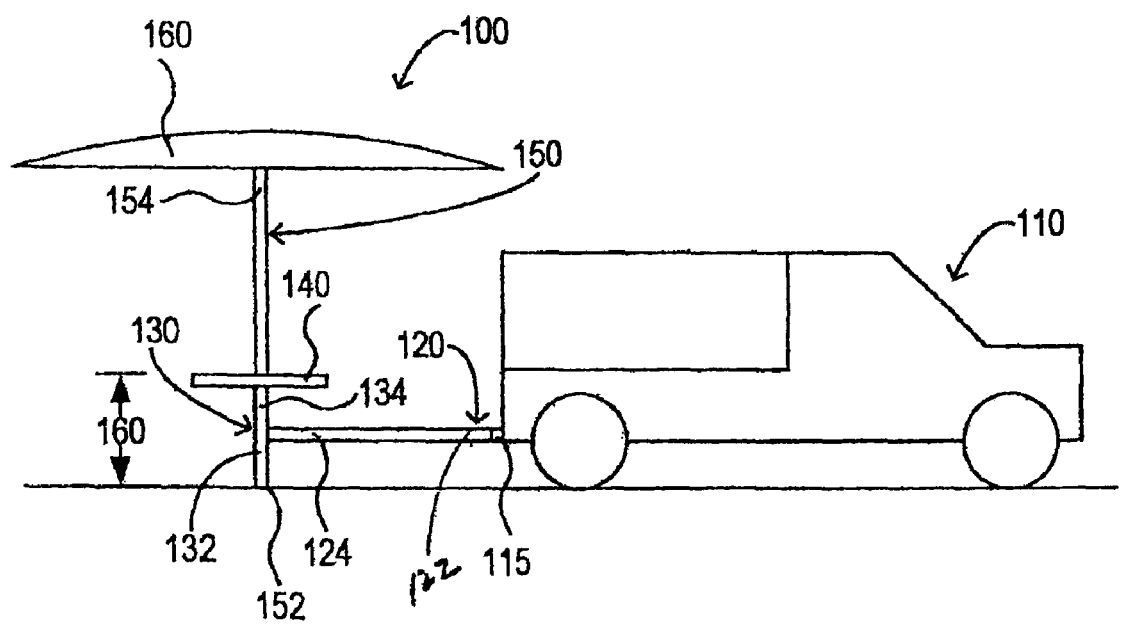
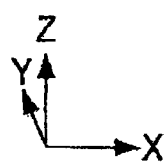

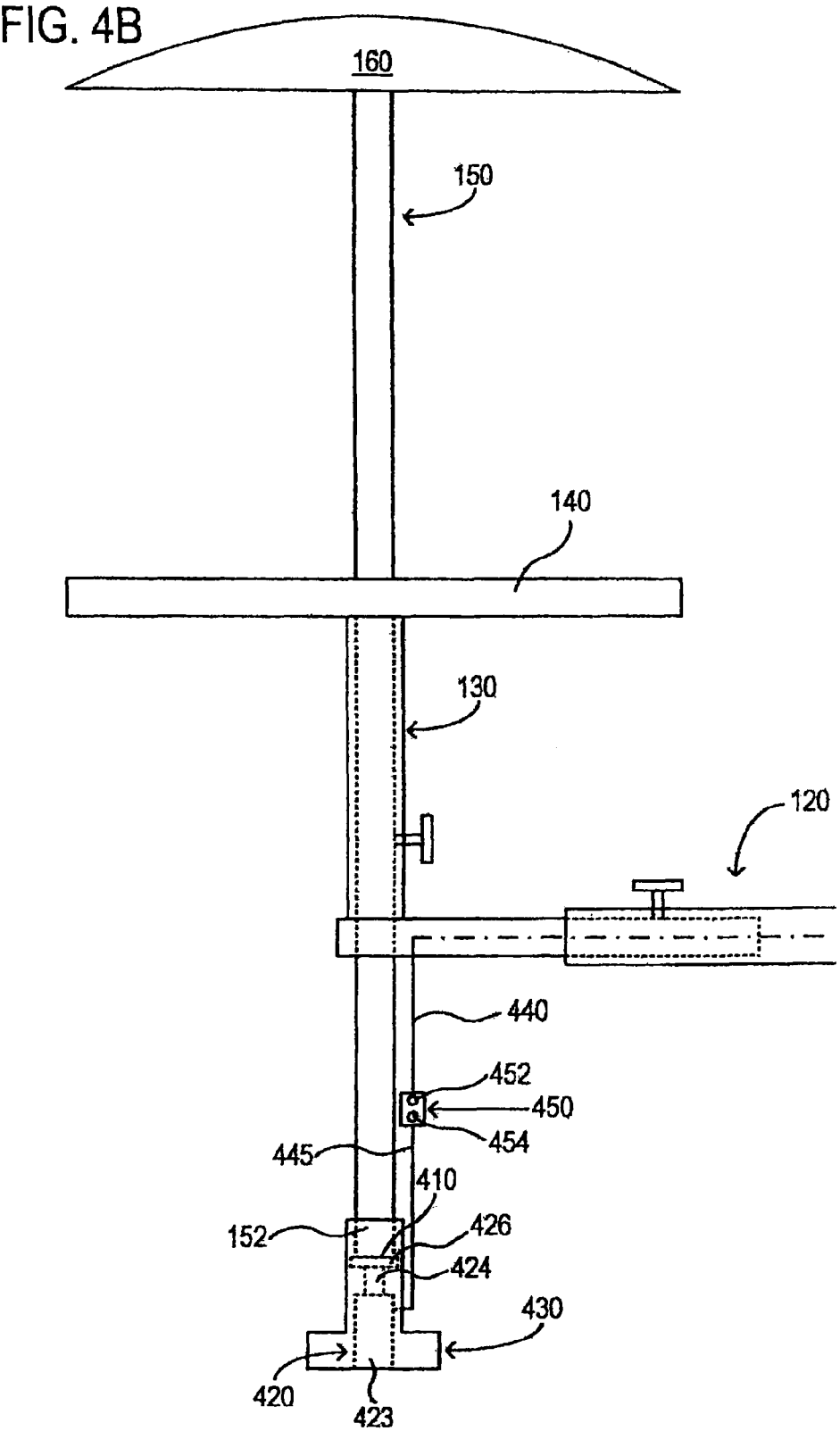

FIG. 8
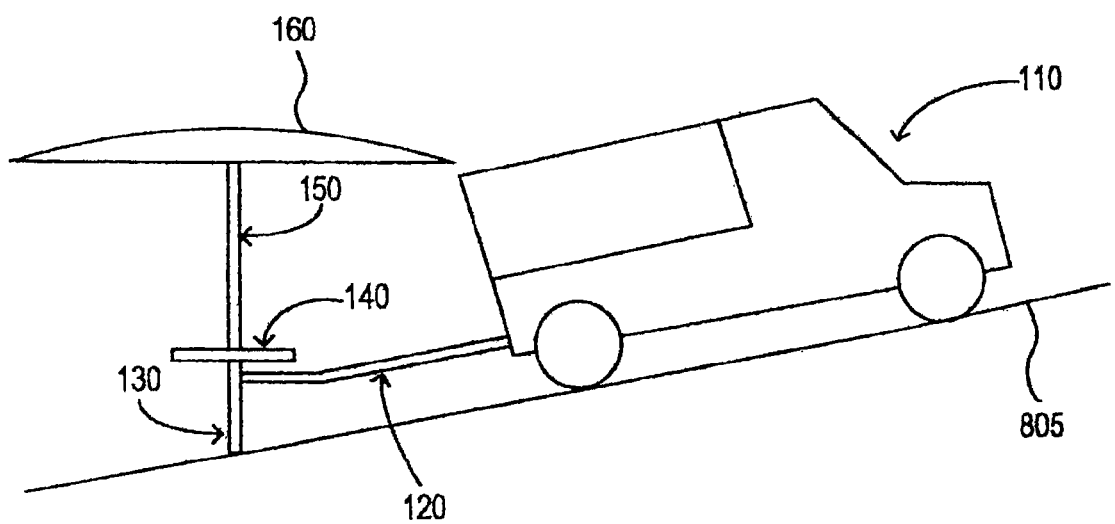
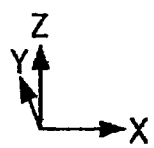

FIG. 9
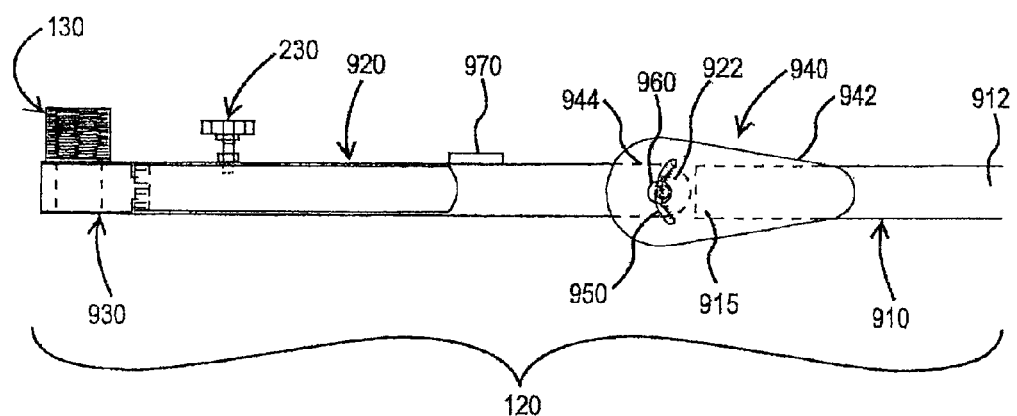
FIG. 10
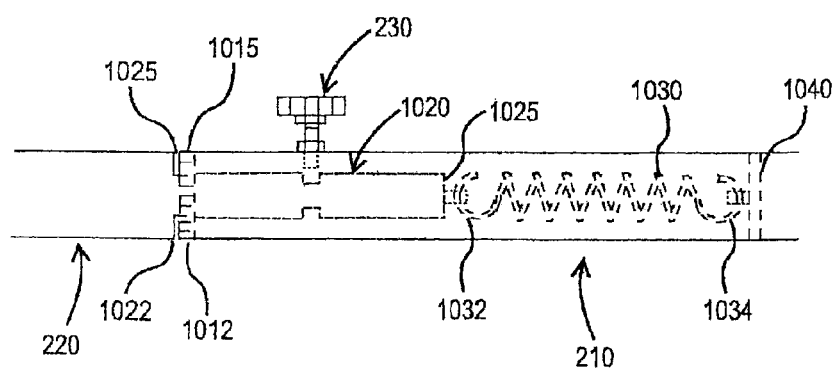
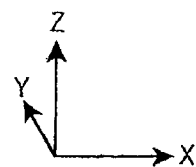

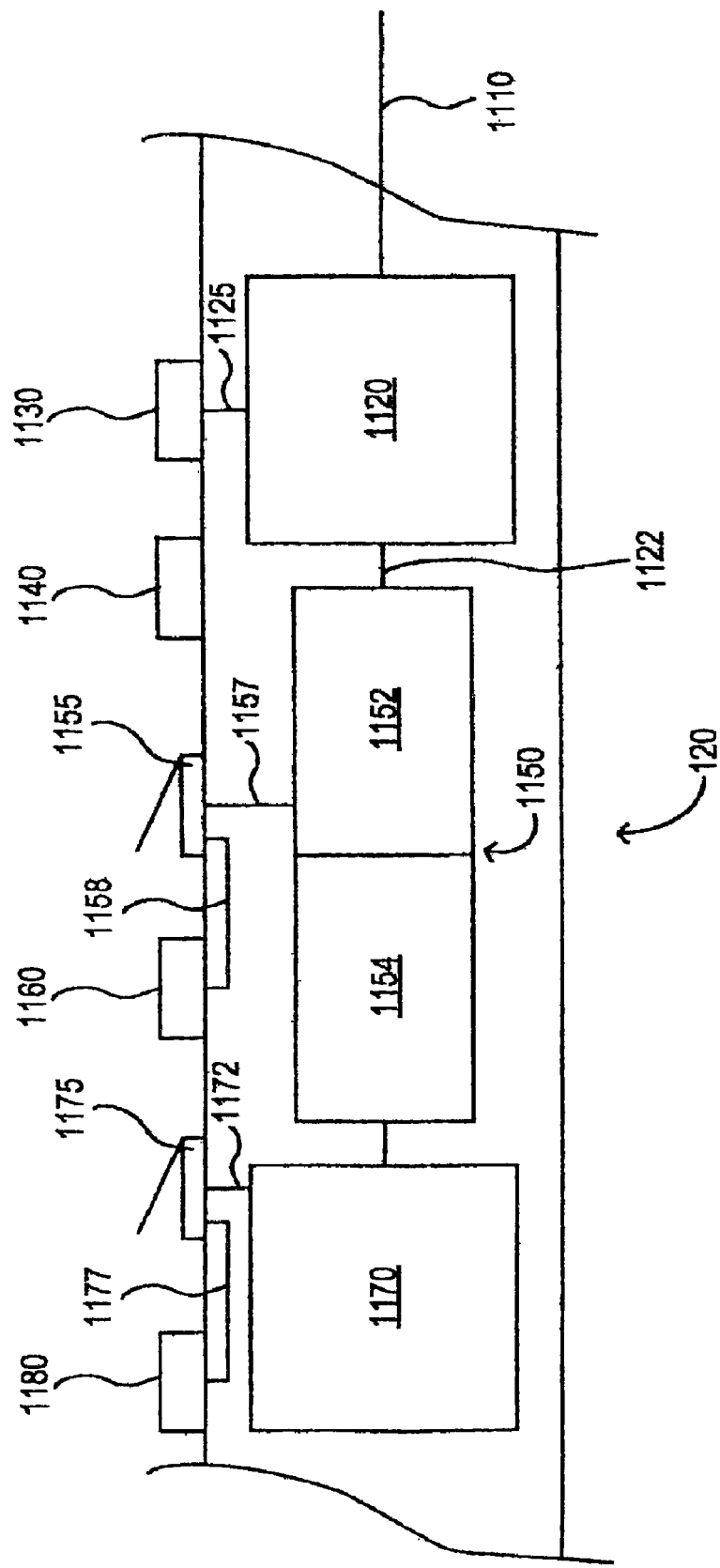

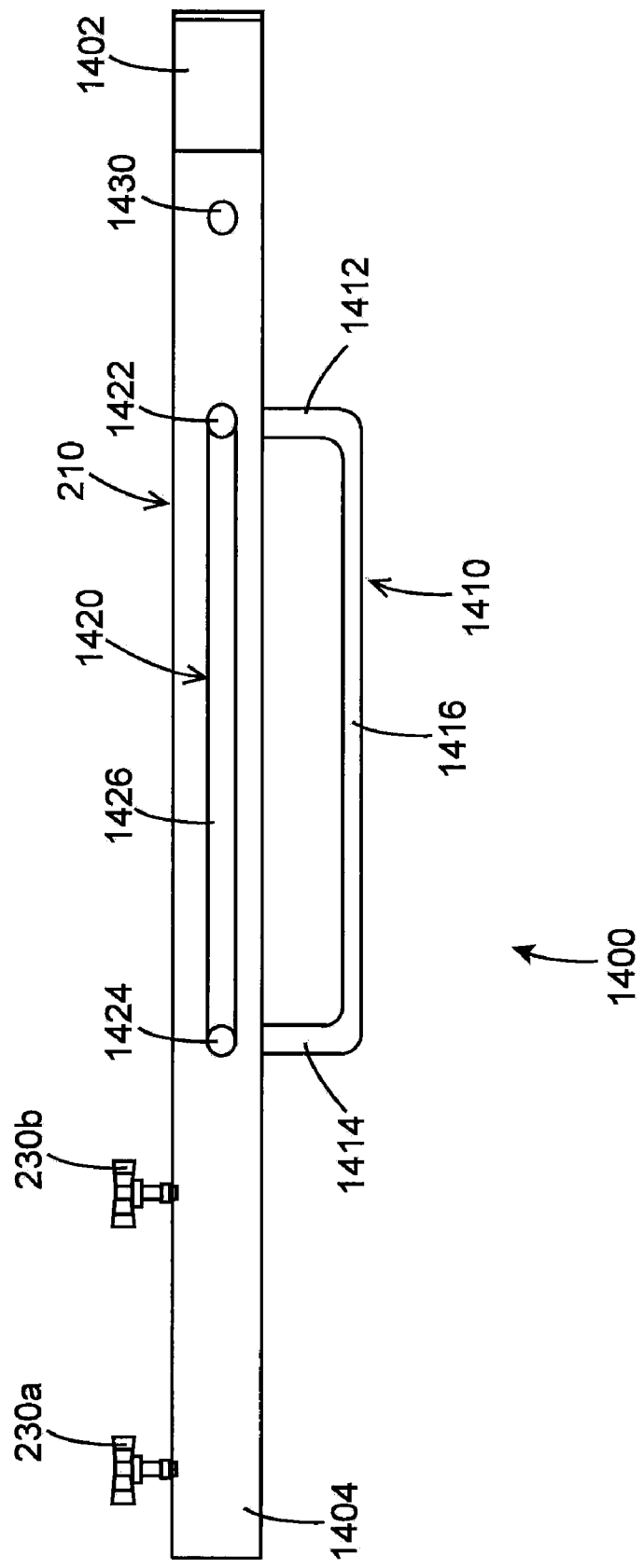

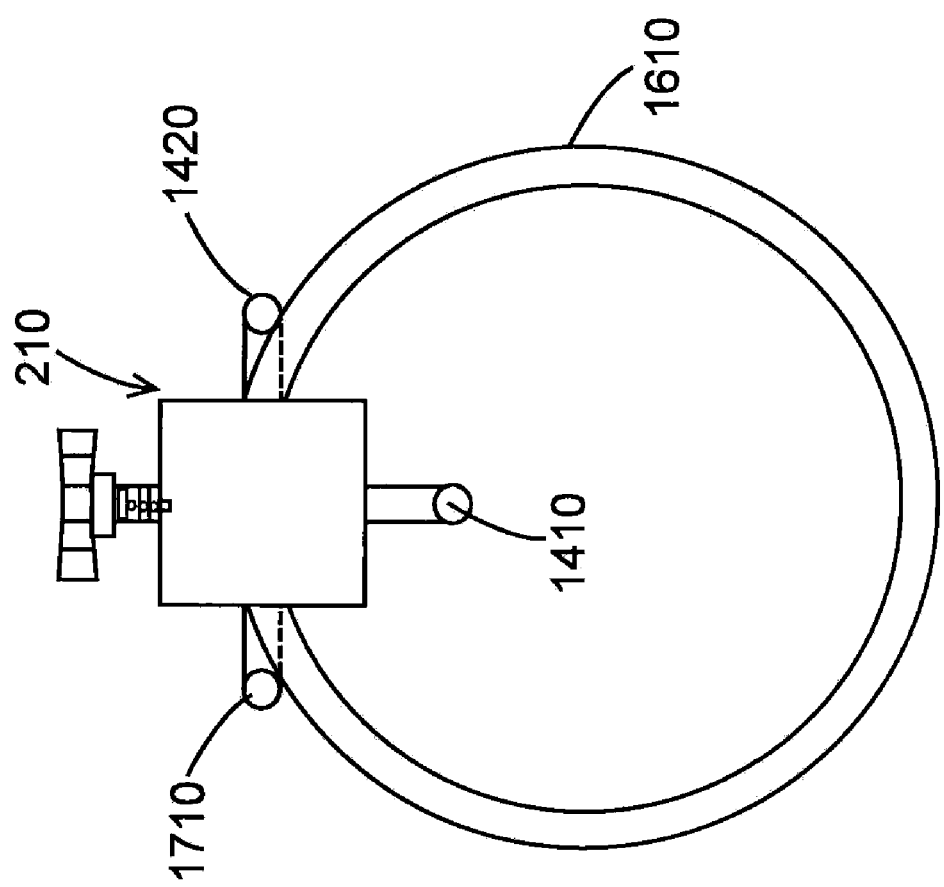

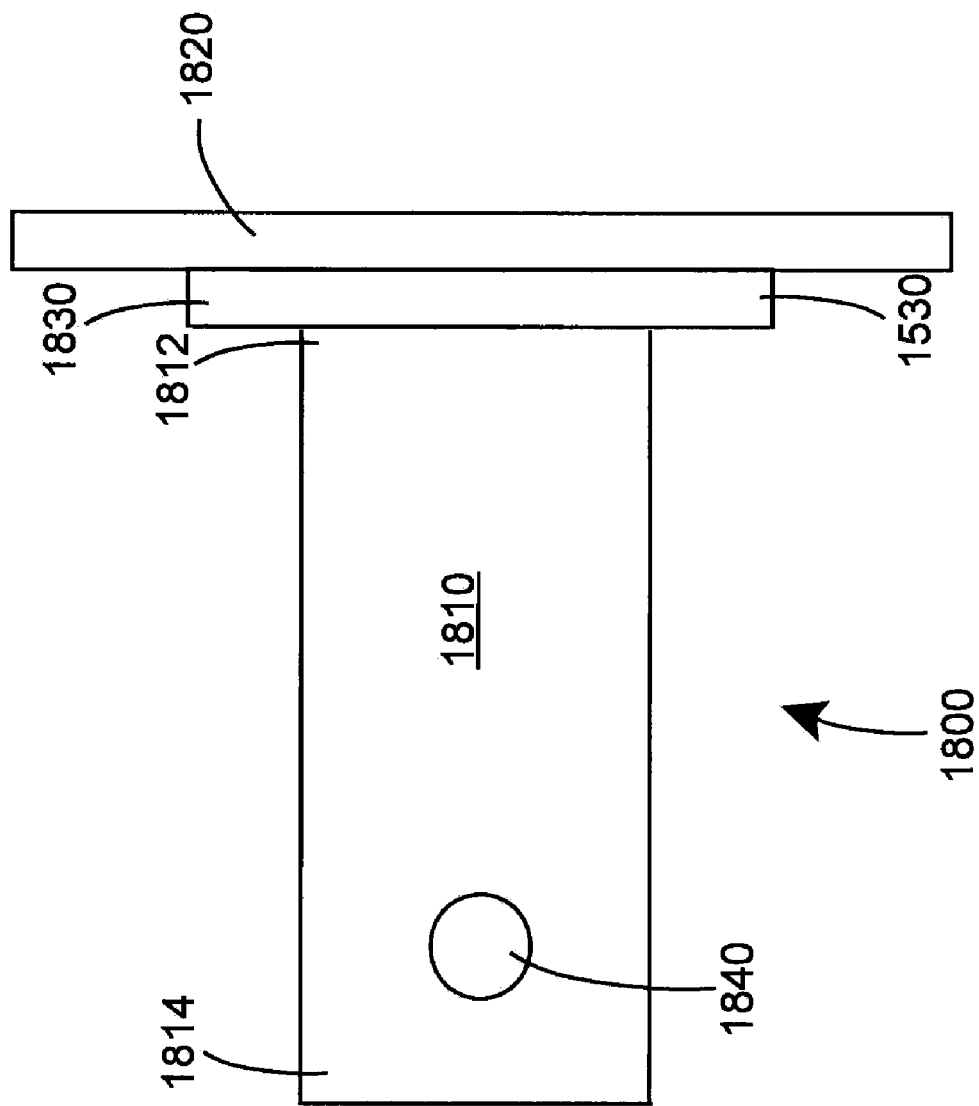

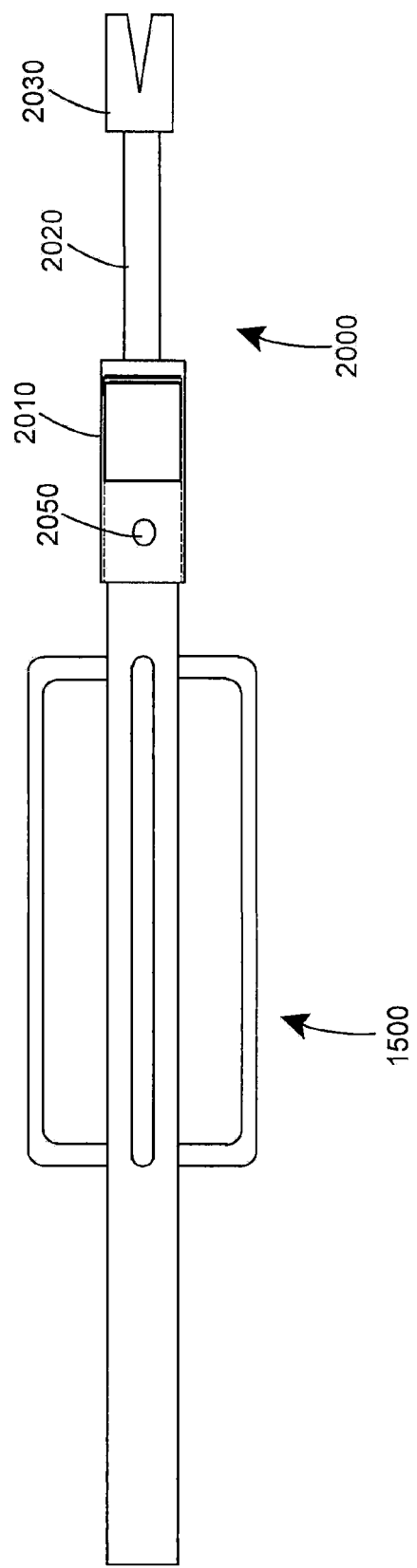

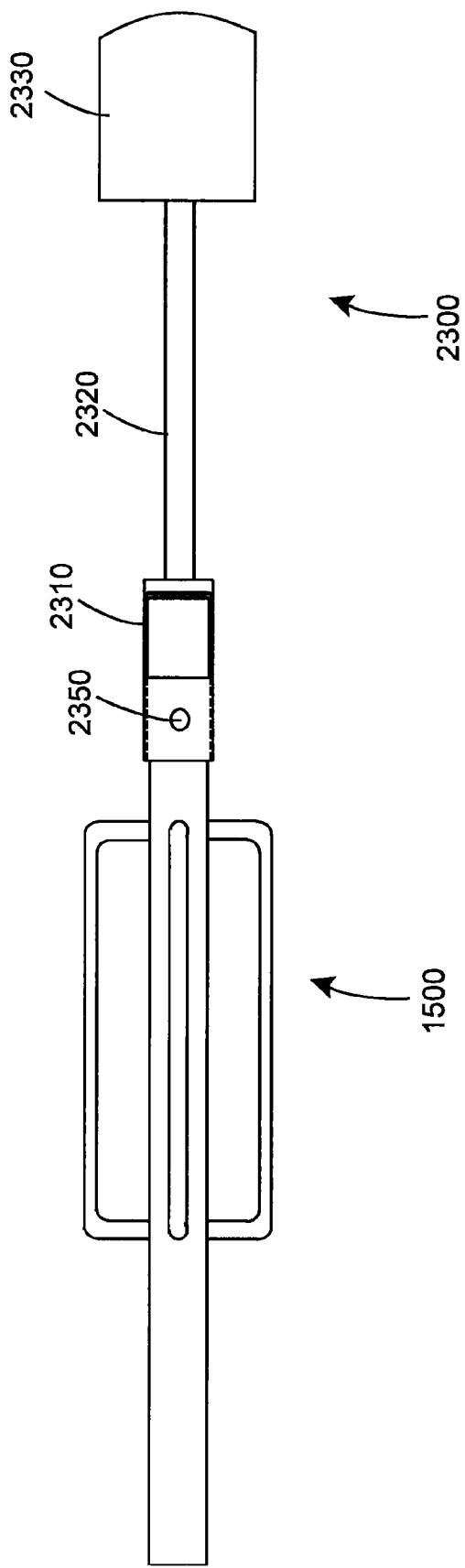

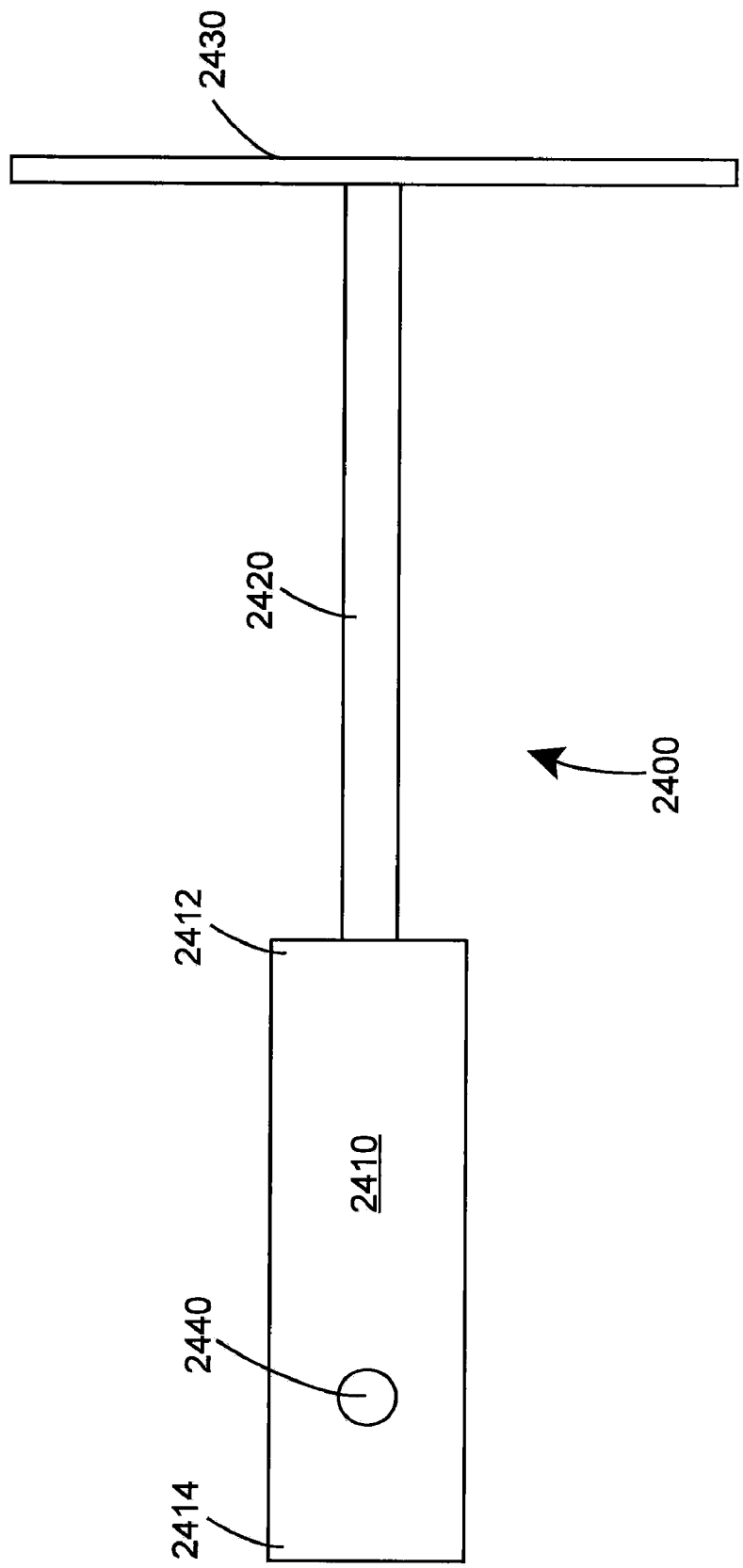

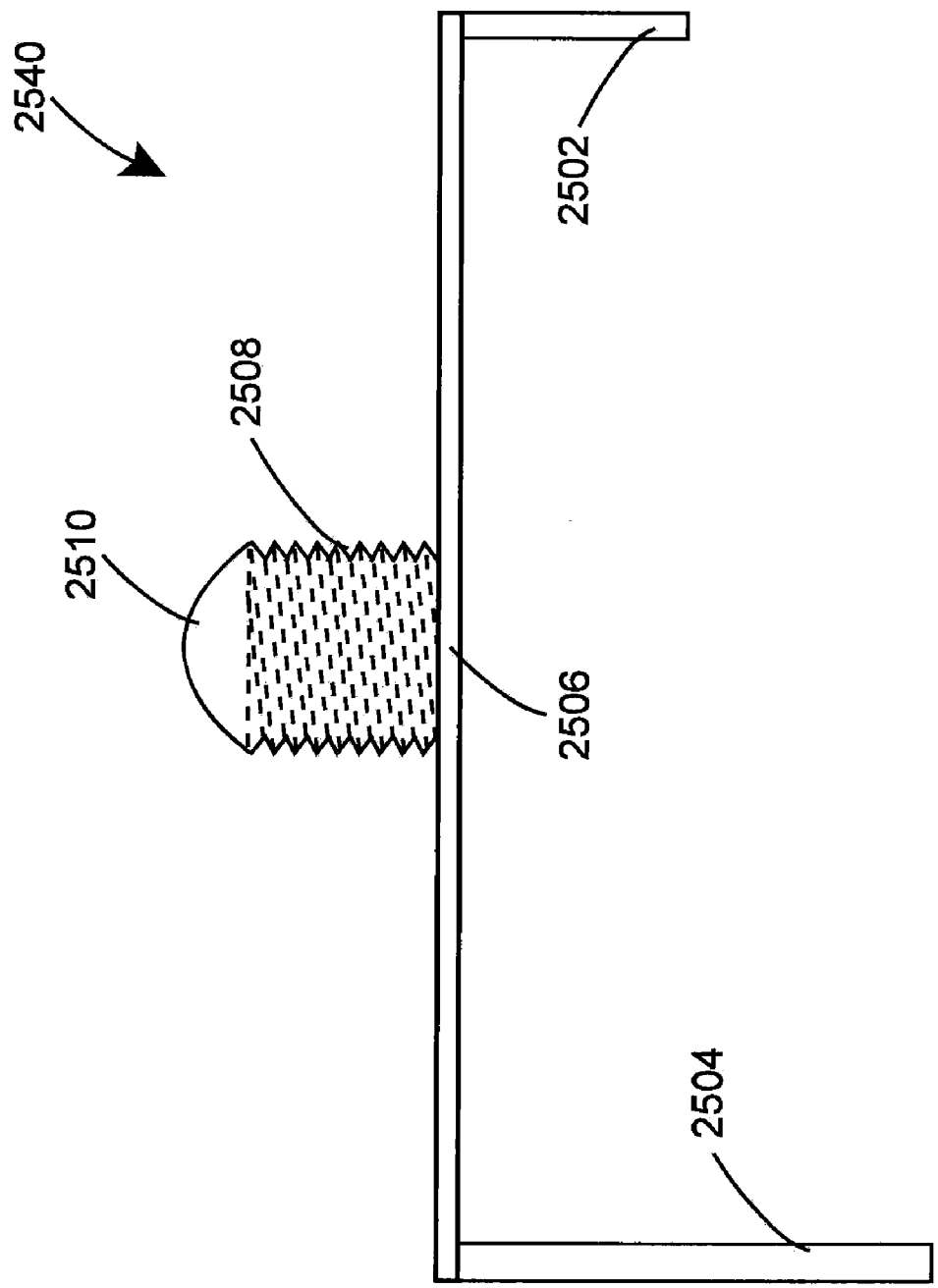

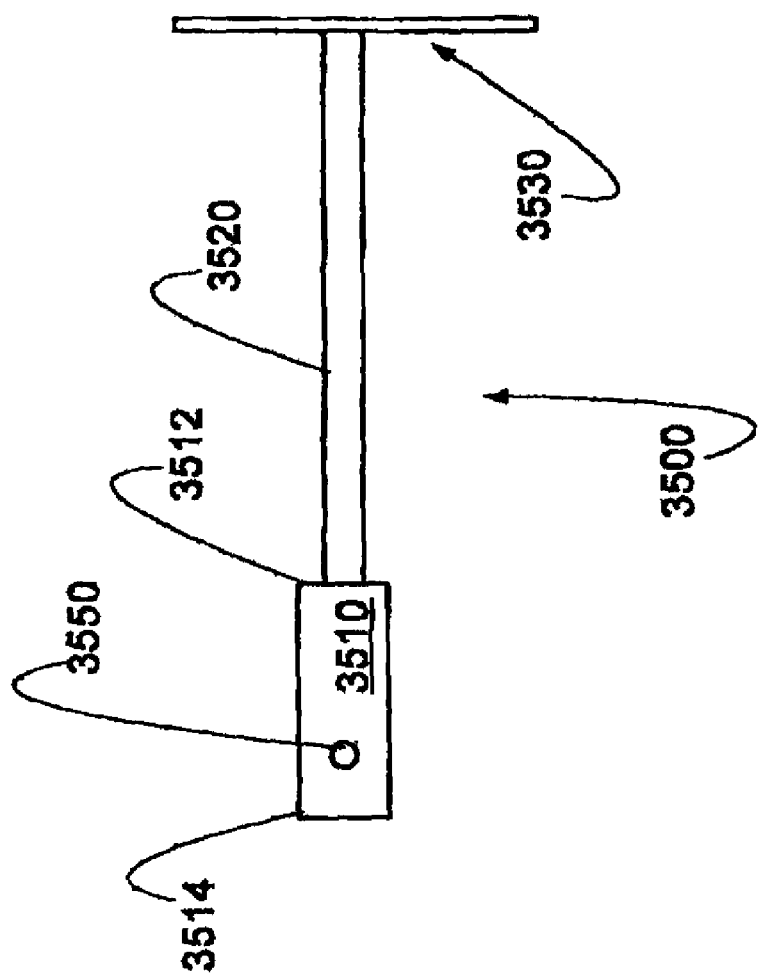

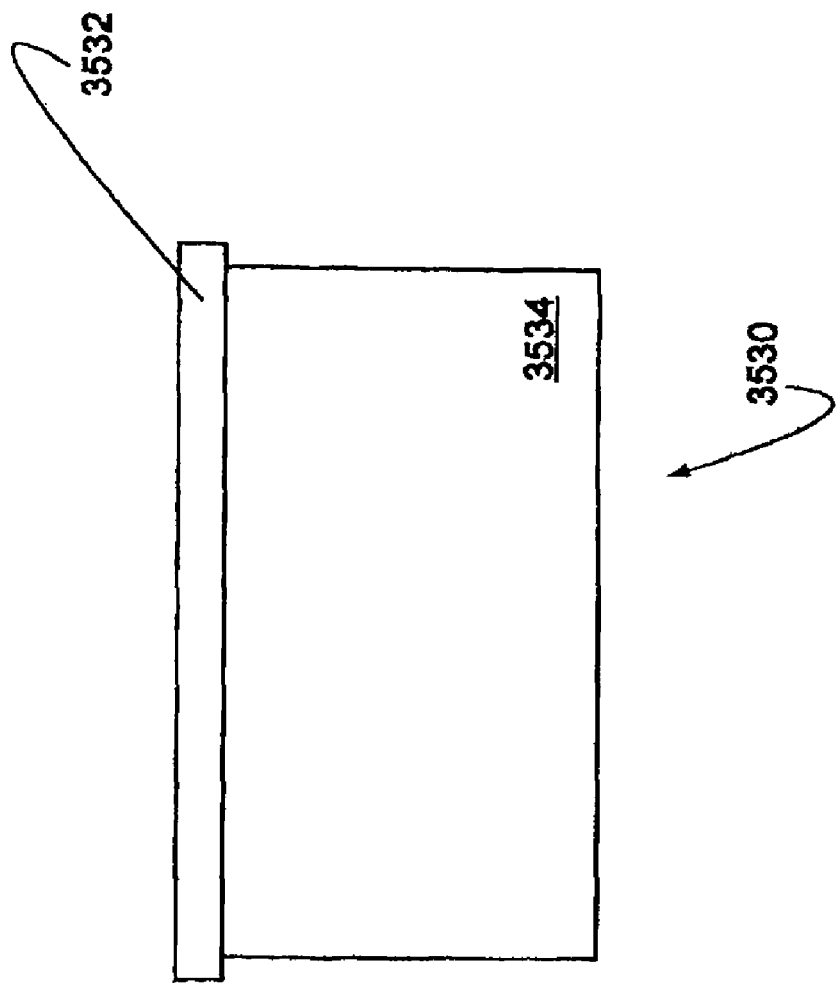

ADJUSTABLE PORTABLE TABLE APPARATUS

CROSS REFERENCE TO RELATED APPLICATIONS

This application is a Continuation-In-Part of the Application having Ser. No. 11/046,612 filed Jan. 27, 2005 now U.S. Pat. No. 7,757,613.

FIELD OF THE INVENTION

The invention is directed to an adjustable portable table apparatus.

BACKGROUND OF THE INVENTION

The prior art teaches use of tables that can attach to the back of a vehicle using a trailer hitch assembly. Applications for such a table apparatus includes recreational uses and commercial uses. Such recreational uses include, example, hunting trips, camping trips, tailgate parties, and the like. Commercial uses include, for example, construction sites, utility installation sites, and the like.

The prior art does not teach use of a portable table apparatus, wherein portions of that apparatus can be separately used by firefighters, police officers, and military personnel to, among other things, gain access to a vehicle or building in emergency situations.

SUMMARY OF THE INVENTION

Applicant's invention includes a portable table assembly which can be releaseably attached to a vehicle. In one embodiment, the portable table assembly comprises a horizontal assembly having a tubular member and a second member, wherein the second member is slidingly and rotatably disposed within the tubular member, and a fixturing means capable of releaseably attaching the second member to the tubular member. The portable table assembly further comprises a tubular vertical assembly attached to the second member and a table that can be releaseably attached to the vertical assembly, wherein by rotating the second member within the tubular member the vertical assembly is rotated with respect to the horizontal assembly and wherein the top surface of the table can be placed in a gravitationally level orientation by rotating the second member within the first member. The table assembly further comprises a shield assembly that can be releaseably attached to the table.

In another embodiment, the table assembly further comprises a shower assembly comprising a spray nozzle, a shaft attached to the spray nozzle and extending through an aperture formed in the table, and a fluid source connected to the spray nozzle by a first water conduit wherein the spray nozzle emits a fluid from the fluid source.

In yet another embodiment, the table assembly further comprises a mister assembly comprising an umbrella, a plurality of misters each connected to at least one other mister by a first water conduit, wherein the plurality of misters are attached to the umbrella, a shaft comprising a first end and a second end, wherein the first end of the shaft is attached to the umbrella, and wherein the shaft extends through the aperture and through the vertical assembly, and a fluid source connected to the plurality of misters by a second water conduit, wherein the misters emit a fluid from the fluid source.

In still another embodiment, the table assembly further comprises a privacy assembly comprising an umbrella, a shaft comprising a first end and a second end, wherein the first end of the shaft is attached to the umbrella, and wherein the shaft extends through the aperture and through the vertical assembly, and curtain attached to the umbrella.

In another embodiment, the table assembly further comprises a sleeping assembly comprising a frame comprising a horizontal platform and a plurality of legs, wherein the horizontal platform is formed to include a second aperture, wherein part of the horizontal assembly is slidingly and rotatably disposed within the second aperture.

In yet another embodiment the portable table assembly comprises a horizontal tubular member releaseably attached at one end to a vehicle and formed to include an aperture extending therethrough, a solid member configured at one end to be slidingly inserted into the horizontal tubular member wherein the other end extends outwardly from the horizontal tubular member, a vertical tubular member releaseably attached to the solid member, and a table formed to include an aperture releaseably attached to the vertical tubular member, wherein the horizontal tubular member further comprises a first U-shaped handle and a second U-shape handle.

BRIEF DESCRIPTION OF THE DRAWINGS

The invention will be better understood from a reading of the following detailed description taken in conjunction with the drawings in which like reference designators are used to designate like elements, and in which:

FIG. 1 is a side view of a vehicle releaseably connected to Applicant's portable apparatus which comprises a horizontal assembly, a vertical assembly, a table, and a shelter assembly;

FIG. 4B a side view of a second embodiment of Applicant's lifting apparatus disposed in the apparatus of claim 2;

FIG. 8 shows a side view of another embodiment of Applicant's apparatus which comprises an adjustment means to keep the table portion of Applicant's apparatus level when the attached vehicle is disposed on an incline;

FIG. 9 shows a side view of a portion of the apparatus of FIG. 8;

FIG. 10 is a side view showing an alternative embodiment for Applicant's horizontal assembly;

FIG. 11 is a block diagram showing certain electrical components disposed within and on Applicant's horizontal assembly.

FIG. 14B illustrates the horizontal tubular member of FIG. 14A;

FIG. 17B is a front view of the apparatus of FIG. 17A;

FIG. 18B shows the backup tool of FIG. 18A;

FIG. 20A shows the horizontal tubular member of FIG. 15 in combination with a pry bar tool;

FIG. 23A shows the horizontal tubular member of FIG. 15 in combination with a shovel tool;

FIG. 24B shows the rake tool of FIG. 24A;

FIG. 26A shows the shield attachment of FIG. 25A;

FIG. 35B shows the hoe tool of FIG. 35A;

FIG. 35C shows an alternative view of the hoe tool of FIG. 35A;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Referring now to FIG. 1, Applicant's invention comprises an apparatus which can be removeably attached to a vehicle, such as vehicle 110, comprising a trailer hitch receiving assembly 115. In the illustrated embodiment of FIG. 1, trailer hitch receiving assembly 115 is disposed on the rear portion of vehicle 110. In other embodiments of Applicant's invention, the trailer hitch receiving assembly 115 may be disposed on the front portion, and/or on a side portion of the vehicle.

Figure 12A:
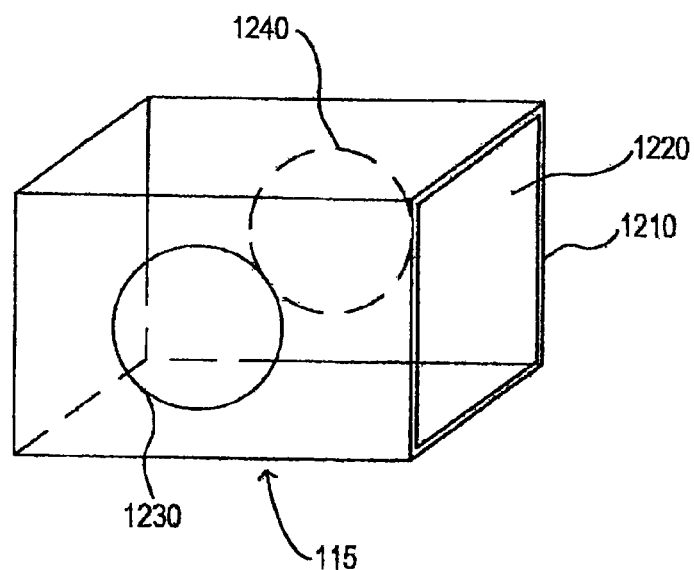
FIG. 12A is a perspective view of a trailer hitch receiving assembly.

Applicant's apparatus comprises assembly 120 which comprises end 122 which can be releaseably engaged with trailer hitch receiving assembly 115 and end 124 which can be releaseably attached to end 132 of assembly 130. FIG. 12A shows a perspective view of trailer hitch receiving assembly 115.

Referring now to FIG. 12A, trailer hitch receiving assembly 115 comprises enclosure 1210 formed to include open end 1220. Assembly 115 is further formed to include aperture 1230 in a first side wall and aperture 1240 in a second, opposing side wall. A trailer hitch which is formed to include a pair of opposing apertures can be inserted into assembly 115, and a cross bolt is then inserted through both apertures in assembly 115 and also through both apertures in the trailer hitch thereby releaseably coupling the trailer hitch to the trailer hitch receiving assembly.

Figure 12B:
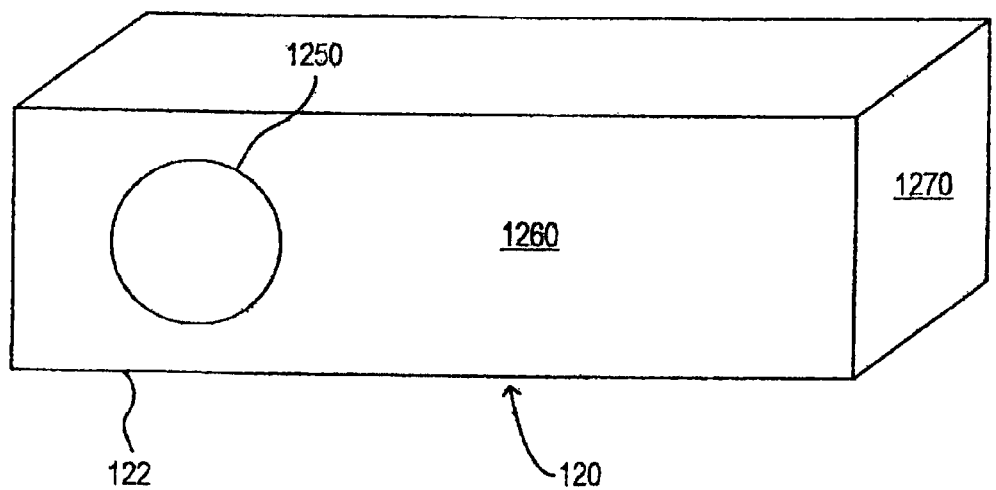
FIG. 12B is a perspective view of a first end of one embodiment of Applicant's horizontal assembly.

Referring now to FIG. 12B, in certain embodiments end 122 of horizontal assembly 120 is formed to include aperture

1250 in wall 1260. In certain embodiments, end 122 of horizontal assembly 120 is formed to include only one aperture, namely aperture 1250 in wall 1260, wherein end 122 is not formed to include a second, opposing aperture in wall 1270. End 122 of horizontal assembly 120 can be inserted into open end 1220 of trailer hitch receiving assembly 115 such that aperture 1250 is aligned with aperture 1230.

Figure 13A:
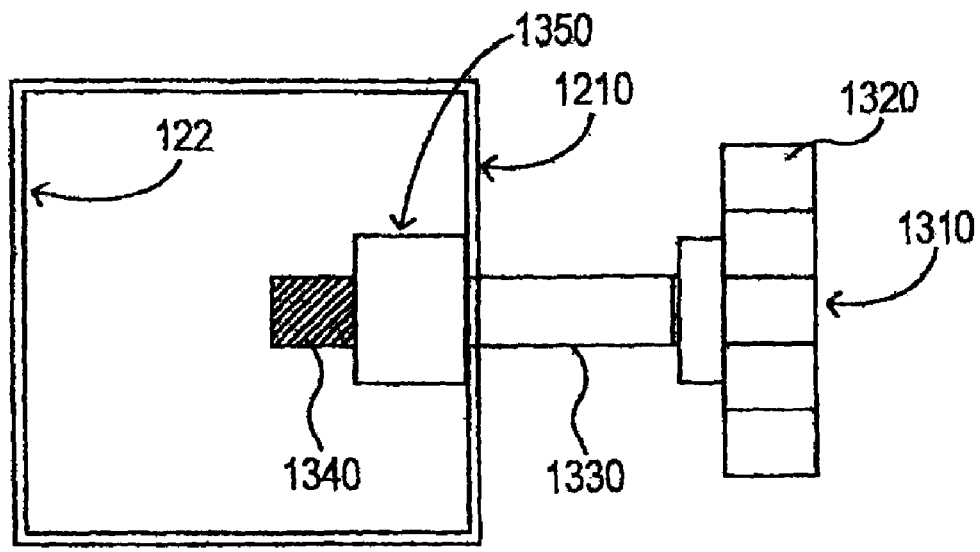
FIG. 13A is a cross sectional view of the first end of FIG. 12B inserted into the trailer hitch receiving assembly of FIG. 12A.
Figure 13B:
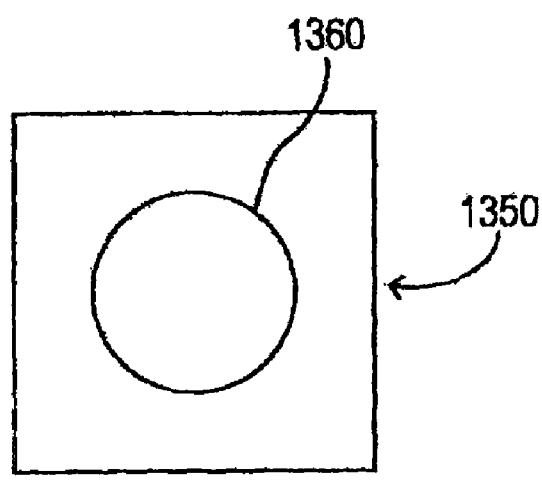
FIG. 13B is a top view of a nut disposed within the first end of FIG. 12B.

Referring now to FIGS. 13A and 13B, in certain embodiments end 122 of horizontal assembly 120 further includes nut 1350 disposed on the interior portion of end 122, wherein nut 1350 is formed to include threaded aperture 1360. Securing means 1310 comprises handle portion 1320 and shaft 1330 which is attached to handle 1320 and extends outwardly therefrom. Distal end 1340 of shaft 1330 is threaded, such that end 1340 can be threadedly engaged with threaded aperture 1360.

In the embodiments of FIGS. 12B, 13A, and 13B, end 122 of horizontal assembly 120 is inserted into trailer hitch receiving assembly 115 such that apertures 1250, 1230, and 1360, are aligned. End 1340 of shaft 1330 is then inserted through aperture 1230 in receiving assembly 115, through aperture 1250 in end 122, to threadedly engage threaded aperture 1360. Rotating handle 1320 releaseably attaches end 122 to assembly 115. Moreover, handle 1320 can be rotated until the releasable attachment of end 122 to assembly 115 has been "snugged tight" such that end 122 cannot wobble at all within assembly 115.

This means of releaseably attaching horizontal assembly 120 to a vehicle provides a secure attachment that permits no movement of horizontal assembly 120. Such a releaseably attachment provides stability to table 140 which is not available if end 122 included a pair of opposing apertures, and a cross bolt was inserted through the opposing apertures in end 122 and in assembly 115.

Referring once again to FIG. 1, table 140 is releaseably attached to end 134 of vertical assembly 130. In certain embodiments, vertical assembly 130 comprises a tubular member having a diameter, a first open end, and a second open end.

In certain embodiments, table 140 is releaseably attached to end 134 of assembly 130. In certain embodiments, table 140 is formed to include an aperture having said diameter and extending therethrough, wherein that aperture is located at the approximate center of the table in the X/Y plane.

In the illustrated embodiment of FIG. 1, apparatus 100 further comprises a protective shelter comprising umbrella assembly 160 and umbrella shaft 150. Further in the illustrated embodiment of FIG. 1, umbrella shaft 150 extends through assembly 130 and table 140. In the illustrated embodiment of FIG. 1, end 152 of shaft 150 contacts the ground. End 154 of shaft 150 is attached to umbrella assembly 160. In certain embodiments, shaft 150 in combination with umbrella assembly 160 is sold in commerce as a "patio umbrella."

Table 140 comprises a variety of shapes and dimensions. In certain embodiments, table 140 has a thickness of about 0.5 inch. In other embodiments, table 140 has a thickness of about 0.75 inch. In still other embodiments, table 140 has a thickness of about one inch. In yet other embodiments, table 140 has a thickness greater than one inch.

In certain embodiments, table 140 has a top surface area of about 1000 square inches. In other embodiments, table 140 has a top surface area of less than about 1000 square inches. In still other embodiments, table 140 has a top surface area of greater than about 1000 square inches.

In certain embodiments, table 140 has a square shape in the X/Y plane. In certain embodiments, table 140 has a rectangular shape in the X/Y plane. In other embodiments, table 140 has a round shape in the X/Y plane. In yet other embodiments, table 140 has a hexagonal shape in the X/Y plane. In still other embodiments, table 140 has an octagonal shape in the X/Y plane.

In certain embodiments, vertical assembly 130 is about 12 inches in length. As a general matter, horizontal assembly 120 is disposed at a height of about 17 inches above the ground. Using a vertical assembly having a length of 12 inches in combination with a one inch thick table positions the top of that table 140 about 30 inches above the ground. A typical dining table has a height above the ground of about thirty (30) inches.

A vertical assembly about 12 inches in length facilitates recreational use of Applicant's portable table apparatus. As those skilled in the art will appreciate, depending on the actual height of horizontal assembly 120 when attached to a vehicle, the length of vertical assembly 130 can be adjusted such that the top of table 140 is about 30 inches above the ground.

In certain embodiments, vertical assembly 130 is about 18 inches in length. As a general matter, horizontal assembly 120 is disposed at a height of about 17 inches above the ground. Using a vertical assembly having a length of 18 inches in combination with a one inch thick table positions the top of that table 140 about 36 inches above the ground. A typical counter/work bench height has a height above the ground of about thirty-six (36) inches. A vertical assembly about 18 inches in length facilitates commercial use of Applicant's portable table apparatus. As those skilled in the art will appreciate, depending on the actual height of horizontal assembly 120 when attached to a vehicle, the length of vertical assembly 130 can be adjusted such that the top of table 140 is about 36 inches above the ground.

As those skilled in the art will appreciate, the industry standard for bar counter height is 42 inches to 48 inches. Depending on the actual height of horizontal assembly 120 when attached to a vehicle, the length of vertical assembly 130 can be adjusted such that the top of table 140 is between about 42 inches and about 48 inches above the ground. In these bar counter height embodiments, conventional bar stools and/or folding director's chairs can be comfortably used in combination with Applicant's adjustable table apparatus Referring now to FIG. 2A, in certain embodiments assembly 120 comprises tubular member 210, member 220, and fixturing means 230. Tubular member 210 is formed to include an enclosure space 212 dimensioned such that all or a portion of member 220 can be slidingly disposed within space 212. The orientation of table 140 can be adjusted in a first plane orthogonal to the horizontal member, i.e. the Y/Z plane, by rotating member 220 and then fixturing member 220 to tubular member 210.

Figure 2A:
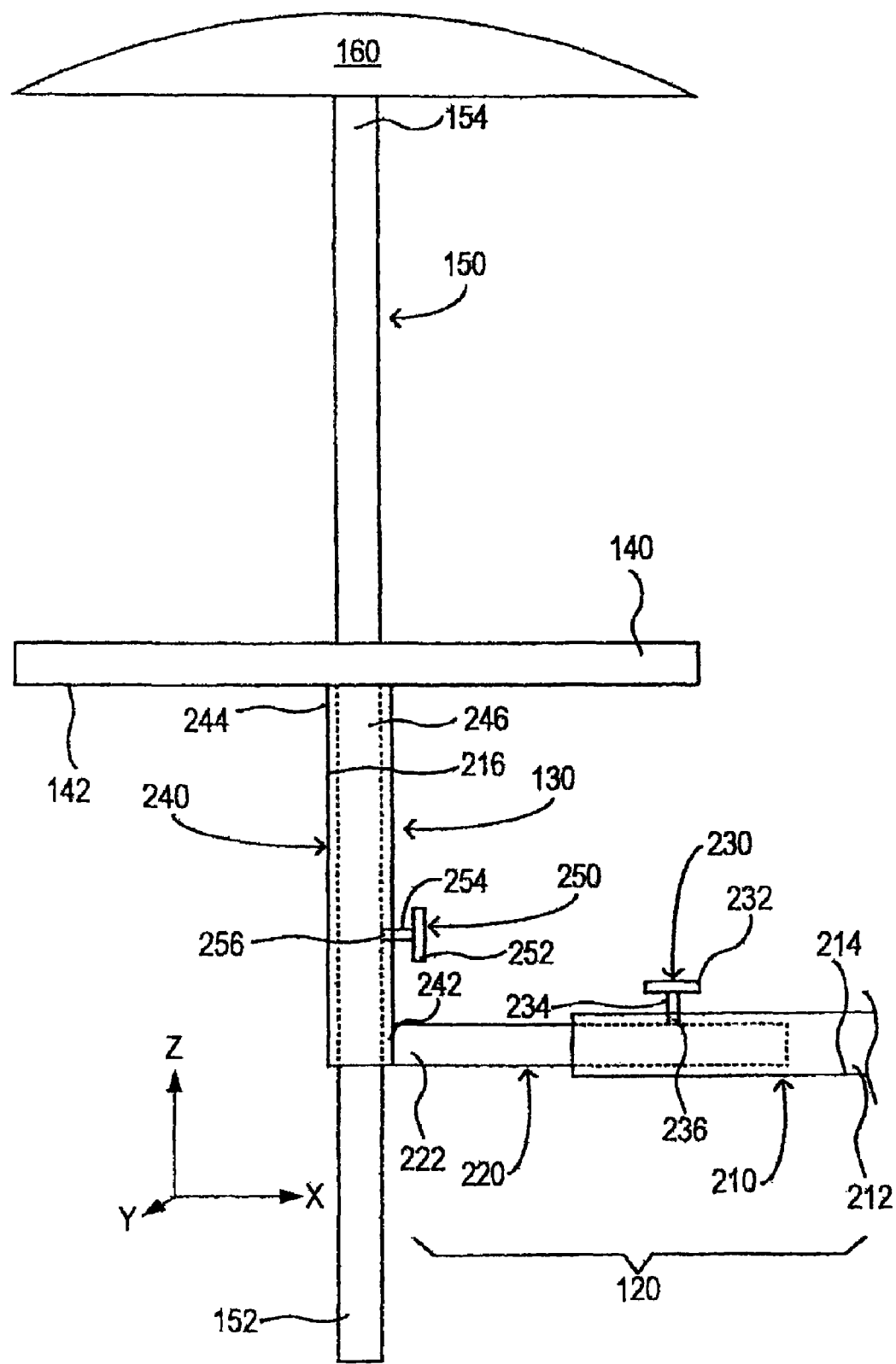
FIG. 2A is a side view showing one embodiment of Applicant's horizontal assembly.

In the illustrated embodiment of FIG. 2A, fixturing means 230 comprises a T-shaped apparatus comprising a handle 232 and a threaded shaft 234. In these embodiments, tubular member 210 is formed to include a threaded aperture into which threaded shaft 234 can be threadedly engaged.

In order to fixture member 220 within tubular member 210, handle 232 is rotated in a first direction such that shaft 234 is moved inwardly into space 212 until the distal end of shaft 234 contacts tubular member 220 and forces member 220 against the interior surface 214 of tubular member 210 thereby fixturing member 220 in place. In order to release tubular member 220 from tubular member 210, handle 232 is rotated in a second direction such that shaft 234 is moved outwardly such that the distal end of shaft 234 no longer forces member 220 against the interior surface 214 of tubular member 210 thereby releasing member 220.

In certain embodiments, the interior surface 214 of tubular member comprises a round cross-section. In these embodiments, member 220 also comprises a round cross-section. In other embodiments, the interior surface 214 of tubular member comprises a square cross-section. In these embodiments, member 220 also comprises a square cross-section. In yet other embodiments, the interior surface 214 of tubular member comprises a hexagonal cross-section. In these embodiments, member 220 also comprises a hexagonal cross-section. In still other embodiments, the interior surface 214 of tubular member comprises an octagonal cross-section. In these embodiments, member 220 also comprises an octagonal cross-section.

Referring now to FIG. 10, in certain embodiments member 220 comprises a first set of gear teeth 1025 disposed on end 1022. In these embodiments, member 210 comprises a second set of gear teeth 1015 disposed on end 1012. Member 1020 is attached to end 1022 of member 220 and extends outwardly therefrom. Member 1020 is dimensioned such that member 1020 can be inserted into tubular member 210. Gear teeth 1025 can be mated with gear teeth 1015 such that member 1020 cannot rotate within tubular member 210.

Spring 1030 is disposed within tubular member 210 and comprises first end 1032 and second end 1034. First end 1032 is attached to distal end 1026 of member 1020. Second end 1034 is attached to member 1040 which is disposed within tubular member 210. Spring 1030 is disposed within tubular member 210 such that spring 1030 pulls member 220 in the +X direction to keep gear teeth 1025 mated with gear teeth 1015.

In the embodiment of FIG. 10, the orientation of member 220 with respect to member 210 can be adjusted by manually pulling member 220 a sufficient distance in the –X direction to disengage gear teeth 1025 from gear teeth 1015. Member 220 can then to rotated in the Y/Z plane to a desired orientation. Thereafter, member 220 is released allowing spring 1030 to pull gear teeth 1025 into a mated relationship with gear teeth 1015 thereby locking member 220 into the desired orientation.

Referring again to FIG. 2A, assembly 130 comprises tubular member 240 and fixturing means 250. Tubular member 240 is formed to enclose space 246. In the illustrated embodiment of FIG. 2A, umbrella shaft 150 extends through table 140, and through tubular member 240, such that distal end 152 contacts the ground. Proximal end 154 of shaft 150 is attached to umbrella assembly 160.

In the illustrated embodiment of FIG. 2A, fixturing means 250 comprises a T-shaped apparatus comprising a handle 252 and a threaded shaft 254. In these embodiments, tubular member 240 is formed to include a threaded aperture into which threaded shaft 254 can be threadedly engaged.

In order to releaseably fixture umbrella shaft 150 within tubular member 240, handle 252 is rotated in a first direction such that shaft 254 is moved inwardly into space 246 until the distal end of shaft 254 contacts shaft 150 and forces shaft 150 against the interior of tubular member 240 thereby fixturing umbrella shaft 150 in place. In order to release umbrella shaft 150 from tubular member 240, handle 252 is rotated in a second direction such that shaft 254 is moved outwardly such that the distal end of shaft 254 no longer forces umbrella shaft 150 against the interior of tubular member 240 thereby releasing umbrella shaft 150.

Figure 2B:
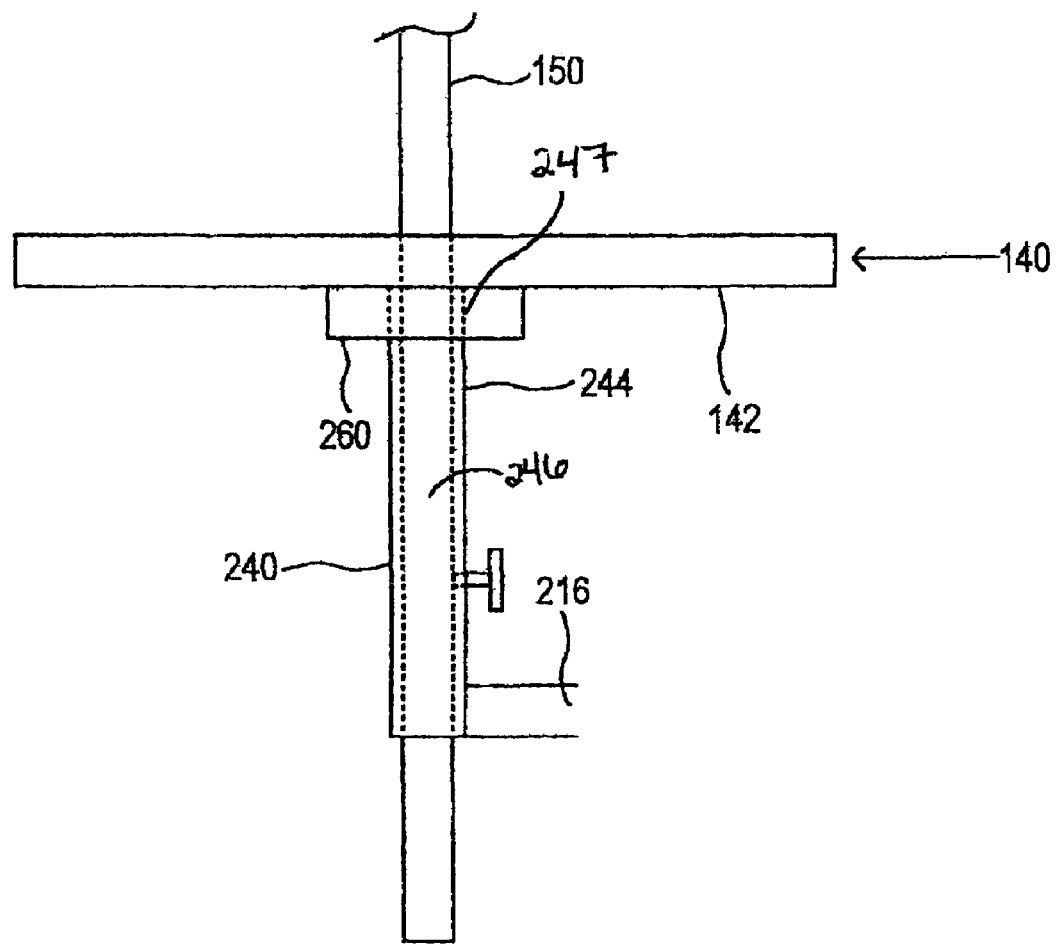
FIG. 2B shows one embodiment of the attachment of Applicant's table element to vertical assembly.

End 244 of tubular member 240 is attached to the bottom surface 142 of table 140. In certain embodiments, end 244 is releaseably attached to bottom surface 142. Referring now to FIG. 2B, in certain embodiments attachment plate 260 formed to include a threaded aperture is permanently affixed to bottom surface 142, wherein end 244 of tubular member 240 comprises threaded portion 247, wherein threaded portion 247 can engage the threaded aperture of attachment plate 260. In these embodiments, table 140 and tubular member 240 can be separated for transportation and/or storage.

Figure 3A:
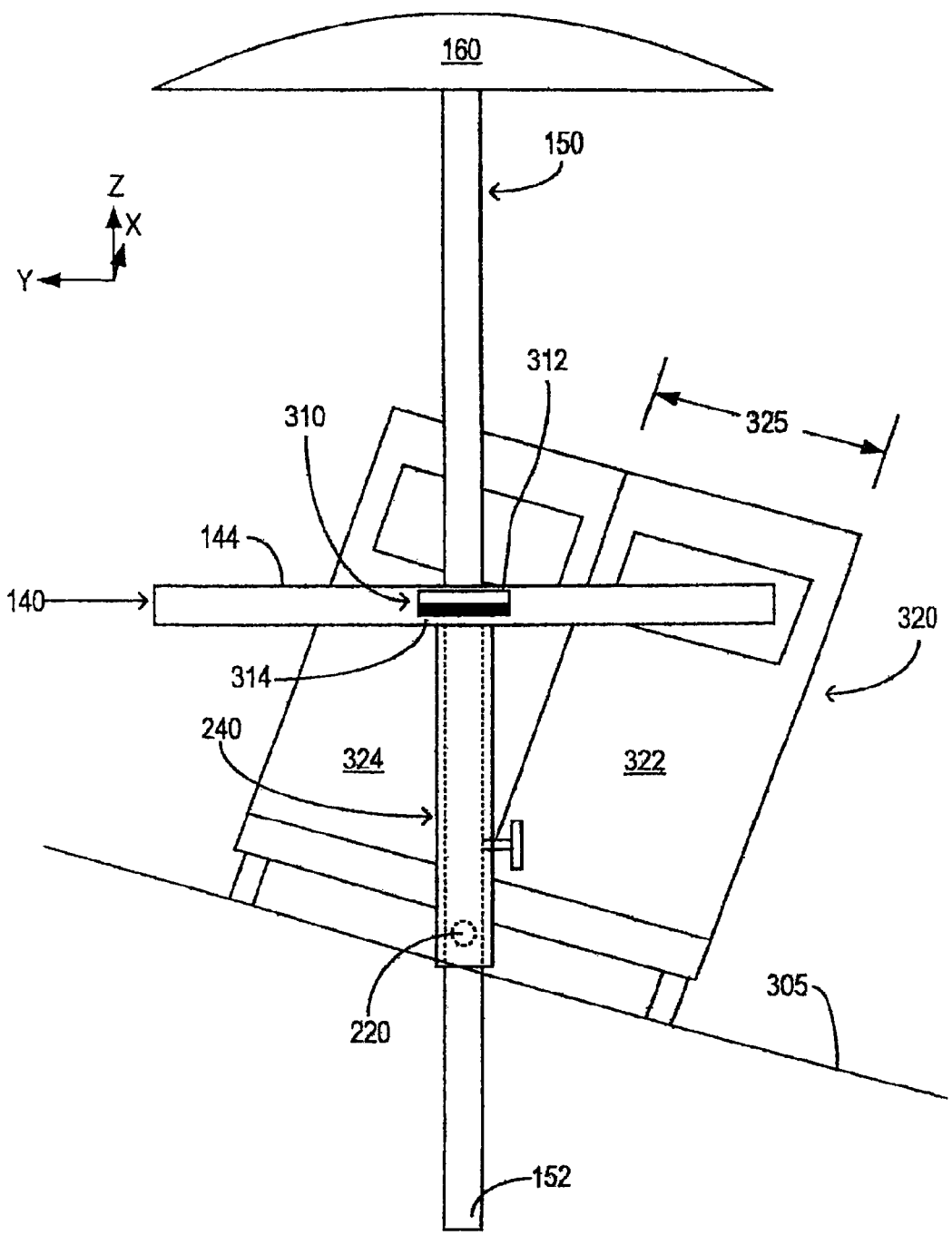
FIG. 3A shows a perspective view of the vehicle and apparatus of FIG. 1, wherein the vertical axis of Applicant's apparatus is offset from the vertical axis of the vehicle.

Referring now to FIGS. 2A and 3A, member 220 can be rotated in Y/Z plane to adjust the orientation of table 140 and umbrella assembly 160 with respect to vehicle 320. In the illustrated embodiment of FIG. 3A, vehicle 320 is parked on an inclined ground surface 305. Nevertheless, table 140 comprises a gravitationally level orientation, such that objects placed on top surface 144 of table 140 will not slide/roll off the table. In certain embodiments, table 140 further comprises leveling device 310 to assist in rotating member 220 within tubular member 210 such that table 140 comprises a gravitationally level orientation. As those skilled in the art will appreciate, leveling device 310 comprises an optically clear enclosure 312 which is partially filled with fluid 314, where the orientation of fluid 314 within enclosure 312 visually indicates the gravitational orientation of table 140.

Figure 3B:
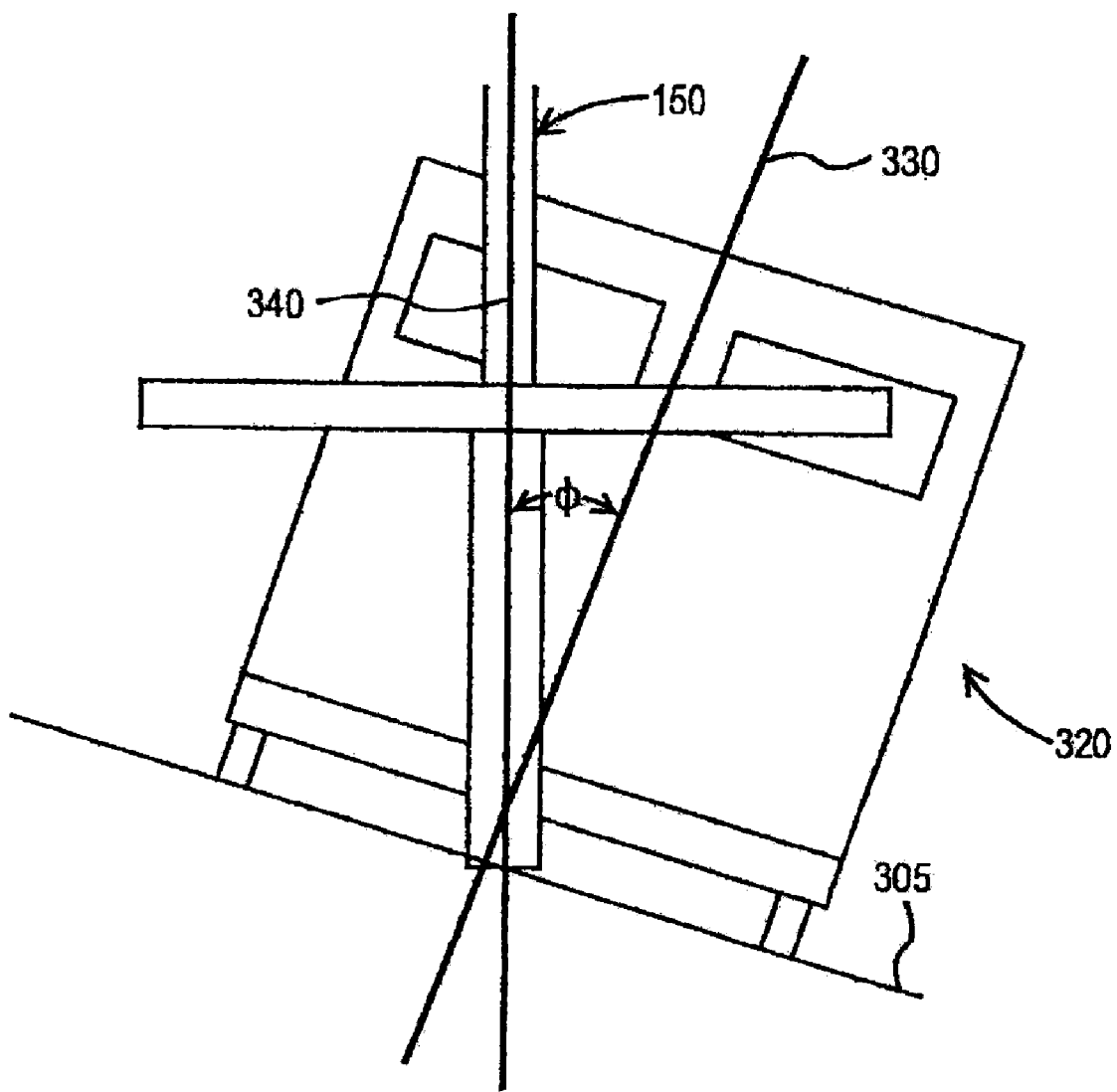
FIG. 3B graphically shows the vertical axis of Applicant's apparatus and the vertical axis of the vehicle.

Referring now to FIG. 3B, vehicle 320 has vertical axis 330, where that vertical axis 330 is perpendicular to ground surface 305. Umbrella shaft 150 has vertical axis 340. In the illustrated embodiments of FIGS. 2A and 2B, the umbrella shaft vertical axis 340 is offset from vehicle vertical axis 330 by angle $\Phi$. In embodiments wherein interior surface 214 of tubular member 210 is round, and wherein member 220 comprises a round cross-section, angle $\Phi$ is continuously adjustable. In embodiments, wherein interior surface 214 of tubular member 210 comprises a hexagonal cross-section, and wherein member 220 comprises a hexagonal cross-section, angle $\Phi$ is adjustable in 60 degree increments. As a general matter, where interior surface 214 of tubular member 210 is formed to comprise (N) sides, i.e. interior surface 214 comprises an (N) thagonal cross-section, and where member 220 also comprises that same (N) thagonal cross-section, then angle $\Phi$ is adjustable in 360/(N) degree increments.

Figure 4A:
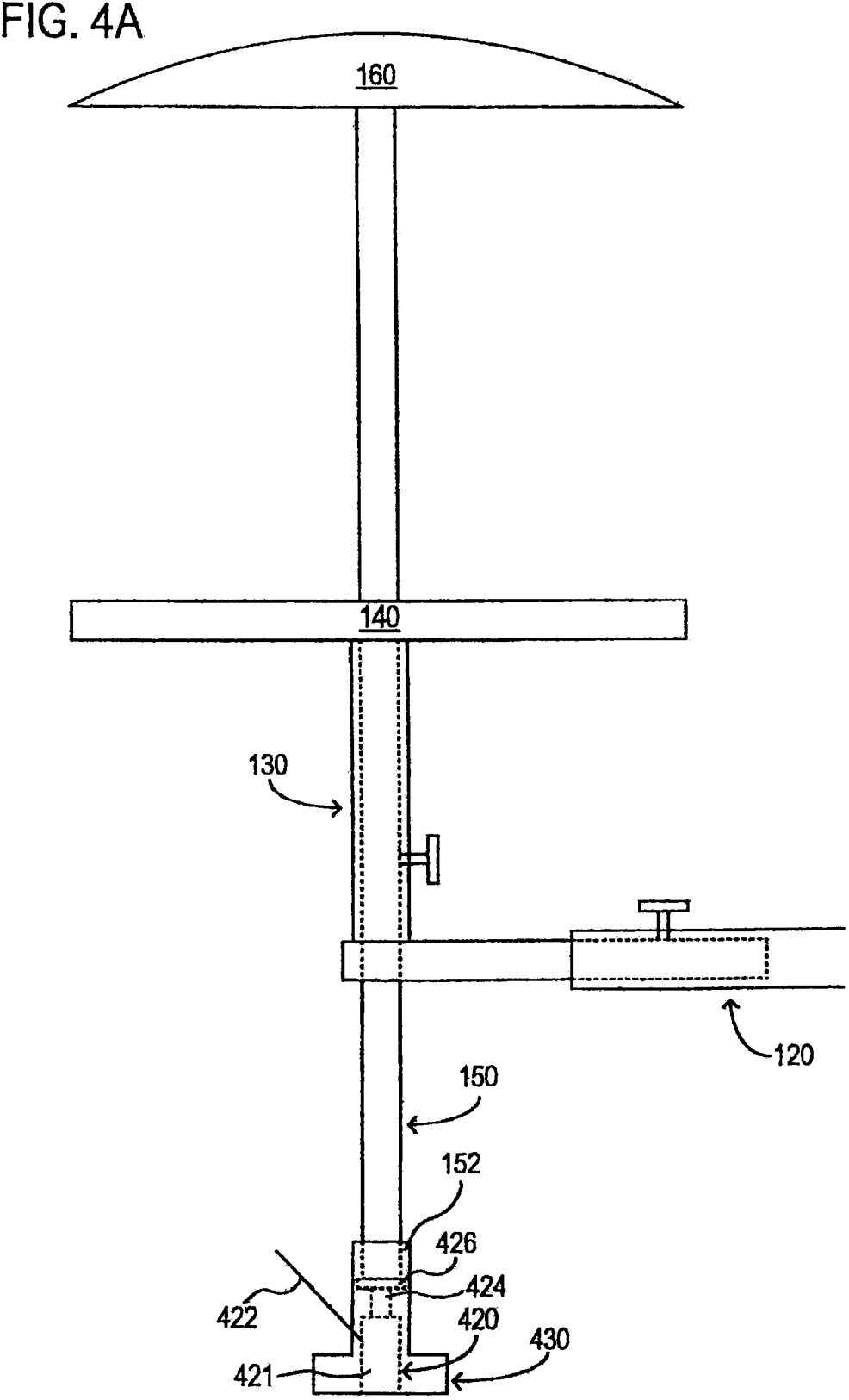
FIG. 4A is a side view of a one embodiment of Applicant's lifting apparatus disposed in the apparatus of claim 1.

In certain embodiments, Applicant's apparatus includes a lifting mechanism to adjust the height of umbrella assembly 160. For example, the illustrated embodiment of FIG. 4A includes base assembly 430. Assembly 430 comprises hydraulic lifting mechanism 420. Lifting mechanism 420 comprises handle 422, hydraulic actuator 421, and moveable shaft 424. In certain embodiments, platen 426 is disposed on the distal end of shaft 424.

Moving handle upwardly and downwardly raises shaft 424 upwardly, thereby increasing the height above the ground of umbrella assembly 160. After reversing the operational mechanism of lifting mechanism 420, moving handle upwardly and downwardly lowers shaft 424 upwardly, thereby decreasing the height above the ground of umbrella assembly 160.

In certain embodiments, Applicant's apparatus further comprises an electrical lifting mechanism. Referring now to FIG. 4B, power cable 440 interconnects the 12 Volt electrical system disposed in a vehicle, such as for example vehicle 110 or vehicle 320, and switch 450. Power cable 445 interconnects switch 450 and motor 423. Switch 450 comprises first actuator 452 and second actuator 454. In the illustrated actuator 452 comprises a first push-button and actuator 454 comprises a second push-button. Depressing actuator 452 causes motor 423 to move shaft 424 in a first direction. In certain embodiments, that first direction is upwardly, i.e. in the +Z direction. Depressing button 454 causes motor 423 to move shaft 424 in a second direction. In certain embodiments, that second direction is downwardly, i.e. in the −Z direction.

End 152 of umbrella shaft 150 rests on top of shaft 424, or optionally on top of platen 426. Depressing actuator 452 causes motor 423 to move shaft 424 upwardly thereby elevating umbrella assembly 160. Depressing button 454 causes motor 423 to move shaft 424 downwardly thereby lowering umbrella assembly 160.

Figure 5:
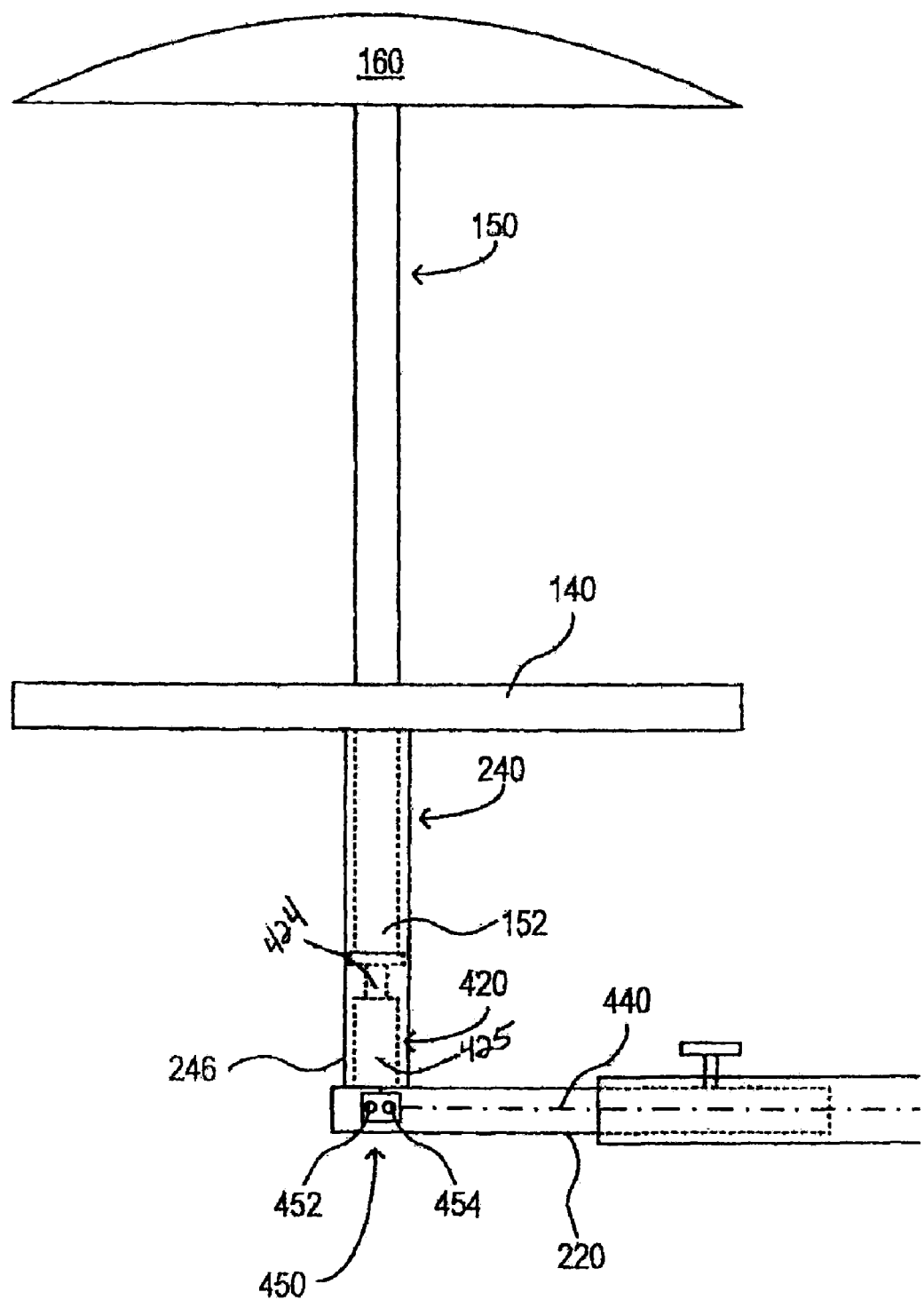
FIG. 5 is a side view of a second embodiment of Applicant's apparatus of claim 1, where that second embodiment includes the lifting apparatus of FIG. 4B.

In the illustrated embodiment of FIG. 5, lifting mechanism 420 is disposed within space 246 of tubular member 240, and switch 450 is disposed on member 220. Depressing actuator 452 causes motor 425 to move shaft 424 upwardly thereby elevating umbrella assembly 160. Depressing button 454 causes motor 425 to move shaft 424 downwardly thereby lowering umbrella assembly 160.

In certain embodiments, Applicant's apparatus further comprises a plurality of lights disposed on umbrella assembly 160, where those lights receive power from power cable 440. In yet other embodiments, Applicant's apparatus further comprises one or more power receptacles disposed on horizontal member 120, and/or table 140, wherein those one or more power receptacles receive power from power cable 440.

Referring now to FIG. 11, in certain embodiments a plurality of rechargeable batteries 1150 are disposed within horizontal assembly 120. FIG. 11 shows two rechargeable batteries 1152 and 1154. In other embodiments, Applicant's apparatus comprises one rechargeable battery disposed within horizontal assembly 120. In still other embodiments, Applicant's apparatus comprises more than two rechargeable batteries disposed within horizontal assembly 120.

Plurality of rechargeable batteries 1150 receive charging power from charging unit 1120 via power conduit 1122. Charging unit 1120 is capable of receiving 115 volt, 60 hertz, AC input power and/or 12 volt DC input power. Charging unit 1120 receives DC input power from DC power conduit 1110 which interconnects with the vehicular power system disposed in the attached vehicle.

Charging unit 1120 receives AC input power from receptacle 1130 which is disposed on the exterior of horizontal assembly 120. As those skilled in the art will appreciate, receptacle 1130 can be interconnected using an extension cord with a source of nominal 115 volt/60 hertz utility power. Moreover, plurality of batteries 1150 can be recharged using charging unit 1120, receptacle 1130, and utility power, when Applicant's apparatus is disposed adjacent a source of utility power.

Indicator 1140 is disposed on the exterior of horizontal assembly 120. Indicator 1140 emits light in proportion to the amount of input power being consumed by charging unit 1120. In certain embodiments, indicator 1140 comprises one or more light emitting diodes and/or gauges.

Plurality of batteries 1150 are electrically interconnected to switch 1155 via DC power conduit 1157. Switch 1155 is electrically interconnected with DC output power receptacle 1160 via DC power conduit 1158. When switch 1155 is closed, plurality of batteries 1150 provide DC power to DC output power receptacle 1160.

Plurality of batteries 1150 are electrically interconnected to power inverter 1170 which is disposed within horizontal assembly 120. Inverter 1170 receives DC input power from batteries 1150 and provides 115 volt, 60 hertz, AC power to switch 1175 via AC power conduit 1172. Switch 1175 is electrically interconnected with AC switch 1175. Switch 1175 is electrically interconnected with AC output receptacle 1180 via power conduit 1177. When switch 1175 is closed, inverter 1170 draws DC power from plurality of batteries 1150, converts that DC power to AC power, and provides that AC power to AC output receptacle 1180 via switch 1175 and power conduits 1172 and 1177.

Referring now to FIG. 8, in certain embodiments Applicant's apparatus permits the adjustment of table 140 and umbrella assembly 160 in a second plane, i.e. the X/Z plane, wherein the second plane is orthogonal to the first plane. FIG. 8 shows vehicle disposed on an incline 805. If horizontal assembly 120 could not be adjusted in the X/Z plane, then table 140 would not be level when vehicle 110 is parked on incline 805.

In the embodiment of Applicant's apparatus shown in FIGS. 8 and 9, horizontal assembly 120 comprises member 910, member 920, and member 930. Member 920 comprises a tubular member. Member 930 is dimensioned to be slidingly insertable within tubular member 920, such that the length of horizontal assembly 120 can be adjusted by increasing or decreasing the portion of member 930 disposed within member 920. The orientation of table 140 and umbrella assembly 160 can be adjusted in the Y/Z plane by rotating member 920 to the desired orientation and then releaseably fixturing member 930 to member 920 using fixturing means 230 in the manner described above.

The orientation of table 140 and umbrella assembly 160 can also be adjusted in the second X/Z plane. Leveling device 970 is disposed on member 920 to visually assist the adjustment of table 140 and umbrella assembly 160 in the VZ plane. Leveling device 970 comprises an optically clear enclosure which is partially filled with fluid, where the orientation of that fluid within the enclosure visually indicates the gravitational orientation of table 140.

Member 920 is adjustably attached to member 910 using plate 940. Plate 940 comprises proximal portion 942 and distal portion 944. Proximal portion 942 of plate 940 is attached to distal end 915 of member 910. Proximal end 912 of member 910 can be releaseably attached to a trailer hitch as described above. Plate 940 can be attached to end 915 using conventional attachment methods including, for example, welding, integral forming, mechanical attachment using nets and bolts, and the like. Distal portion 944 of plate 940 extends outwardly from end 915 of member 910.

Curved gear lock 950, comprising a plurality of gear teeth, is attached to the exterior surface of distal portion 944 of plate 940. Distal portion 944 of plate 940 is formed to include a threaded aperture extending therethrough adjacent to gear lock 950. End 922 of member 920 is formed to include an aperture therethrough. In certain embodiments, end 922 of member 920 is formed to include a threaded aperture therethrough After adjusting the orientation table 140 and umbrella assembly 160 in the X/Z plane, i.e. adjusting the orientation of member 920 with respect to member 910, threaded bolt 960 is inserted through the aperture formed in end 922 of member 920. In certain embodiments, threaded bolt 960 is threadedly engaged with, and through, the aperture formed in end 922 of member 920.

Threaded bolt 960 extends through the aperture formed in distal portion 944 of plate 940 such that threaded bolt 960 threadedly engages gear lock 950, thereby fixturing member 920 to member 910. In certain embodiments, threaded bolt 960 is threadedly engaged with, and through, the aperture in distal portion 944 of plate 940.

Figure 6:
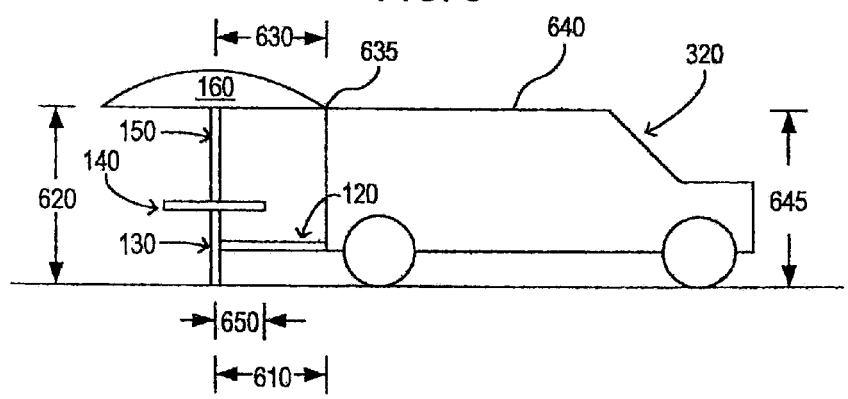
FIG. 6 is a side view showing certain dimensions of Applicant's apparatus with respect to a first attached vehicle.

Referring now to FIG. 6, Applicant's apparatus allows the distance 610 between vehicle 320 and vertical assembly 130 to be adjusted. In the illustrated embodiment of FIG. 6, table 140 comprises a radius 650. By radius of table 140, Applicant means the greatest straight-line distance from shaft 150 to an edge of table 140. Referring again to FIG. 3A, vehicle 320 comprises rear door 322 and rear door 324, each of which has a width 325. Distance 610 can be adjusted such that doors 322 and 324 can be opened and closed while Applicant's apparatus 100 remains interconnected to vehicle 320. More specifically, the length of assembly 120 can be adjusted such that distance 610 minus table radius 650 is greater than rear door width 325.

Applicant's apparatus allows distance 620, i.e. the height of umbrella assembly 160, to be adjusted. In certain embodiments, distances 610 and 620 are adjusted such that distal portion 635 of umbrella assembly 160 contacts roof 640 of vehicle 320. Radius 630 of umbrella assembly 160 can be dimensioned such that doors 322 and 324 can be opened and closed while umbrella assembly 160 remains attached to vehicle roof 640. In certain embodiments, radius 630 is about 3 feet. In certain embodiments, radius 630 is about 4 feet. In certain embodiments, radius 630 is about 5 feet. In certain embodiments, radius 630 is about 6 feet.

In certain embodiments, distal portion 635 of umbrella assembly 160 is releaseably attached to roof 640. In certain embodiments, such a releasable attachment comprises one or more hook and loop fasteners. In other embodiments, such a releasable attachment comprises one or more two-piece mechanical snap assemblies. In the illustrated embodiment of FIG. 6, the interior of vehicle 320 is protected from inclement weather, such as for example rain, snow, and the like, even if doors 322 and 324 are opened.

Figure 7:
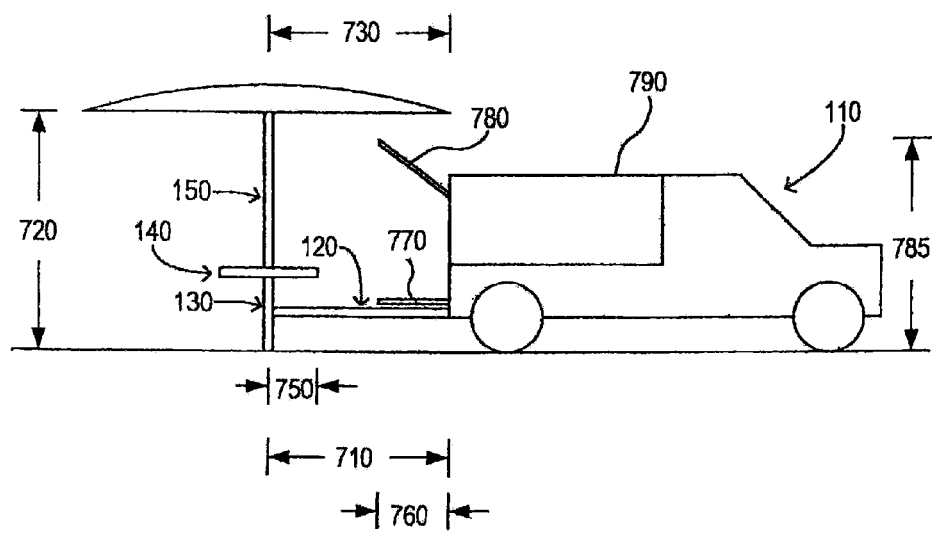
FIG. 7 is a side view showing certain dimensions of Applicant's apparatus with respect to a second attached vehicle.

Referring now to FIG. 7, Applicant's apparatus allows the distance 710 between vehicle 110 and vertical assembly 130 to be adjusted. In the illustrated embodiment of FIG. 7, vehicle 110 comprises tailgate 770 and pivoting hatch-back 780. As those skilled in the art will appreciate, certain vehicles comprise a pivoting hatch-back that extends from the roof to the floor of the vehicle. References herein to "pivoting hatch-back" include the embodiment illustrated in FIG. 7 and also to embodiments wherein the pivoting hatch-back extends from the roof to the floor.

When opened, tailgate 770 extends a horizontal distance 760 backwardly from vehicle 110. When opened, hatch-back 780 extends a horizontal distance 760 backwardly from vehicle 110, and extends a vertical distance 785 above the ground. The length of assembly 120 can be adjusted such tailgate 770 and/or hatch-back 780 can be opened and closed while Applicant's apparatus 100 remains interconnected to vehicle 110. More specifically, the length of assembly 120 can be adjusted such that distance 710 minus table radius 750 is greater than distance 760.

Applicant's apparatus allows distance 720, i.e. the height of umbrella assembly 160, to be adjusted. In certain embodiments, distances 710 and 720 are adjusted such that distance 710 minus table radius 750 is greater than distance 760, and such that distance 720 is greater than distance 785. In the illustrated embodiment of FIG. 7, distance 720 is adjusted such that distal end 735 of umbrella assembly 160 is positioned over a portion of roof 790.

Radius 730 of umbrella assembly 160 can be dimensioned such that tailgate 770 and/or hatch-back 780 can be opened and closed while Applicant's apparatus 100 remains interconnected to vehicle 110. In certain embodiments, radius 730 is about 3 feet. In certain embodiments, radius 730 is about 4 feet. In certain embodiments, radius 730 is about 5 feet. In certain embodiments, radius 730 is about 6 feet.

In the illustrated embodiment of FIG. 7, distance 710 minus table radius 750 is greater than distance 760, distance 720 is greater than distance 785, and radius 730 is greater than distance 710. In the illustrated embodiment of FIG. 7, the interior of vehicle 110 is protected from inclement weather, such as for example rain, snow, and the like, even if tailgate 770 and/or hatch-back 780 are opened.

Figure 14A:
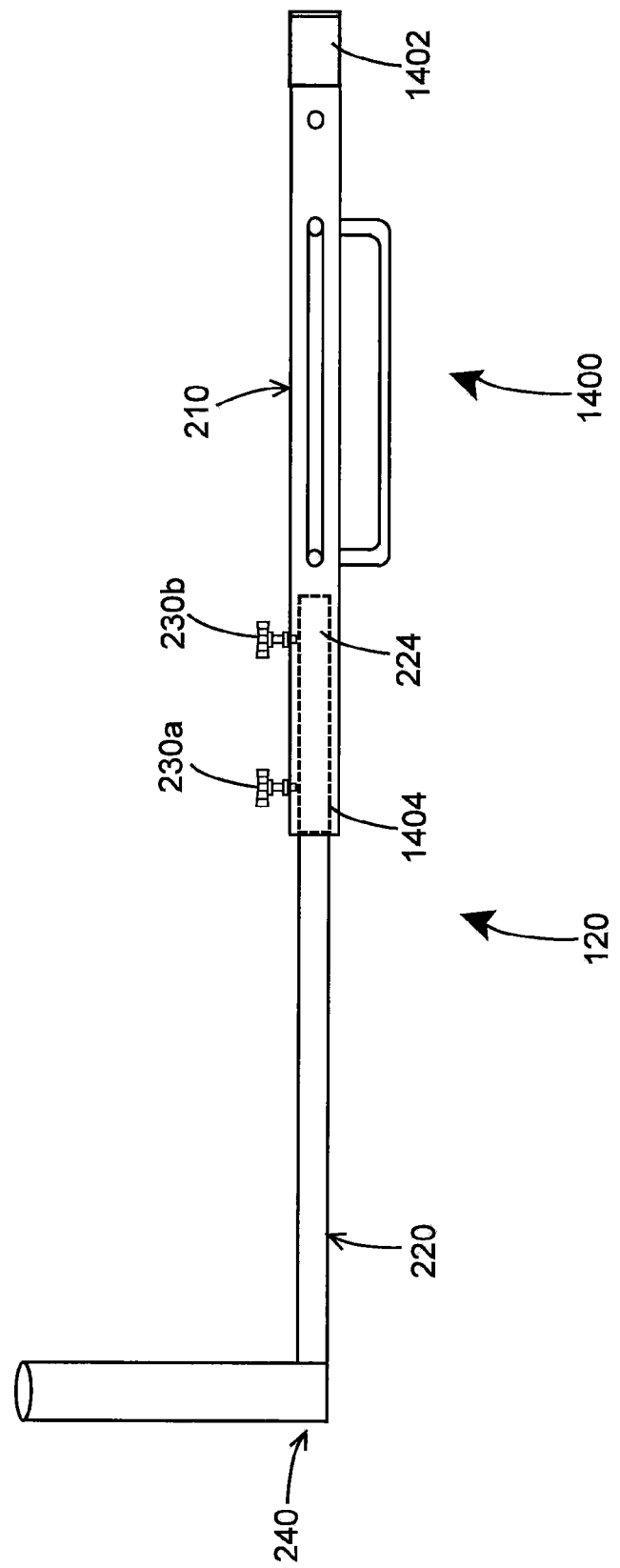
FIG. 14A is a side view of an embodiment of Applicant's horizontal assembly which comprises Applicant's horizontal tubular member comprising two handles.

In certain embodiments, portions of Applicant's portable table assembly can be separately used by firefighters, police officers, and/or military personnel, in emergent situations. In the illustrated embodiment of FIG. 14A, horizontal assembly 120 comprises member 220 in combination with tubular device 1400, wherein device 1400 can be separately used as a one person ram device. When used as part of Applicant's portable table assembly, first end 1402 of tubular device 1400 is removeably inserted into, and secured to, a trailer hitch receiving assembly 115. End 224 of member 220 is removeably inserted into end 1404 of tubular device 1400. After selecting the desired length of member 220 extending outwardly from end 1404 of tubular device 1400, securing means 2304 and 2306 are tightened. Thereafter, table 140 can be attached to tubular member 240, and umbrella shaft 150 can be disposed through tubular member 240.

Referring now to FIG. 14B, device 1400 comprises tubular member 210, first handle 1410, second handle 1420, fixturing means 230a, and fixturing means 230b. Handle 1410 comprises a U-shaped member comprising member 1412 attached to and extending outwardly from tubular member 210, member 1414 attached to and extending outwardly from tubular member 210, and member 1416 which interconnects the distal ends of members 1412 and 1414. In certain embodiments, members 1412, 1414, and 1416 comprise an integral assembly.

Handle 1420 comprises a U-shaped member comprising member 1422 attached to and extending outwardly from tubular member 210, member 1424 attached to and extending outwardly from tubular member 210, and member 1426 which interconnects the distal ends of members 1422 and 1424. In certain embodiments, members 1422, 1424, and 1426 comprise an integral assembly.

In certain embodiments, handle 1410 and handle 1420 each comprise a circular cross-section. In other embodiments, handle 1410 and handle 1420 each comprise a square cross-section. If end 1402 of device 1400 is removed from trailer hitch receiving assembly 115, and if member 220 is removed from end 1404 of device 1400, then handles 1410 and 1420 can be grasped by a person and used as a battering ram for various entry purposes. Such entry purposes include, without limitation, emergency entry into a structure by firefighters. Emergency entry into a structure by police officers. Emergency entry into a structure by military personnel.

In addition, end 1402 of device 1400 is formed to include an aperture 1430 extending therethrough. As described more fully herein, end 1402 can be inserted into a portion of a variety of tools, and a fixturing bolt can be disposed through the tool end and aperture 1430 to releaseably secure the tool to device 1400.

Figure 15:
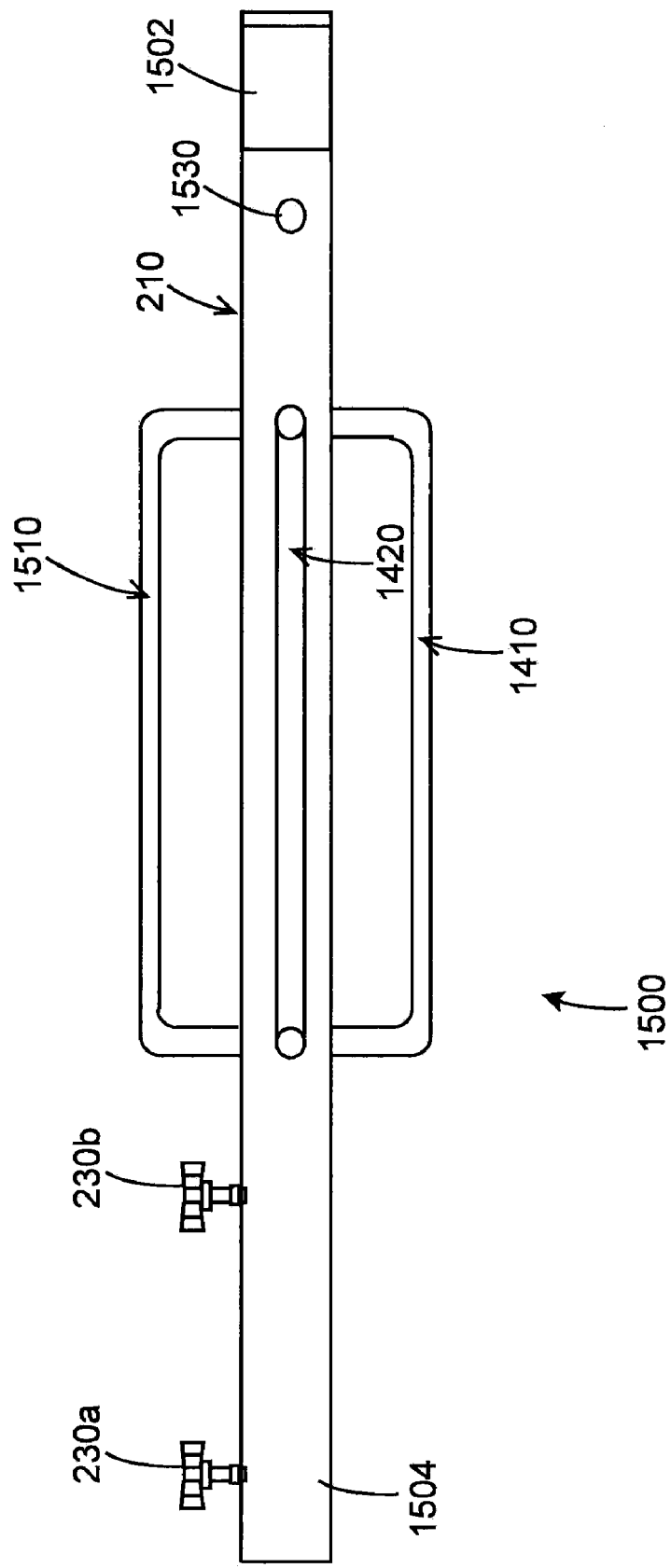
FIG. 15 is a side view of an embodiment of Applicant's horizontal tubular member which comprises three handles.

Referring now to FIG. 15, device 1500 comprises tubular member 210, first handle 1410, second handle 1420, third handle 1510, fixturing means 230a, and fixturing means 230b. If end 1502 of device 1500 is removed from trailer hitch receiving assembly 115, and if member 220 is removed from end 1504 of device 1500, then handles 1410, 1420, and 1510, can be grasped by two persons and used as a battering ram for various entry purposes. Such entry purposes include, without limitation, emergency entry into a structure by firefighters. Emergency entry into a structure by police officers. Emergency entry into a structure by military personnel.

In addition, end 1502 of device 1400 is formed to include an aperture 1530 extending therethrough. As described more fully herein, end 1502 can be inserted into a portion of a variety of tools, and a fixturing bolt can be disposed through the tool end and aperture 1530 to releaseably secure the tool to device 1500.

Figure 36:
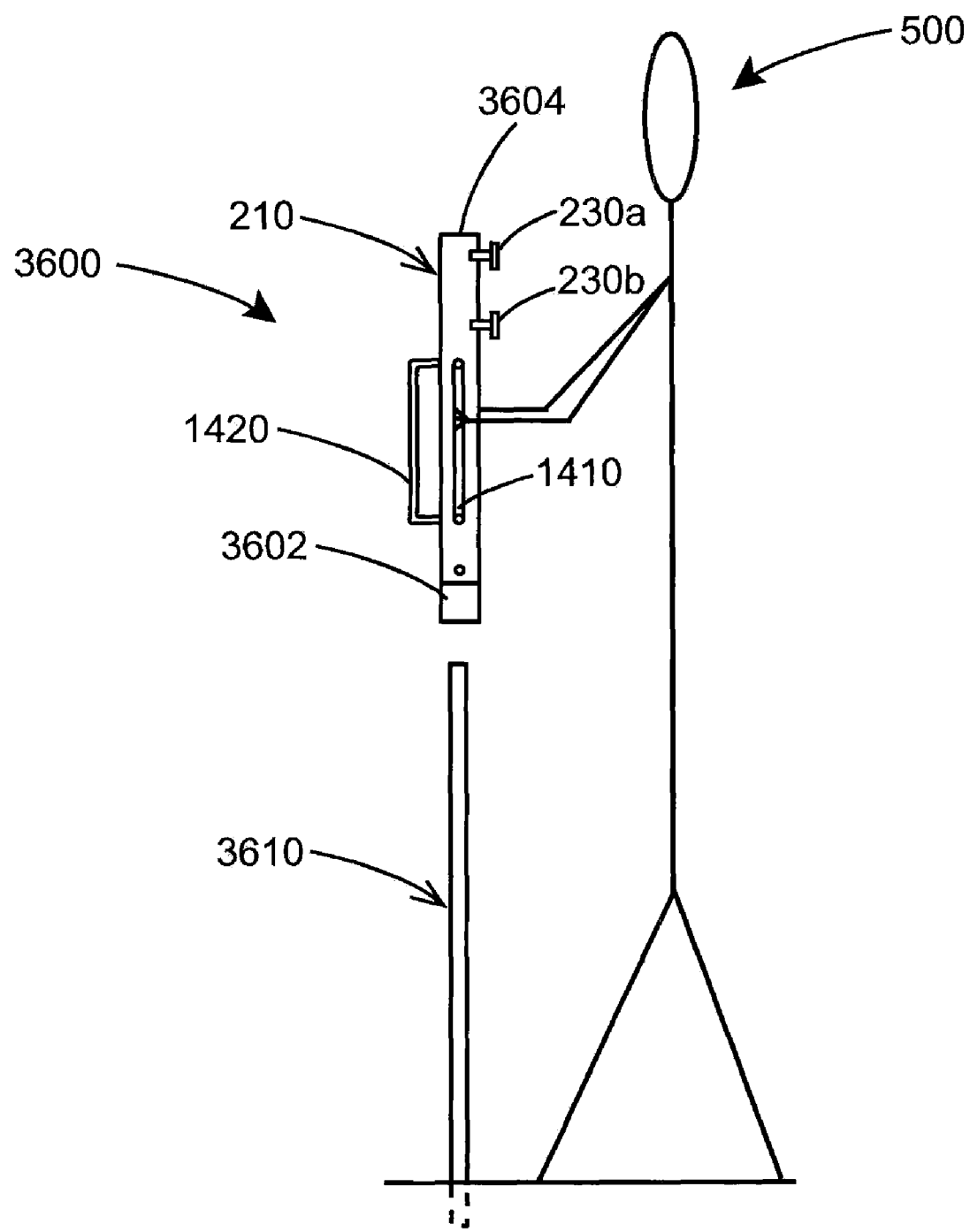
FIG. 36 shows the horizontal tubular member of FIG. 15 modified as a sledge hammer.
Figure 37:
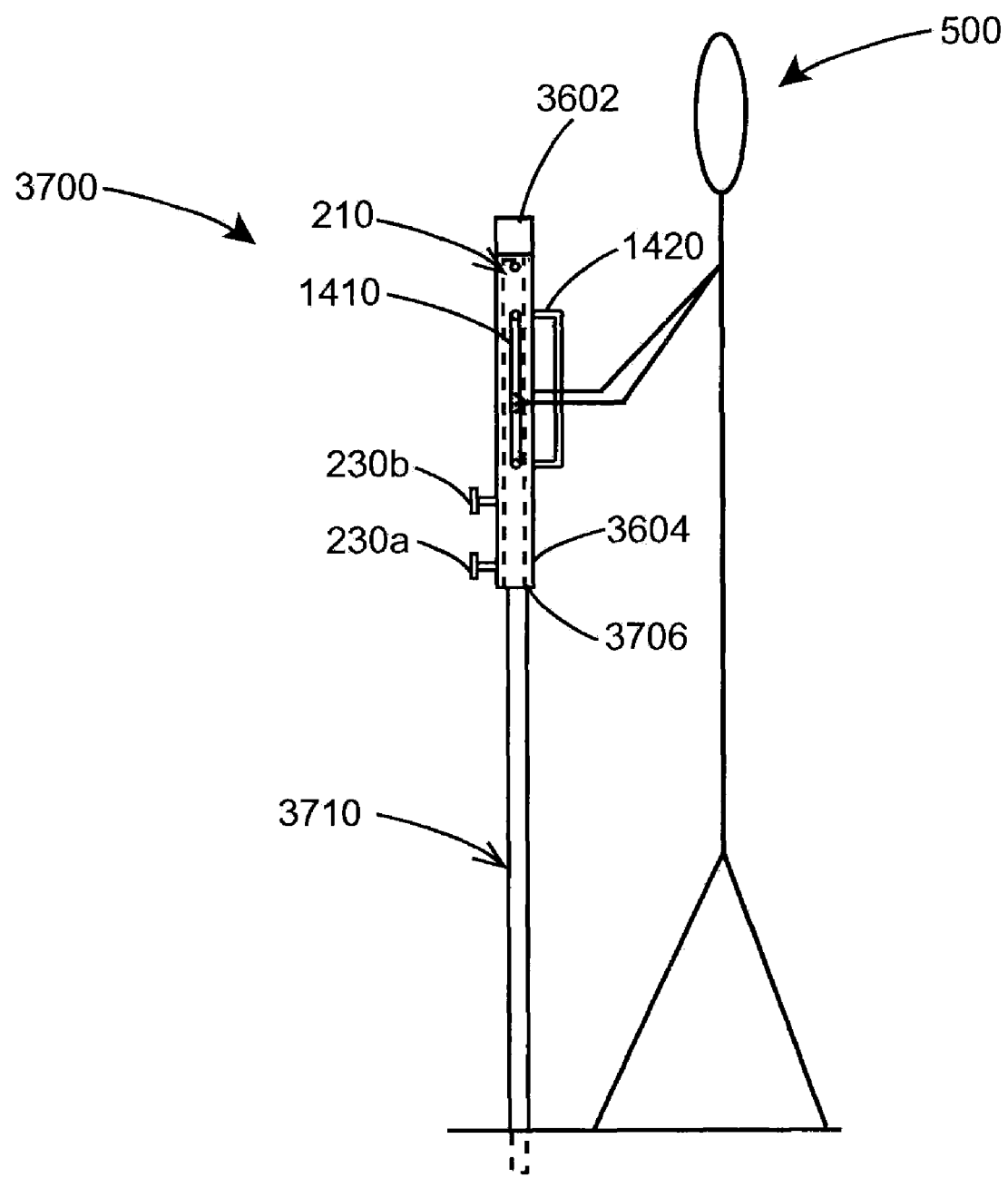
FIG. 37 shows the horizontal tubular member of FIG. 15 modified as a driver.

In certain embodiments device 1500 is modified to have a weighted end. In such embodiments, modified device 1500 may be used as a sledge hammer or driver. Such embodiments are illustrated in FIGS. 36 and 37. Turning to FIG. 36, sledge hammer tool 3600 comprises tubular member 210, first handle 1410, second handle 1420, and, in certain embodiments, third handle 1510 (not shown). Tool 3600 further comprises fixturing means 230*a*, fixturing means 230*b*, and weighted end 3602. In certain embodiments, weighted end 3602 is heavier than end 3604. In other embodiments, weighted end 3602 is the same weight as end 3604. In certain embodiments, weighted end 3602 comprises the a different material than tubular member 210. In certain embodiments, weighted end 3602 comprises the same material as tubular member 210.

When weighted end 3602 of tool 3600 is removed from trailer hitch receiving assembly 115 and member 220 is removed from end 3604 of tool 3600, tool 3600 can then be used as a sledge hammer to apply an impulse to object 3610. In certain embodiments, handles 1410 and 1510 are grasped by a single person and used to manipulate tool 3600 into striking object 3610. In such embodiments, tool 3600 is proportioned and weighted such that it can be lifted and manipulated by a single person. In other embodiments, handles 1410, 1420, and 1510 are grasped by two persons. In such embodiments, tool 3600 may be proportioned and weighted such that more than one person is needed to lift and manipulate tool 3600.

In certain embodiments, by reversing the orientation of tool 3600, tool 3600 may be used as a driver. Such an embodiment is illustrated as driver tool 3700 of FIG. 37. As with tool 3600, tool 3700 comprises tubular member 210, first handle 1410, second handle 1420, and, in certain embodiments, third handle 1510 (not shown). Tool 3700 further comprises fixturing means 230*a*, fixturing means 230*b*, and weighted end 3602.

To use tool 3700 a driver to drive object 3710 into the ground (or other surface), object 3710 is inserted into tubular member 210 via aperture 3706 of end 3604. Fixturing means 230*a* and 230*b* are removed or withdrawn such that aperture 3706 is unobstructed. Tool 3700 is then lifted by user 500 such that weighted end 3602 is at a distance above object 3710 while a portion of object 3710 remains within aperture 3706. Weighted end 3602 is then driven down onto object 3710, driving object 3710 into the ground or other surface.

Figure 16A:
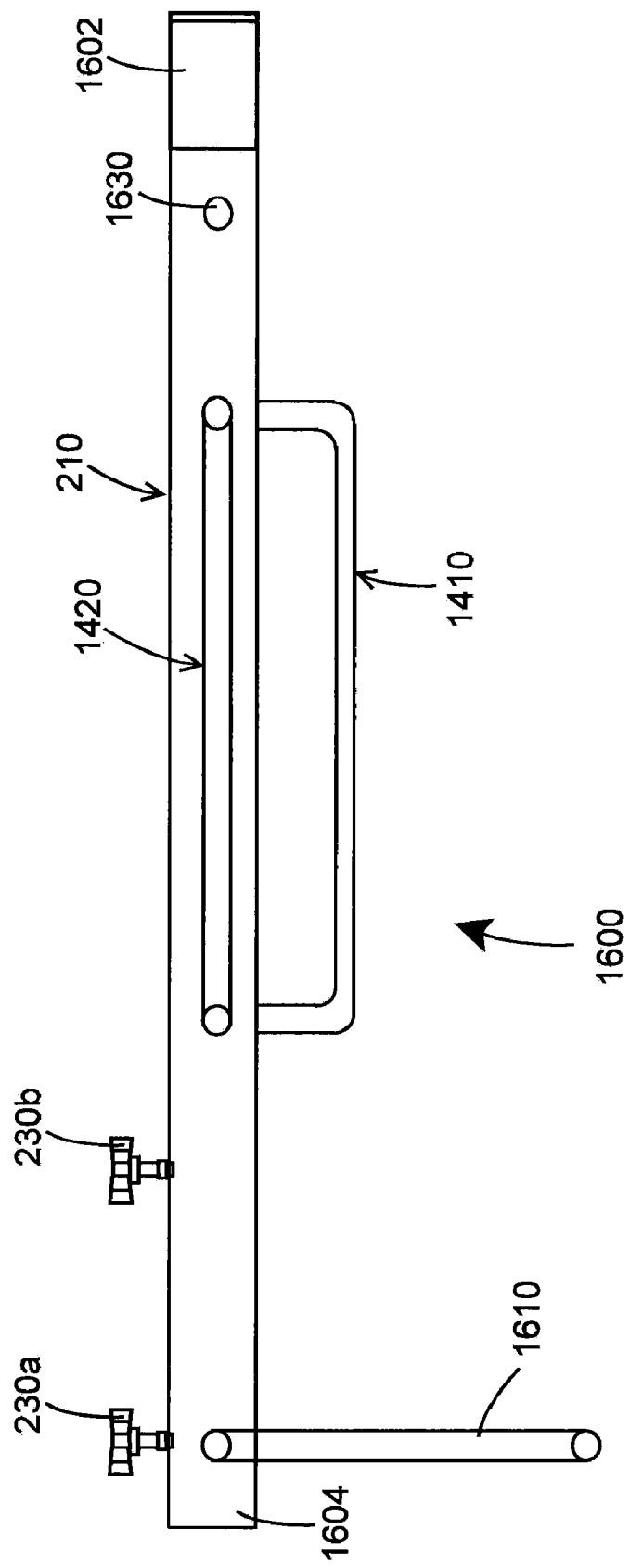
FIG. 16A shows first view of Applicant's horizontal tubular member which comprises two U-shaped handles and a circular handle.
Figure 16B:
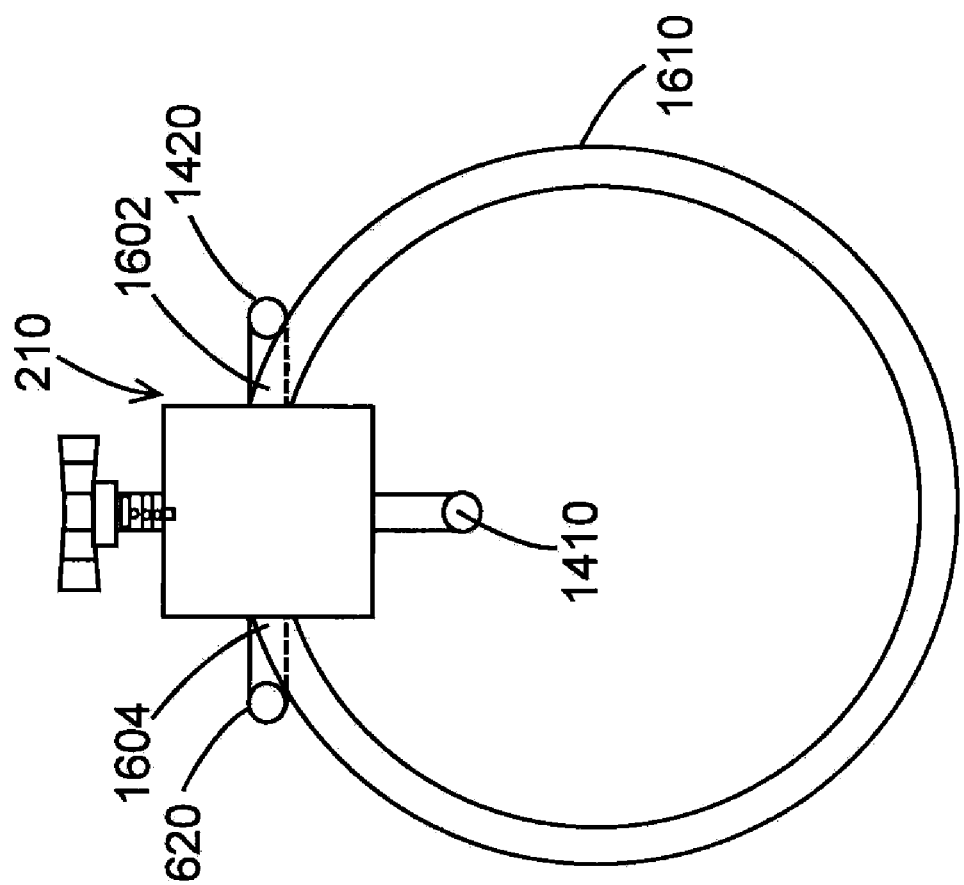
FIG. 16B is a front view of the apparatus of FIG. 16A.

Referring now to FIGS. 16A and 16B, device 1600 comprises tubular member 210, first handle 1410, second handle 1420, third handle 1610, fixturing means 230*a*, and fixturing means 230*b*. Third handle 1610 comprises a circular shape with first end 1602 attached to and extending outwardly from a first side of tubular member 210, and second end 1604 attached to and extending outwardly from a second and opposing side of tubular member 210.

If end 1602 of device 1600 is removed from trailer hitch receiving assembly 115, and if member 220 is removed from end 1604 of device 1500, then handles 1410, 1420, and 1610, can be grasped by two persons and used as a battering ram for various entry purposes. Such entry purposes include, without limitation, emergency entry into a structure by firefighters. Emergency entry into a structure by police officers. Emergency entry into a structure by military personnel.

In addition, end 1602 of device 1400 is formed to include an aperture 1630 extending therethrough. As described more fully herein, end 1602 can be inserted into a portion of a variety of tools, and a fixturing bolt can be disposed through the tool end and aperture 1630 to releaseably secure the tool to device 1600.

Figure 17A:
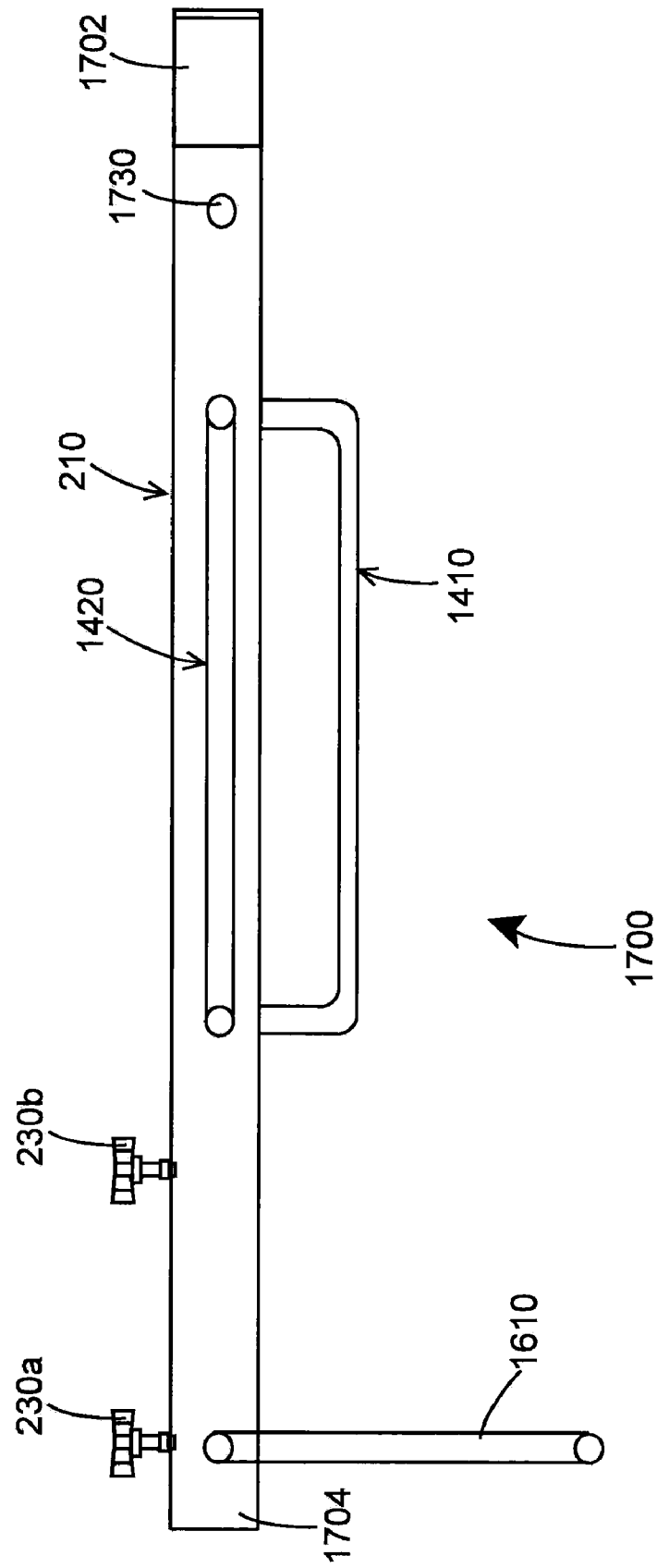
FIG. 17A shows first view of Applicant's horizontal tubular member which comprises three U-shaped handles and a circular handle.

Referring now to FIGS. 17A and 17B, device 1700 comprises tubular member 210, first handle 1410, second handle 1420, third handle 1610, and fourth handle 1710, fixturing means 230*a*, and fixturing means 230*b*. Fourth handle 1710 comprises a U-shaped member having the two ends attached to tubular member 210, such that handles 1420 and 1710 are disposed on opposing sides of tubular member 210.

If end 1702 of device 1700 is removed from trailer hitch receiving assembly 115, and if member 220 is removed from end 1704 of device 1500, then handles 1410, 1420, 1610, and 1710, can be grasped by two persons and used as a battering ram for various entry purposes. Such entry purposes include, without limitation, emergency entry into a structure by firefighters. Emergency entry into a structure by police officers. Emergency entry into a structure by military personnel.

In addition, end 1702 of device 1400 is formed to include an aperture 1730 extending therethrough. As described more fully herein, end 1702 can be inserted into a portion of a variety of tools, and a fixturing bolt can be disposed through the tool end and aperture 1730 to releaseably secure the tool to device 1700.

Figure 18A:
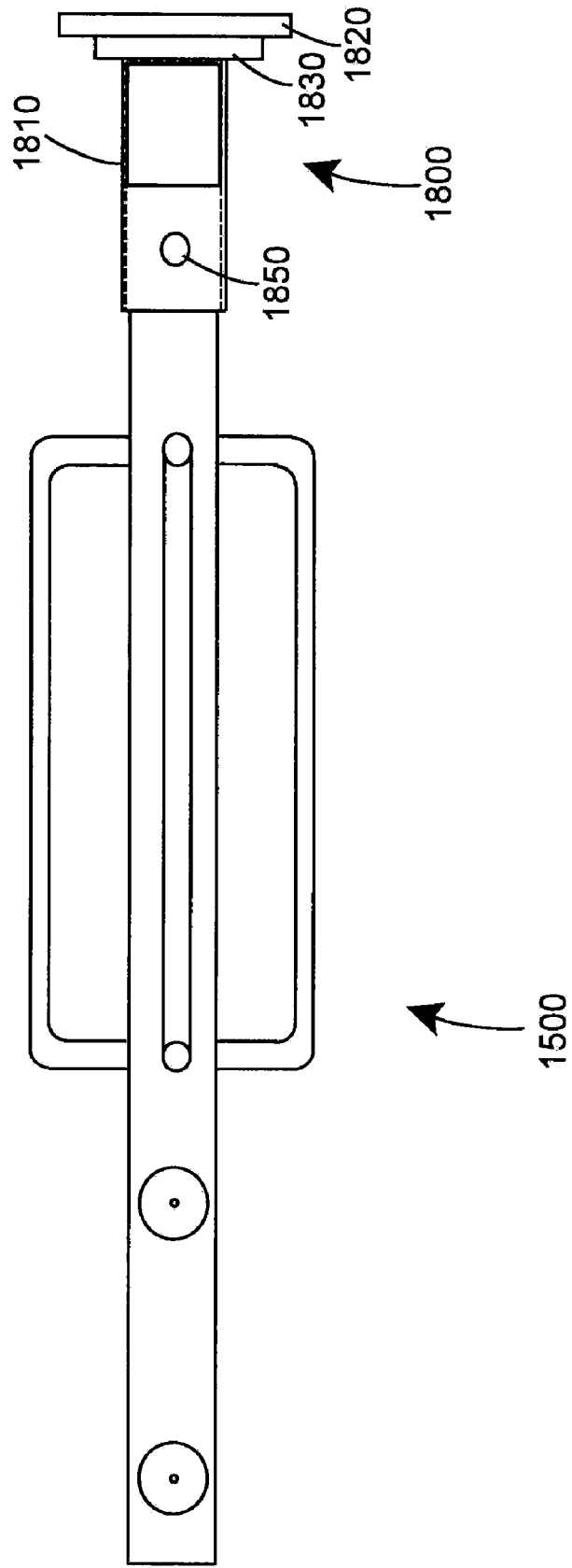
FIG. 18A shows the horizontal tubular member of FIG. 15 in combination with a backup tool.

In the illustrated embodiment of FIG. 18A, backup tool 1800 is shown releaseably attached to device 1500. Referring now to FIGS. 18A and 18B, backup tool 1800 comprises tubular body 1810 formed to include aperture 1840 (FIG. 18B) extending therethrough. First planar member 1830 is attached to end 1812 of tubular body 1810. Second planar member 1820 is attached to first planar member 1830, wherein second planar member 1820 comprises a greater surface area than does first planar member 1830.

End 1502 of device 1500 can be inserted into end 1814 of tubular body 1810. Apertures 1530 (FIG. 15) and 1840 can then be aligned, and cross bolt 1850 (FIG. 18A) can be inserted through apertures 1840 and 1530 to secure tool 1800 to device 1500. Tool 1800 can be similarly used with any one of devices 1400 (FIGS. 14A, 14B), 1600 (FIGS. 16A, 16B), and/or 1700 (FIGS. 17A, 17B).

Figure 19A:
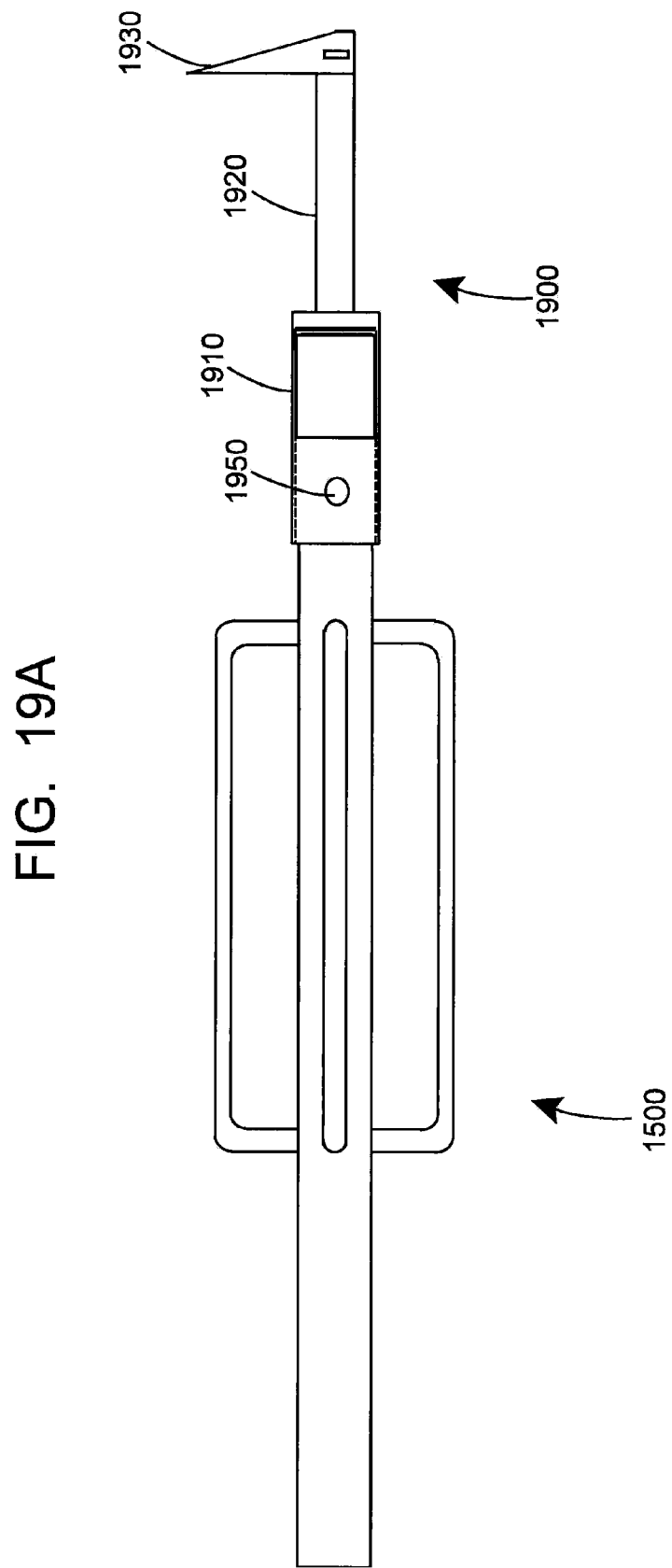
FIG. 19A shows the horizontal tubular member of FIG. 15 in combination with a leverage tool.
Figure 19B:
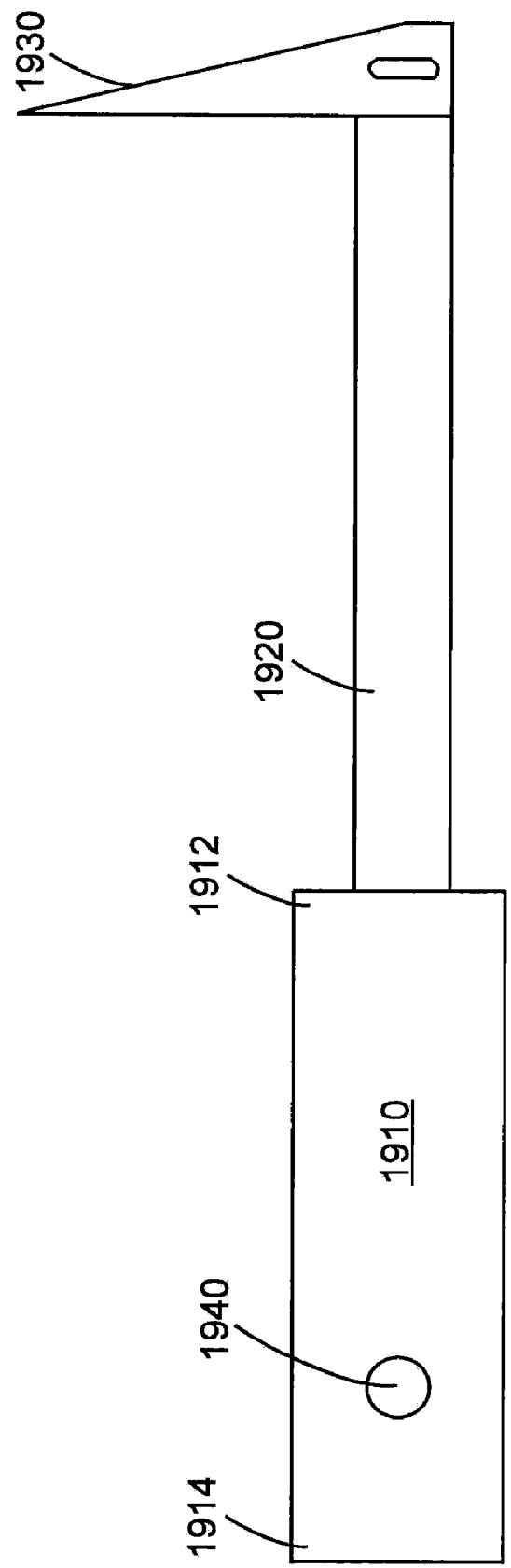
FIG. 19B shows the leverage tool of FIG. 19A.

In the illustrated embodiment of FIG. 19A, leverage tool 1900 is shown releaseably attached to device 1500. Referring now to FIGS. 19A and 19B, leverage tool 1900 comprises tubular body 1910 formed to include aperture 1940 (FIG. 19B) extending therethrough. Extension member 1920 is attached to end 1912 of tubular body 1910 and extends outwardly therefrom. In certain embodiments, extension member 1920 comprises a metal rod having a circular cross-section. Triangular member 1930 is attached to the distal end of extension member 1920.

End 1502 of device 1500 can be inserted into end 1914 of tubular body 1910. Apertures 1530 (FIG. 15) and 1940 can then be aligned, and cross bolt 1950 (FIG. 19A) can be inserted through apertures 1940 and 1530 to secure tool 1900 to device 1500. Tool 1900 can be similarly used with any one of devices 1400 (FIGS. 14A, 14B), 1600 (FIGS. 16A, 16B), and/or 1700 (FIGS. 17A, 17B).

Figure 20B:
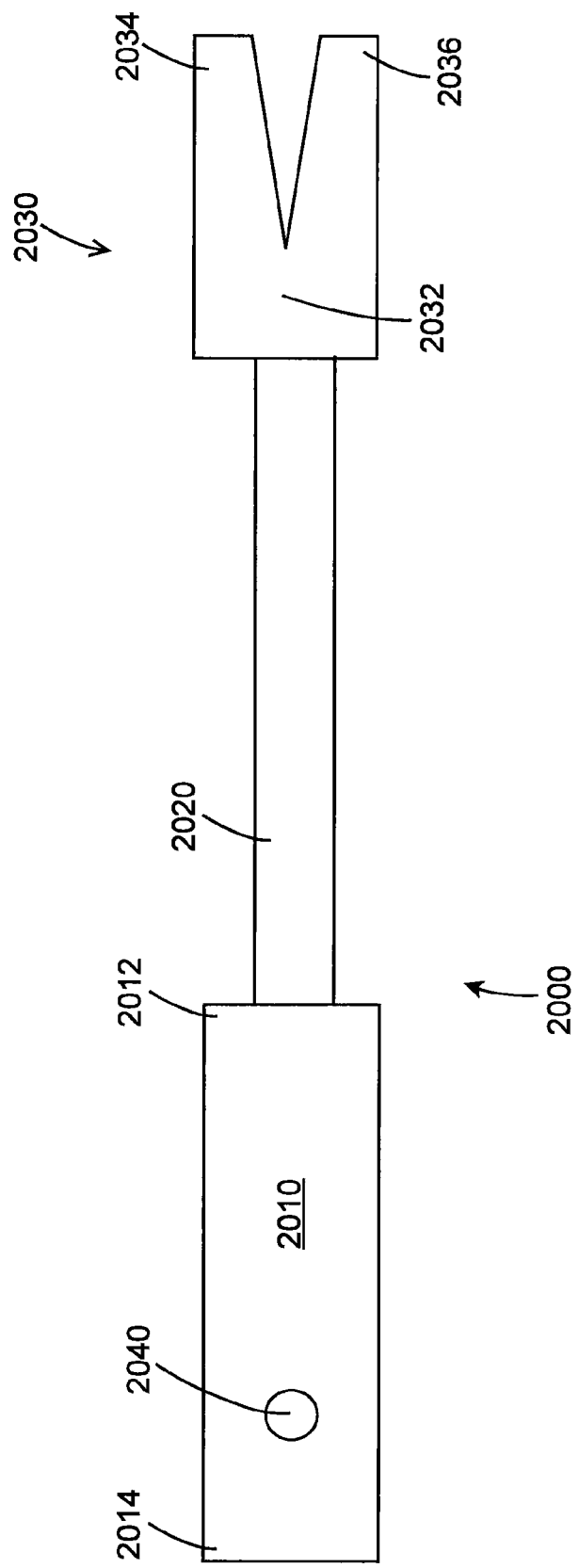
FIG. 20B shows the pry bar tool of FIG. 20A.

In the illustrated embodiment of FIG. 20A, pry bar tool 2000 is shown releaseably attached to device 1500. Referring now to FIGS. 20A and 20B, leverage tool 2000 comprises tubular body 2010 formed to include aperture 2040 (FIG. 19B) extending therethrough. Extension member 2020 is attached to end 2012 of tubular body 2010 and extends outwardly therefrom. Slotted member 2030 is attached to the distal end of extension member 2020. Slotted member 2030 comprises base portion 2032, first tine 2034 attached to and extending outwardly from base portion 2032, and second tine 2036 attached to and extending outwardly from base portion 2032.

End 1502 of device 1500 can be inserted into end 2014 of tubular body 2010. Apertures 1530 (FIG. 15) and 2040 can then be aligned, and cross bolt 2050 (FIG. 20A) can be inserted through apertures 2040 and 1530 to secure tool 2000 to device 1500. Tool 2000 can be similarly used with any one of devices 1400 (FIGS. 14A, 14B), 1600 (FIGS. 16A, 16B), and/or 1700 (FIGS. 17A, 17B).

Figure 21A:
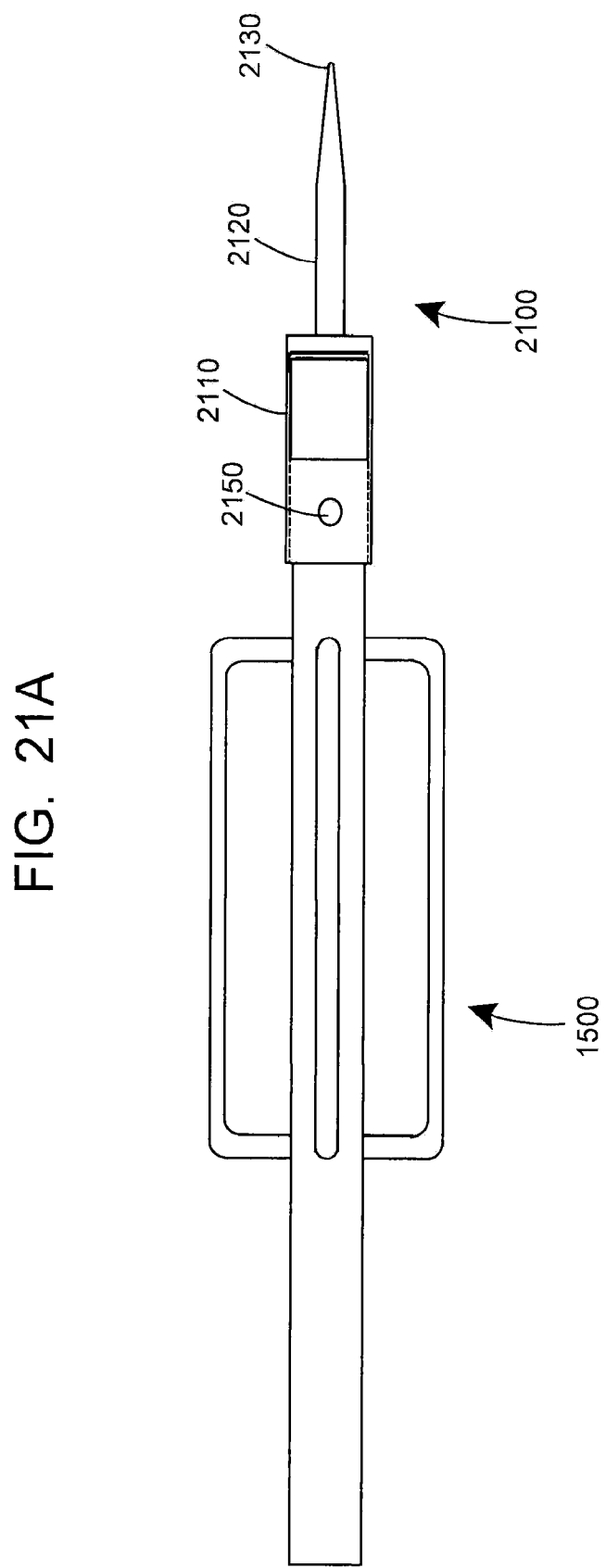
FIG. 21A shows the horizontal tubular member of FIG. 15 in combination with a jackhammer point tool.
Figure 21B:
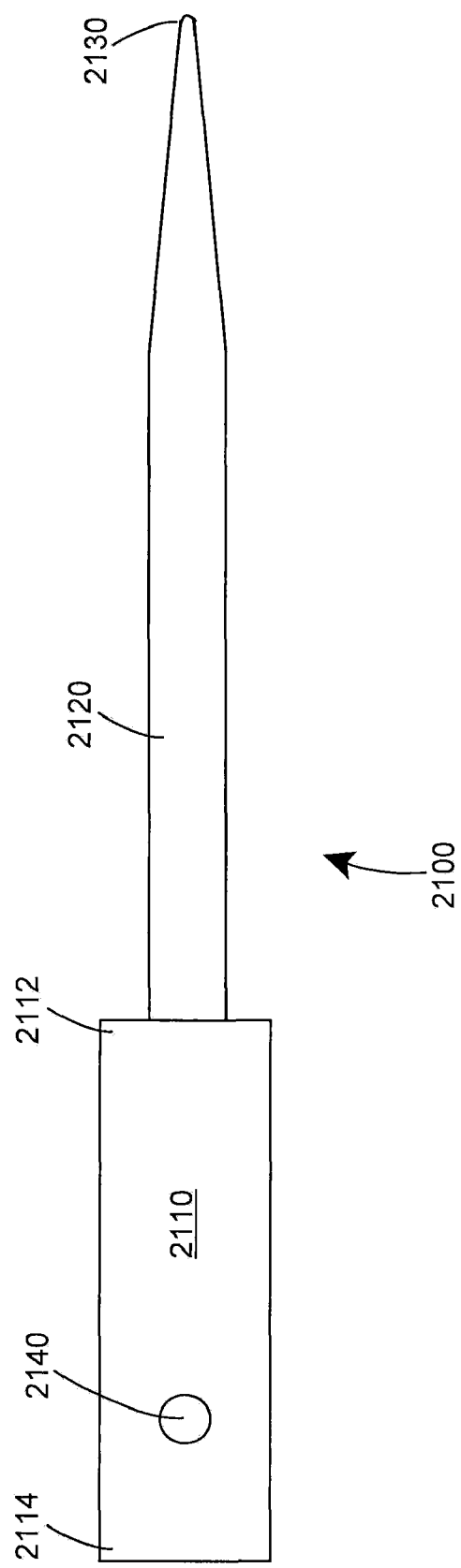
FIG. 21B shows the jackhammer point tool of FIG. 21A.

In the illustrated embodiment of FIG. 21A, jackhammer point tool 2100 is shown releaseably attached to device 1500. Referring now to FIGS. 21A and 21B, jackhammer point tool 2100 comprises tubular body 2110 formed to include aperture 2140 (FIG. 21B) extending therethrough. Extension member 2120 is attached to end 2112 of tubular body 2110 and extends outwardly therefrom. Distal end 2130 of member 2120 tapers to a point.

End 1502 of device 1500 can be inserted into end 2114 of tubular body 2110. Apertures 1530 (FIG. 15) and 2140 can then be aligned, and cross bolt 2150 (FIG. 21A) can be inserted through apertures 2140 and 1530 to secure tool 2100 to device 1500. Tool 2100 can be similarly used with any one of devices 1400 (FIGS. 14A, 14B), 1600 (FIGS. 16A, 16B), and/or 1700 (FIGS. 17A, 17B).

Figure 22A:
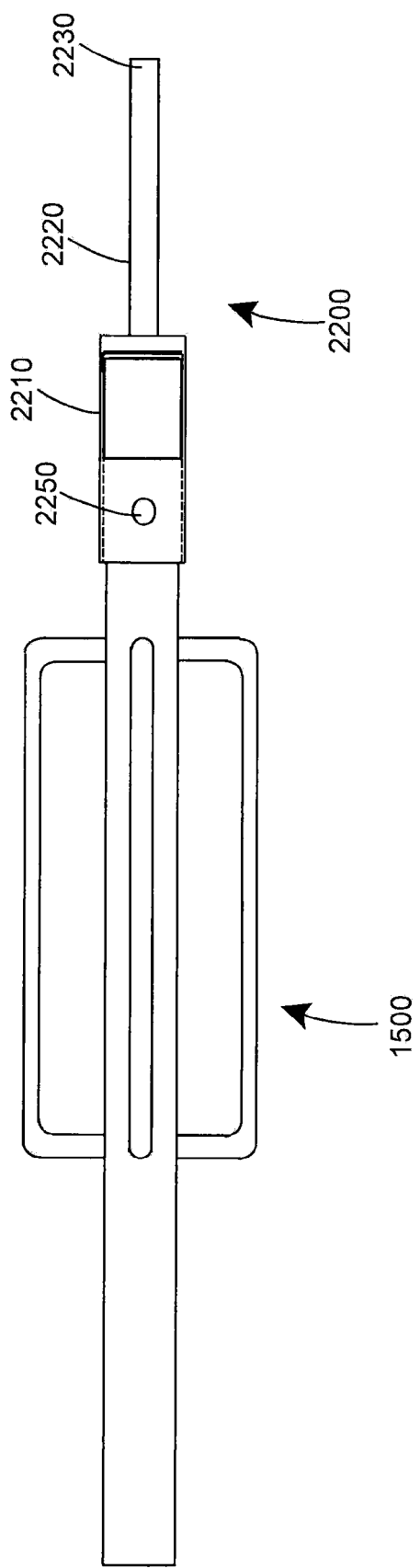
FIG. 22A shows the horizontal tubular member of FIG. 15 in combination with a chisel tool.
Figure 22B:
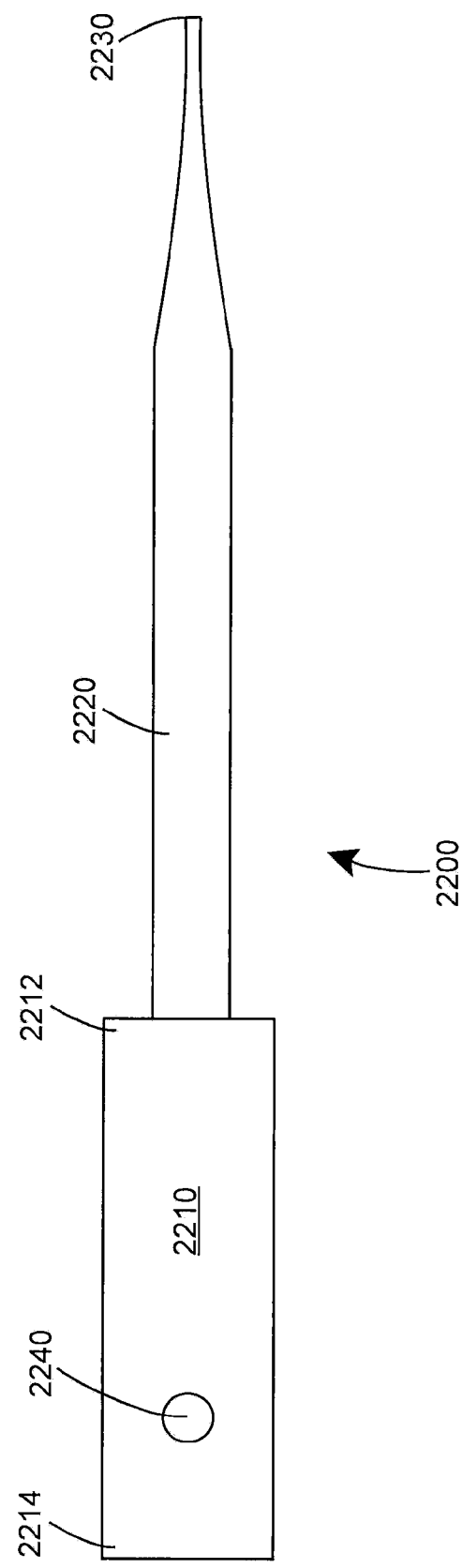
FIG. 22B shows the chisel tool of FIG. 22A.

In the illustrated embodiment of FIG. 22A, chisel tool 2200 is shown releaseably attached to device 1500. Referring now to FIGS. 22A and 22B, chisel tool 2200 comprises tubular body 2210 formed to include aperture 2240 (FIG. 22B) extending therethrough. Extension member 2220 is attached to end 2212 of tubular body 2210 and extends outwardly therefrom. Distal end 2230 of extension member 2220 tapers to a chisel 2230.

End 1502 of device 1500 can be inserted into end 2214 of tubular body 2210. Apertures 1530 (FIG. 15) and 2240 can then be aligned, and cross bolt 2250 (FIG. 22A) can be inserted through apertures 2240 and 1530 to secure tool 2200 to device 1500. Tool 2200 can be similarly used with any one of devices 1400 (FIGS. 14A, 14B), 1600 (FIGS. 16A, 16B), and/or 1700 (FIGS. 17A, 17B).

Figure 23B:
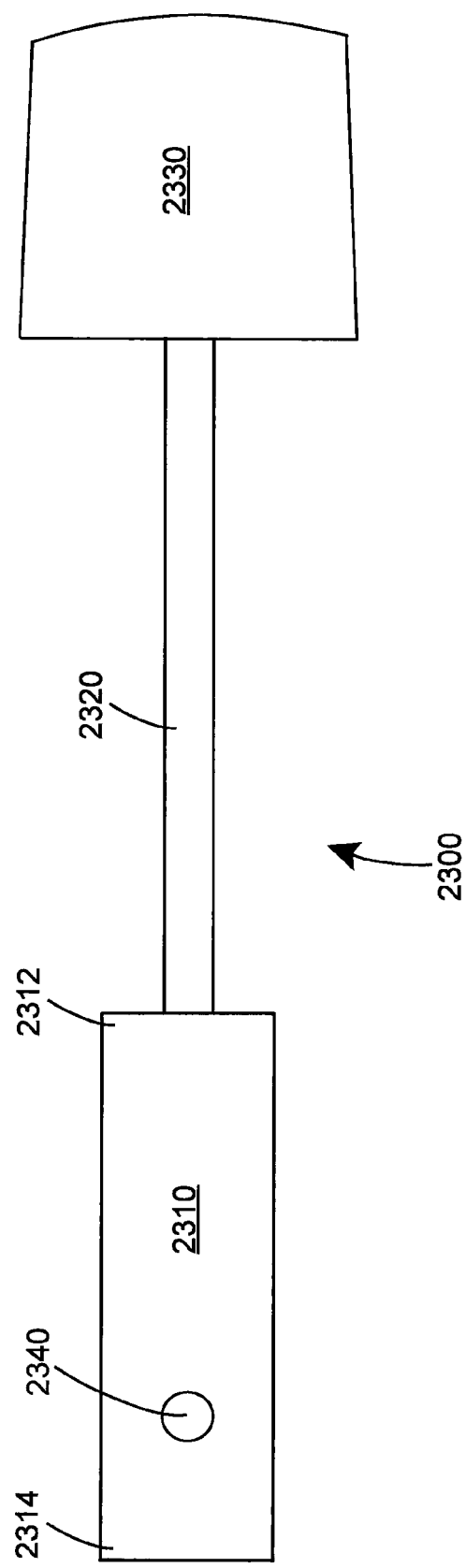
FIG. 23B shows the shovel tool of FIG. 23A.

In the illustrated embodiment of FIG. 23A, shovel tool 2300 is shown releaseably attached to device 1500. Referring now to FIGS. 23A and 23B, shovel tool 2300 comprises tubular body 2310 formed to include aperture 2340 (FIG. 23B) extending therethrough. Extension member 2320 is attached to end 2312 of tubular body 2310 and extends outwardly therefrom. Shovel head 2330 is attached to the distal end of extension member 2320.

End 1502 of device 1500 can be inserted into end 2314 of tubular body 2310. Apertures 1530 (FIG. 15) and 2340 can then be aligned, and cross bolt 2350 (FIG. 23A) can be inserted through apertures 2340 and 1530 to secure tool 2300 to device 1500. Tool 2300 can be similarly used with any one of devices 1400 (FIGS. 14A, 14B), 1600 (FIGS. 16A, 16B), and/or 1700 (FIGS. 17A, 17B).

Figure 24A:
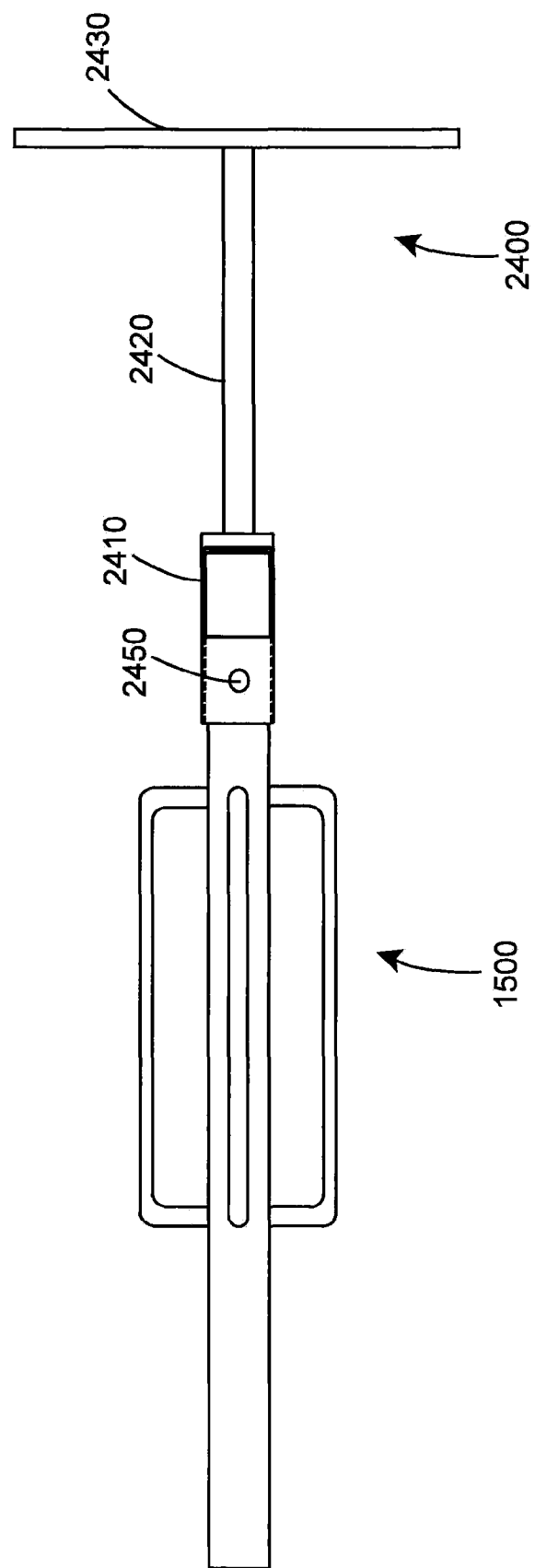
FIG. 24A shows the horizontal tubular member of FIG. 15 in combination with a rake tool.
Figure 24C:
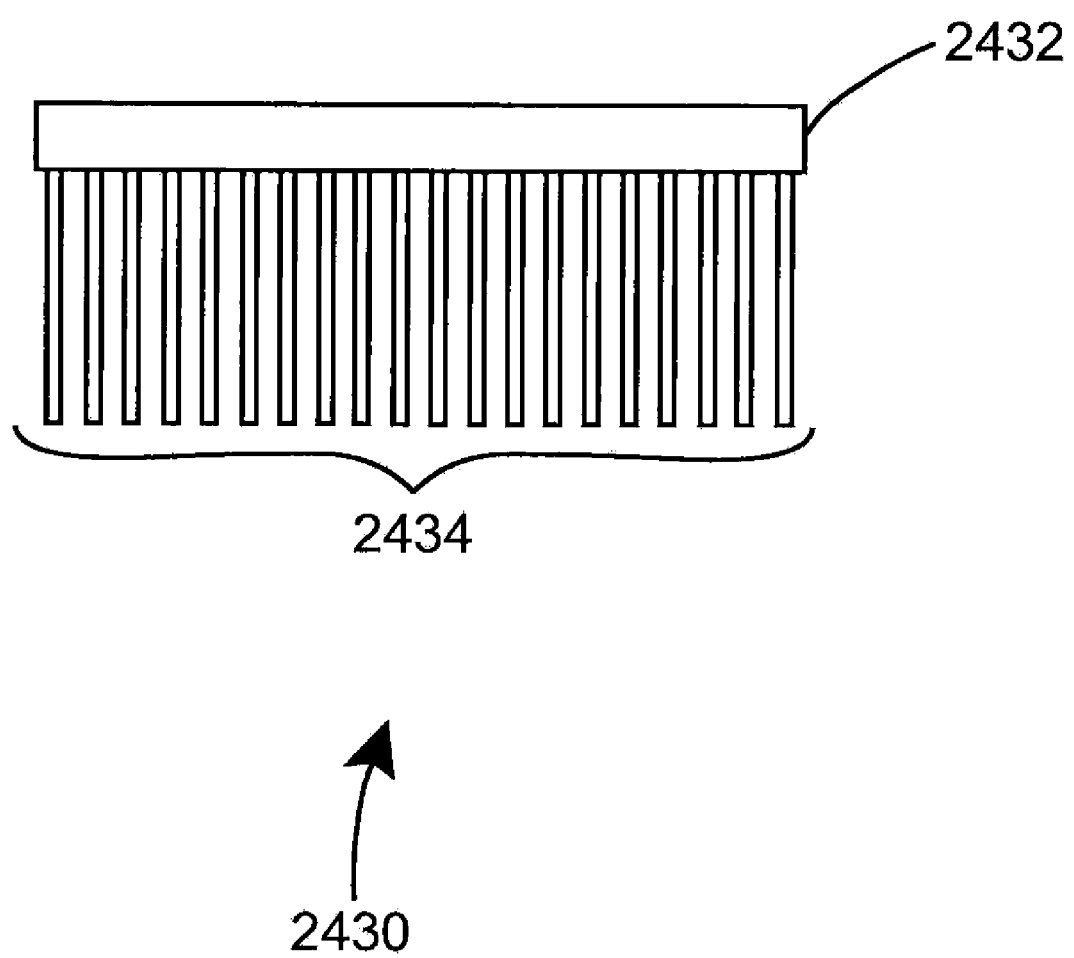
FIG. 24C shows an alternative view of the rake tool of FIG. 24A.

In the illustrated embodiment of FIG. 24A, rake tool 2400 is shown releaseably attached to device 1500. Referring now to FIGS. 24A, 24B, and 24C, rake tool 2400 comprises tubular body 2410 formed to include aperture 2440 (FIG. 24B) extending therethrough. Extension member 2420 is attached to end 2412 of tubular body 2410 and extends outwardly therefrom. Rake head 2430 is attached to the distal end of extension member 2420. Rake head 2430 comprises member 2432 and a plurality of rake teeth 2434 attached to member 2432 and extending outwardly therefrom.

End 1502 of device 1500 can be inserted into end 2414 of tubular body 2410. Apertures 1530 (FIG. 15) and 2440 can then be aligned, and cross bolt 2450 (FIG. 24A) can be inserted through apertures 2440 and 1530 to secure rake tool 2400 to device 1500. Rake tool 2400 can be similarly used with any one of devices 1400 (FIGS. 14A, 14B), 1600 (FIGS. 16A, 16B), and/or 1700 (FIGS. 17A, 17B).

Figure 35A:
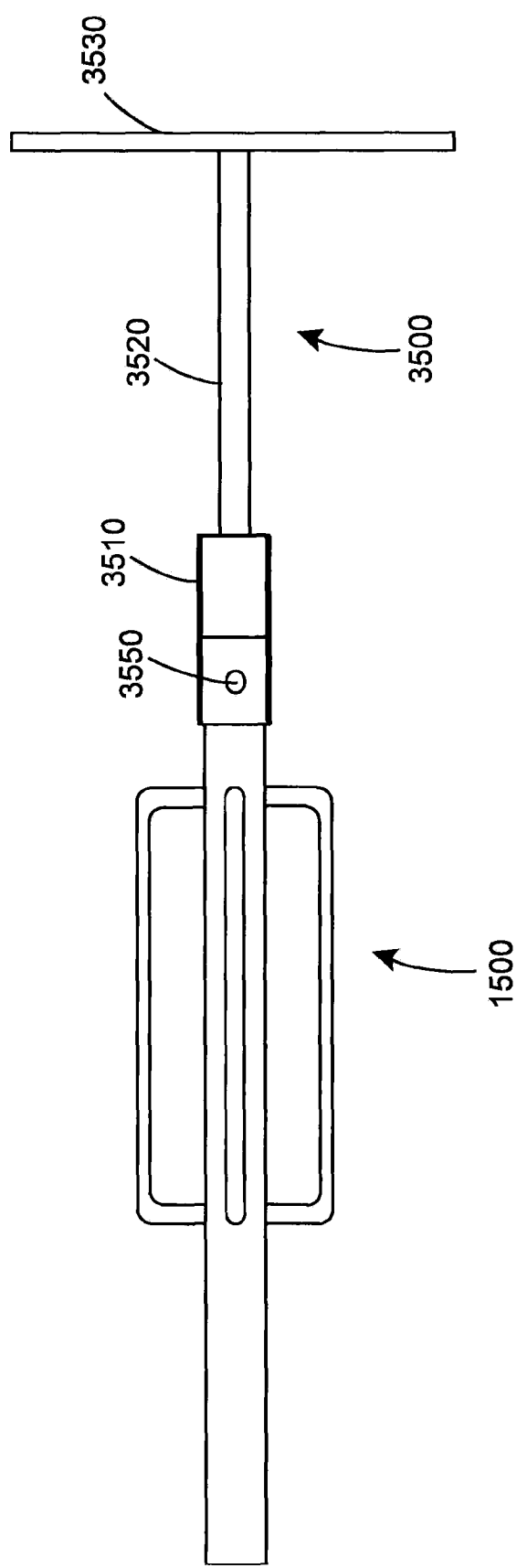
FIG. 35A shows the horizontal tubular member of FIG. 15 in combination with a hoe tool.

In the illustrated embodiment of FIG. 35A, hoe tool 3500 is shown releaseably attached to device 1500. Referring now to FIGS. 35A, 35B, and 35C, hoe tool 3500 comprises tubular body 3510 formed to include aperture 3540 (FIG. 35B) extending therethrough. Extension member 3520 is attached to end 3512 of tubular body 3510 and extends outwardly therefrom. Hoe head 3530 is attached to the distal end of extension member 3520. Hoe head 3530 comprises member 3532 and a blade 3534 attached to member 3532 and extending outwardly therefrom.

End 1502 of device 1500 can be inserted into end 3514 of tubular body 3510. Apertures 1530 (FIG. 15) and 3540 can then be aligned, and cross bolt 3550 (FIG. 35A) can be inserted through apertures 3540 and 1530 to secure hoe tool 3500 to device 1500. Hoe tool 3500 can be similarly used with any one of devices 1400 (FIGS. 14A, 14B), 1600 (FIGS. 16A, 16B), and/or 1700 (FIGS. 17A, 17B).

In certain embodiments, attachments can be used with portions of Applicant's portable table assembly by firefighters, police officers, and/or military personal in emergency situations. In the illustrated embodiment of FIG. 25A, shield 2500 is shown comprising shield attachment 2540 releaseably attached to table 140. Referring now to FIGS. 25A, 25B, 25C, 26A, and 26B, shield attachment 2540 comprises handle 2502 and forearm support 2504 attached to plate 2506. Plate 2506 is further releaseably attached to table 140 via extension 2508, having threaded portion 2512 and ballistic top 2510, wherein threaded portion 2512 can engage the threaded aperture of attachment plate 260. Thus, when table 140 is disengaged from Applicant's portable table assembly, it can be used along with Applicant's shield attachment 2540 to protect individuals in an emergency situation.

Figure 25A:
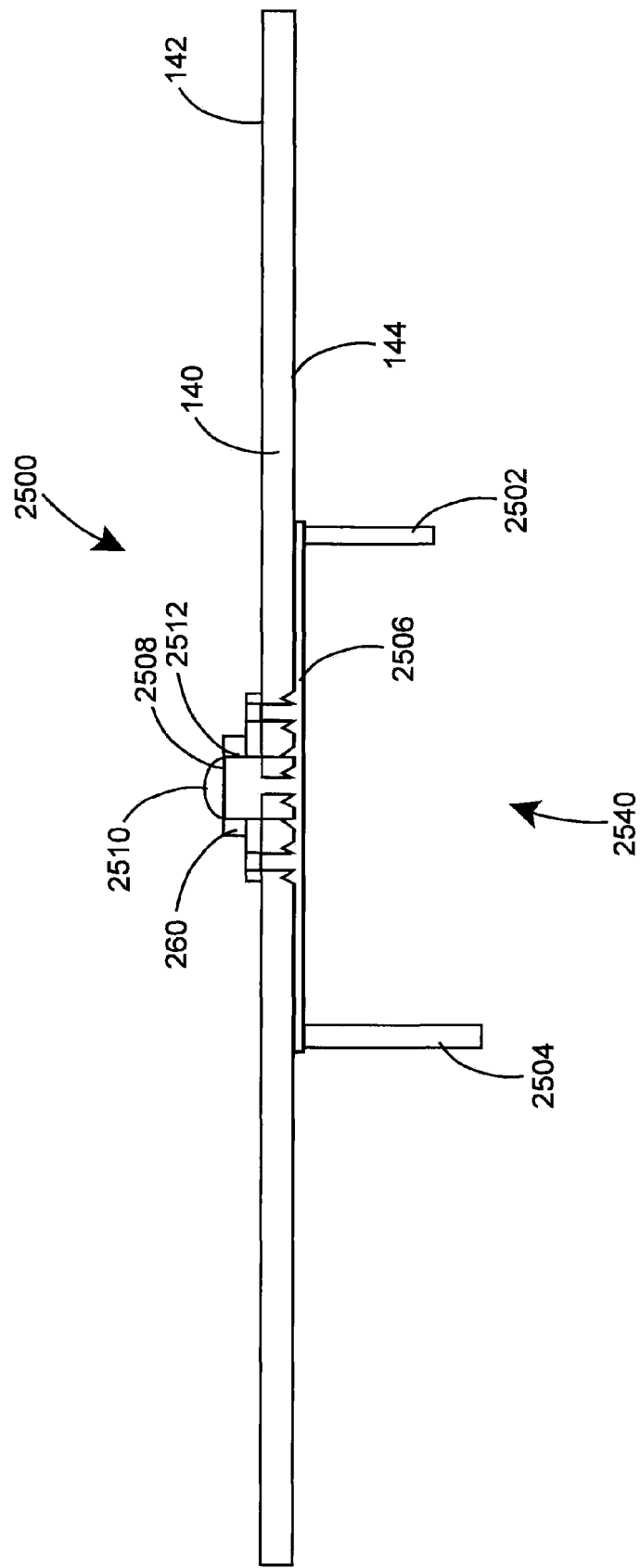
FIG. 25A shows the table of FIG. 1 in combination with a shield attachment.
Figure 25B:
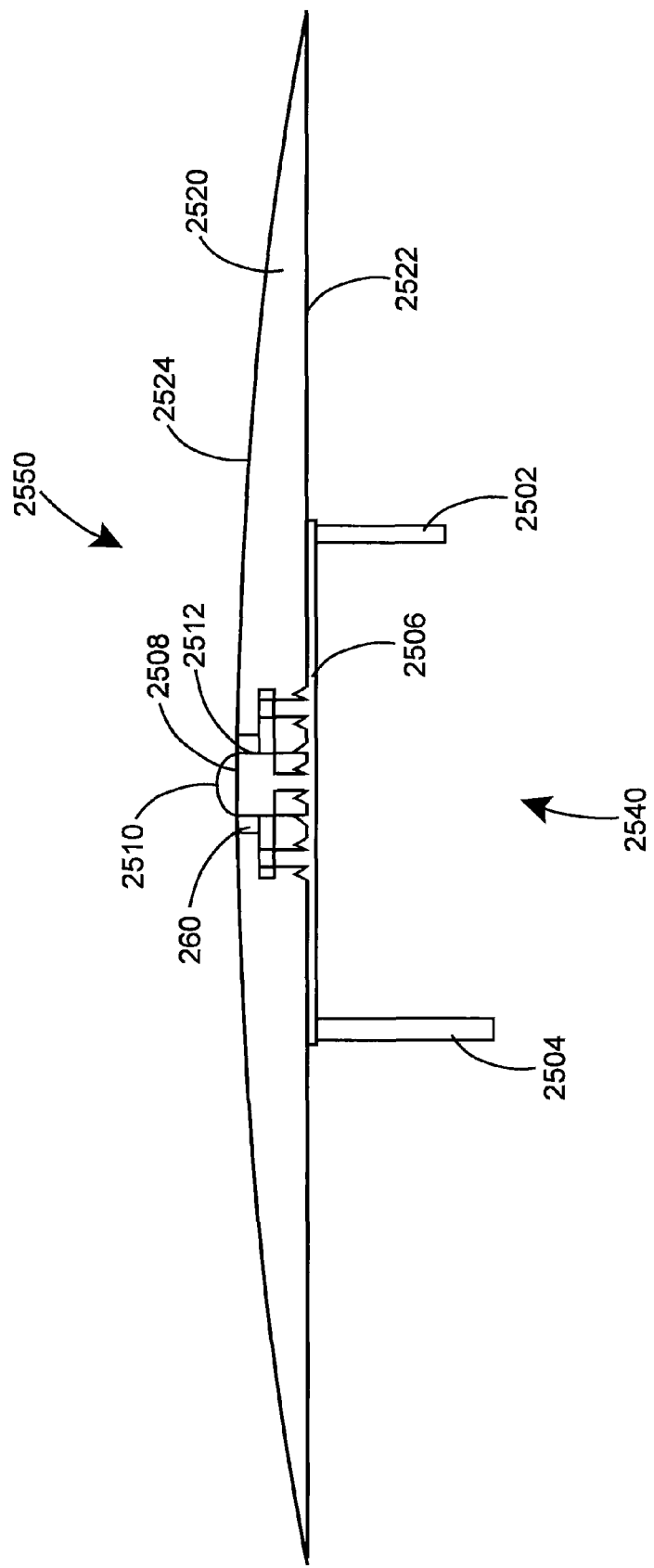
FIG. 25B shows an alternative embodiment of the table of FIG. 1 in combination with a shield attachment where one side of the table is curved.
Figure 25C:
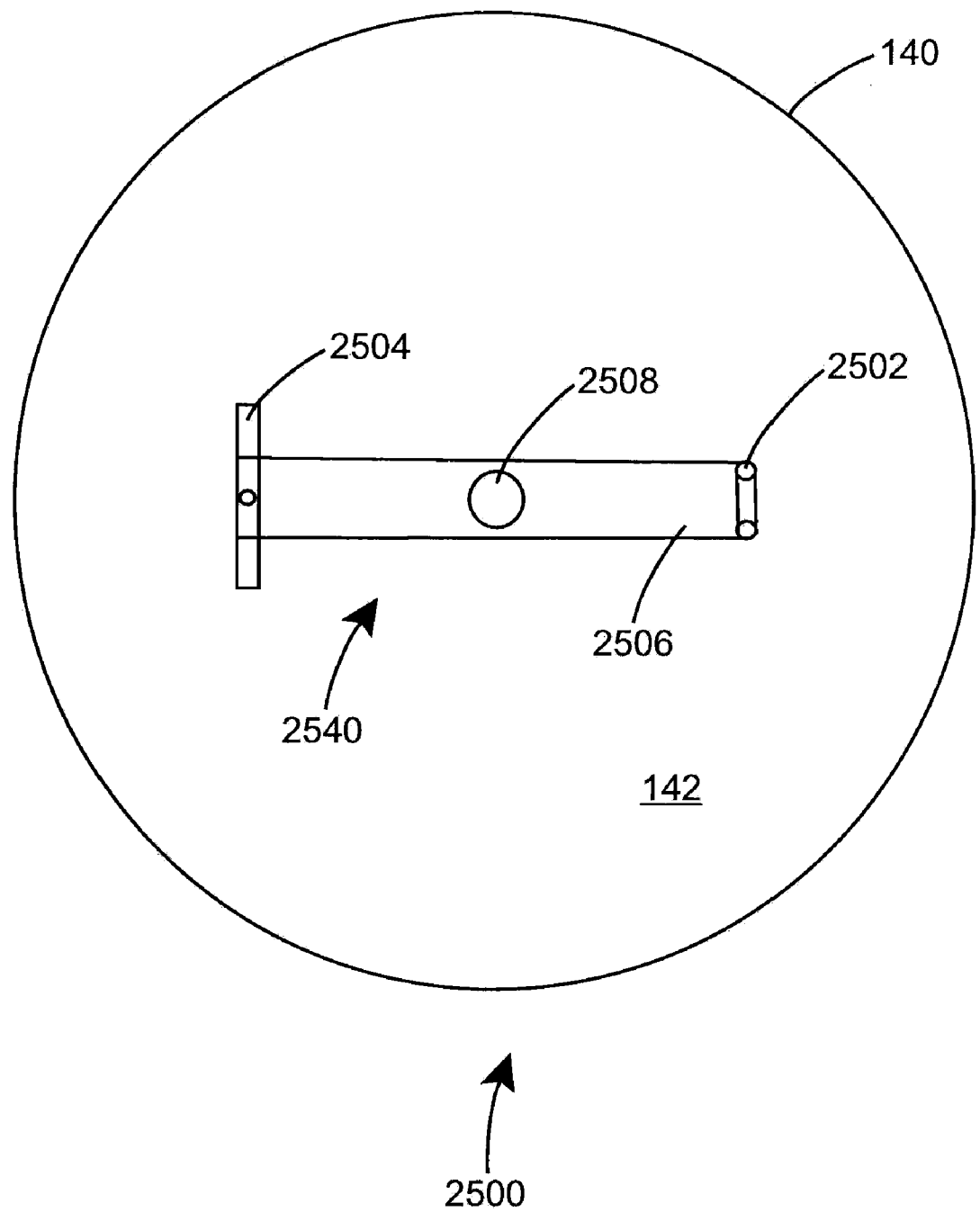
FIG. 25C shows an alternative view of the table of FIG. 1 in combination with a shield attachment.

In the illustrated embodiment of FIG. 25A, shield attachment 2540 is shown attached to top surface 144 of table 140, wherein the threaded portion 2512 of extension 2508 extends through the threaded aperture of attachment plate 260. In other embodiments, attachment plate 260 is on the bottom surface 142 of table 140. In such embodiments, shield attachment 2540 attaches to the bottom surface 142 of table 140.

As will be apparent to one of ordinary skill in the art, shield 2500 is ambidextrous and can be used by a right-handed or left-handed person by either rotating shield attachment 2540 or shield 2500 by 180 degrees.

In certain embodiments, Applicant's shield is designed to deflect impact forces. As can be seen in the illustrated implementation of FIG. 25B, in such embodiments shield 2550 comprises shield attachment 2540 attached to table 2520. Shield attachment 2540 is attached to table 2520, wherein table 2520 comprises curved surface 2524 and flat surface 2522. In such embodiments, shield attachment 2540 is attached to flat surface 2522, wherein the threaded portion 2512 of extension 2508 extends through the threaded aperture of attachment plate 260. In such an embodiment, attachment plate 260 sits flush with curved surface 2524.

Figure 26B:
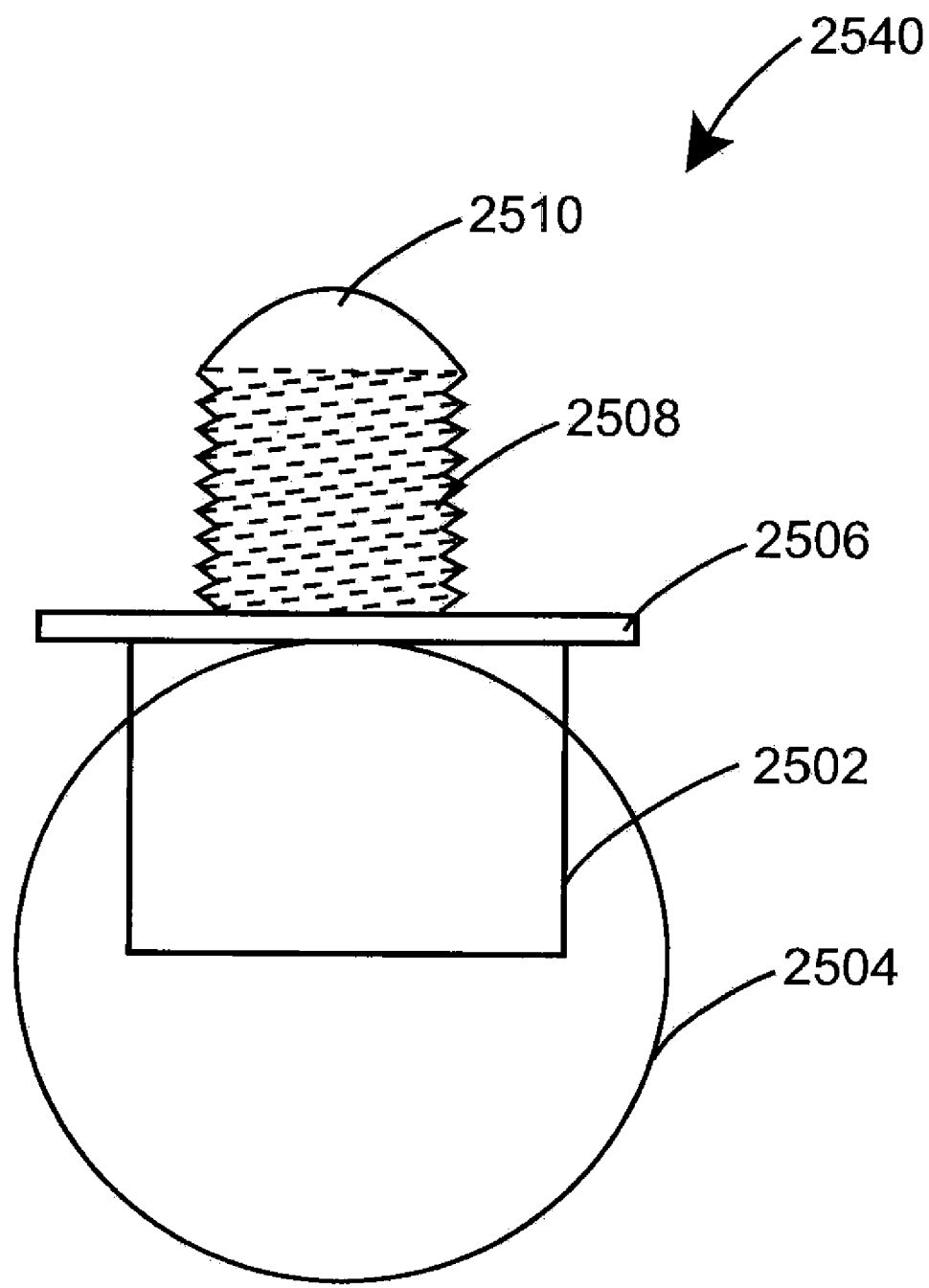
FIG. 26B shows an alternative view of the shield attachment of FIG. 25B.

As can be seen in FIG. 26B, forearm support 2504 is depicted as a strap which a user inserts their forearm through. In certain embodiments, forearm support 2504 is a rigid loop. In other embodiments, forearm support 2504 is an adjustable and can be fitted to the user's forearm. In yet other embodiments, forearm support 2504 is a grip which rests on the user's forearm and supports shield 2500 and/or shield 2550.

In certain embodiments, shield 2500 and/or shield 2550 is circular. In other embodiments, shield 2500 and/or shield 2550 is rectangular. In other embodiments, shield 2500 and/or shield 2550 is any other shape.

In certain embodiments, shield 2500 and/or shield 2550 comprise any material approved for ballistic shields. In certain embodiments, shield 2500 and/or shield 2550 comprise a light weight composite such as Dyneema® SB21, SB31, HB2, HB25, HB26, HB50, BT10, and/or HB80 by DSM Dyneema, Spectra Shield® by Honeywell International, Inc., Kevlar® by DuPont, or a combination thereof In certain embodiments, shield 2500 and/or shield 2550 includes a clear viewing window. In such embodiments, the viewing window comprises a clear ballistic material.

Figure 27A:
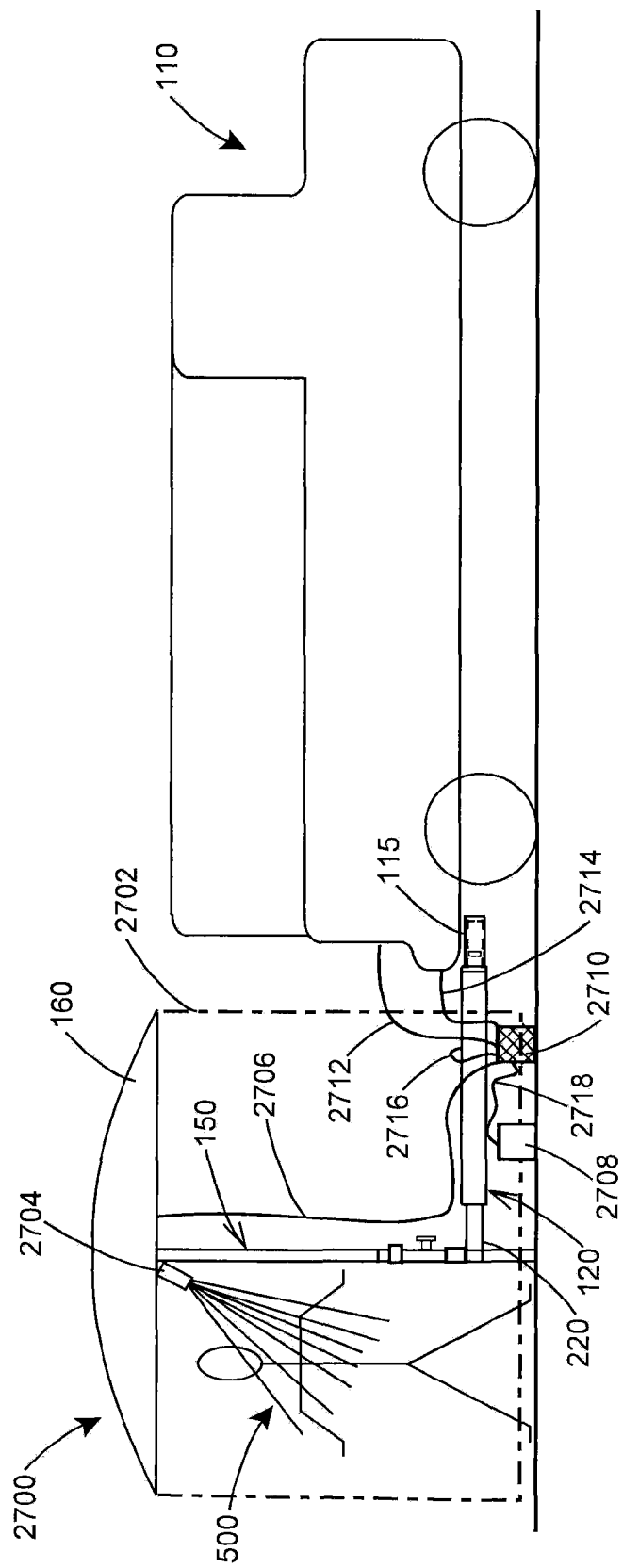
FIG. 27A shows the umbrella assembly of FIG. 1 in combination with a shower assembly.

In certain embodiments, portions of Applicant's portable table assembly can also be used by firefighters, police officers, and/or military personal as a shower in emergency situations. Turning to FIG. 27A, shower assembly 2700 is shown comprising umbrella assembly 160, curtain 2702 attached to umbrella assembly 160, and nozzle 2704 connected to water conduit 2706. Water conduit 2706 connects to electric pump 2710. In certain embodiments, electric pump 2710 is further connected via power conduit 2712, 2714, or 2716 to a power supply. More specifically, in certain embodiments, electric pump 2710 may be connected via power conduit 2716 to power cable 440 (FIGS. 4B and 5). Alternatively, in other embodiments electric pump 2710 may be connected via power conduits 2712 or 2714 to an interior vehicle outlet (not shown) or an extension power supply. Electric pump 2710 is further connected via water conduit 2718 to fluid supply 2708.

As described in relation to FIG. 3A above, in the illustrated embodiment of FIG. 27A, member 220 can be rotated in the Y/Z plane to adjust the orientation of umbrella assembly 160 and/or nozzle 2704 connected to shaft 150 with respect to vehicle 320. In certain embodiments, nozzle 2704 is further independently rotatable such that the orientation of nozzle 2704 can be adjusted with respect to shaft 150.

In certain embodiments, nozzle 2704 is further attached to an adjustable hand-held wand such that the spray from nozzle 2704 can be easily directed by user 500 over specific areas.

Figure 27B:
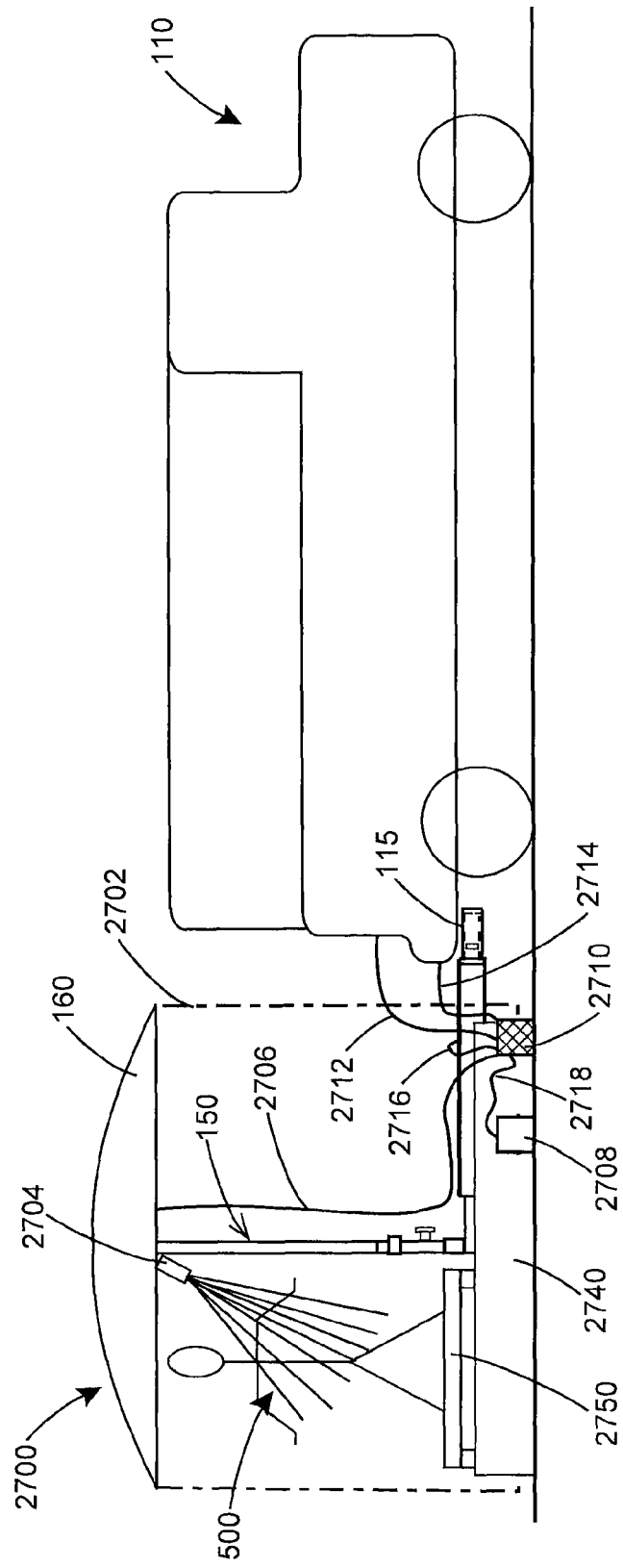
FIG. 27B shows the shower assembly of FIG. 27A in combination with a catch basin.

In certain embodiments, Applicant's shower assembly 2700 emits water via nozzle 2704 to a user 500 standing thereunder. In such embodiments, fluid supply 2708 is a water supply. In other embodiments, Applicant's shower assembly 2700 emits a chemical decontaminant. In such embodiments, fluid supply 2708 supplies a chemical decontamination solution. In such embodiments, Applicant's shower assembly 2700 may further comprise a catch basin, such as catch basin 2740 illustrated in FIG. 27B, to capture the chemical decontaminant, and any hazardous materials, for proper disposal. In such embodiments, Applicant's shower assembly 2700 may further comprise a deck, such as deck 2750. When standing on deck 2750, user 500 is above any hazardous materials being washed off user 500 and into the catch basin.

In certain embodiments, curtain 2702 is polyvinyl chloride. In other embodiments, curtail 2702 is any other material suitable for a shower curtain.

Figure 28:
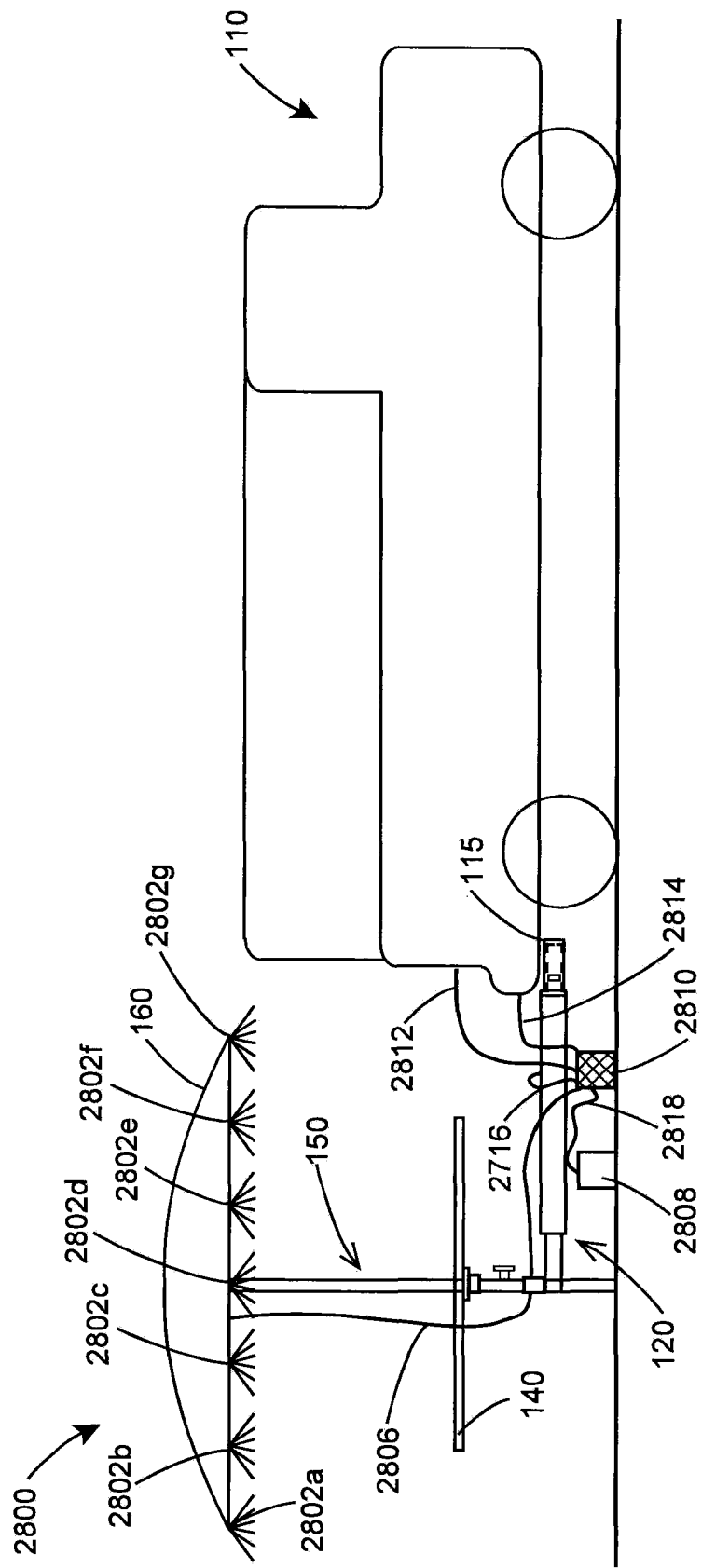
FIG. 28 shows the umbrella assembly of FIG. 1 in combination with a mister system.

In the illustrated embodiment of FIG. 28, mister assembly 2800 is shown attached to umbrella assembly 160. Mister assembly 2800 comprises misters 2802(*a*)-(*g*), electric pump 2810 and supply 2808, wherein misters 2802(*a*)-(*g*) are connected to electric pump 2810 via water conduit 2806. Electric pump 2810 is further connected to fluid supply 2808 via water conduit 2818. In certain embodiments, electric pump 2810 is further connected via power conduits 2812, 2814, or 2816 to a power supply. More specifically, in certain embodiments, electric pump 2810 may be connected via power conduit 2816 to power cable 440 (FIGS. 4B and 5). Alternatively, in other embodiments electric pump 2810 may be connected via power conduits 2812 or 2814 to an interior vehicle outlet (not shown) or an extension power supply.

In certain embodiments, Applicant's mister assembly 2800 emits water via misters 2802(*a*)-(*g*). In such embodiments, fluid supply 2808 is a water supply. In other embodiments, Applicant's mister assembly 2800 emits a chemical decontaminant. In such embodiments, fluid supply 2808 supplies a chemical decontamination solution.

Figure 29:
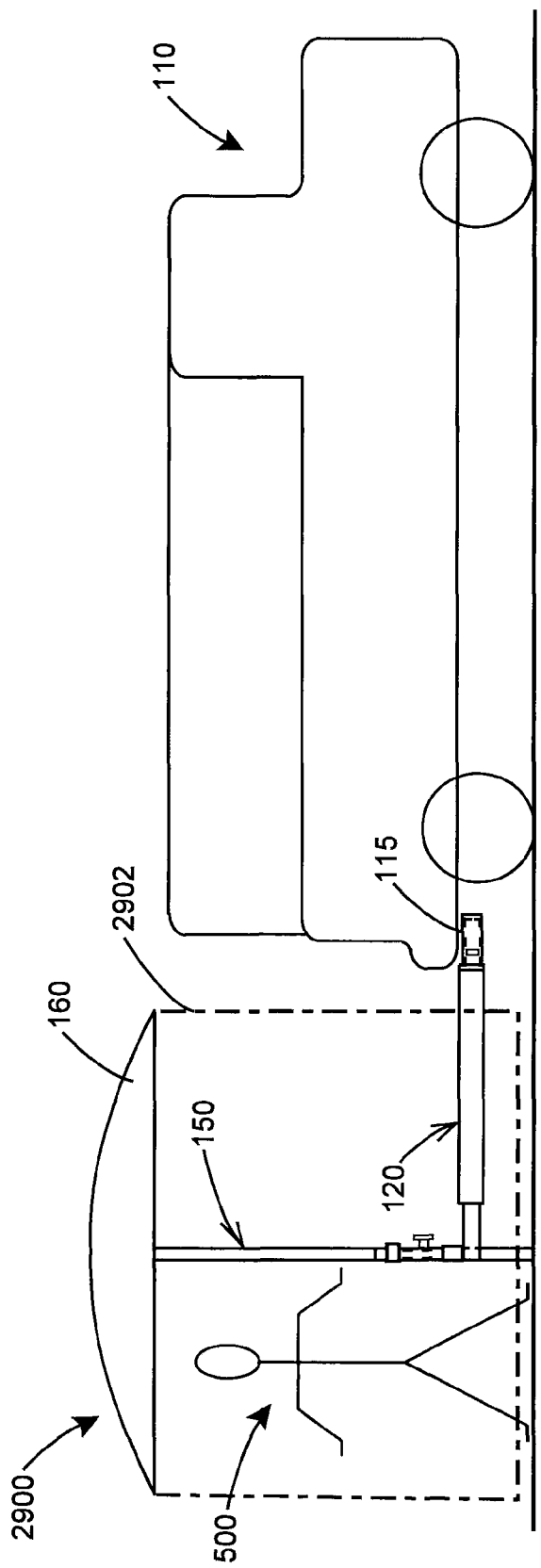
FIG. 29 shows the umbrella assembly of FIG. 1 in combination with a privacy assembly.

In the illustrated embodiment of FIG. 29, privacy assembly 2900 is shown attached to umbrella assembly 160. Privacy assembly 2900 comprises curtain 2902 attached to umbrella assembly 160 such that user 500 cannot be seen from the outside. In certain embodiments, curtain 2902 is polyvinyl chloride. In other embodiments, curtain 2902 is cloth. In other embodiments, curtain 2902 is any other material which can block user 500 from view of individuals outside of privacy assembly 2900.

As describe in relation to FIG. 3A above, in the illustrated embodiment of FIG. 28, member 220 can be rotated in the Y/Z plane to adjust the orientation of umbrella assembly 160, having either mister assembly 2800 (FIG. 28) or privacy assembly 2900 (FIG. 29) attached thereto, with respect to vehicle 320.

Figure 30:
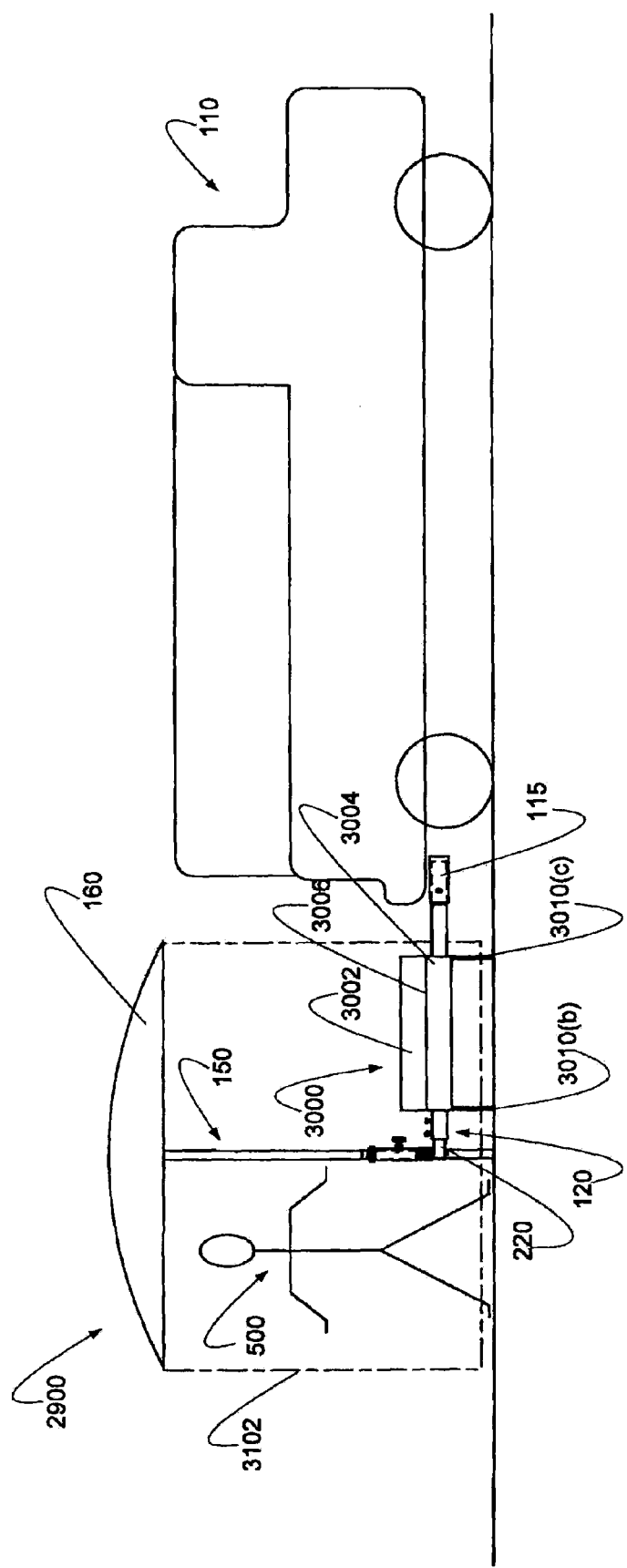
FIG. 30 shows the umbrella assembly of FIG. 1 in combination with a sleeping assembly.
Figure 31:
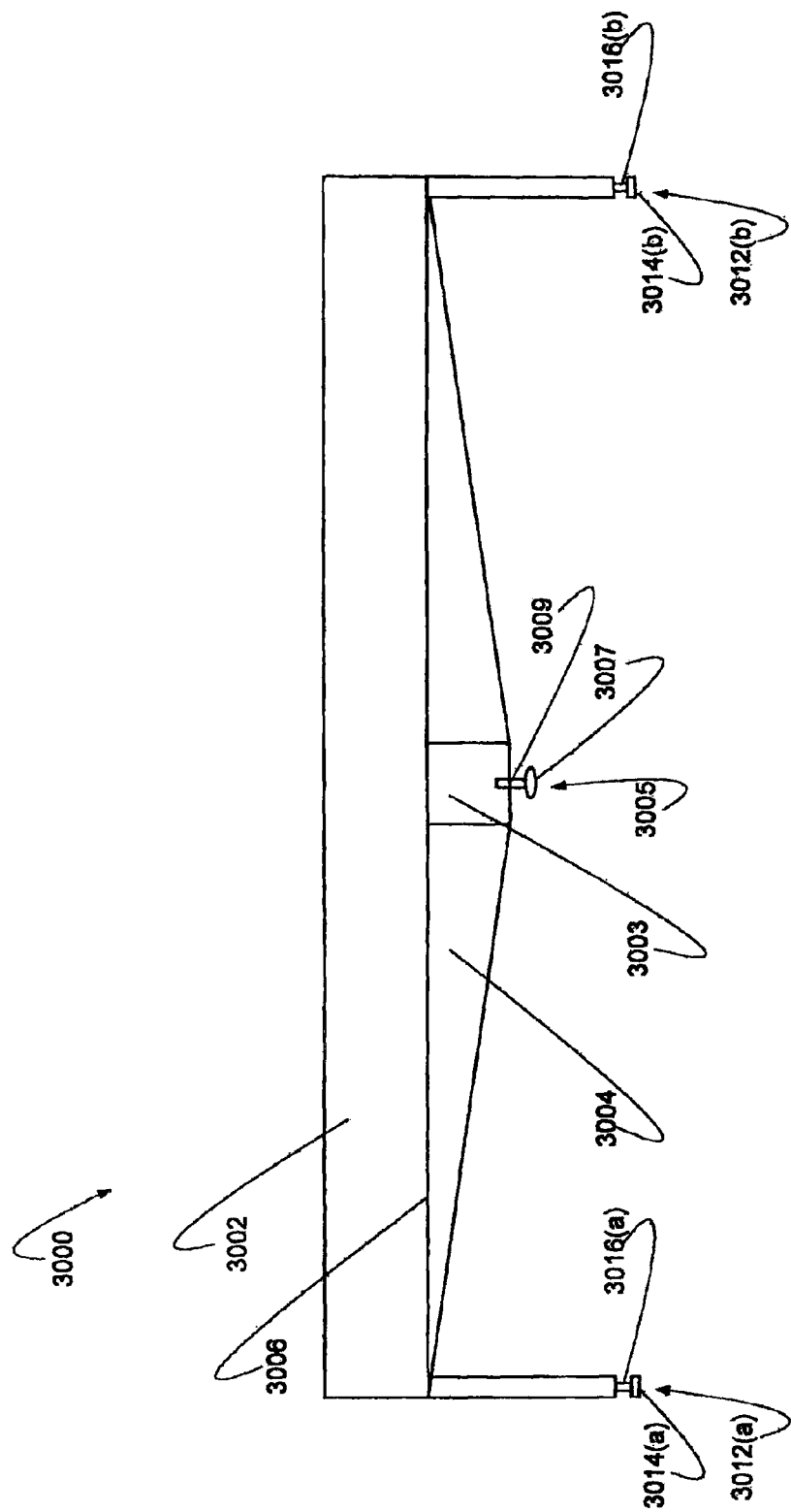
FIG. 31 shows the sleeping assembly of FIG. 30.
Figure 32:
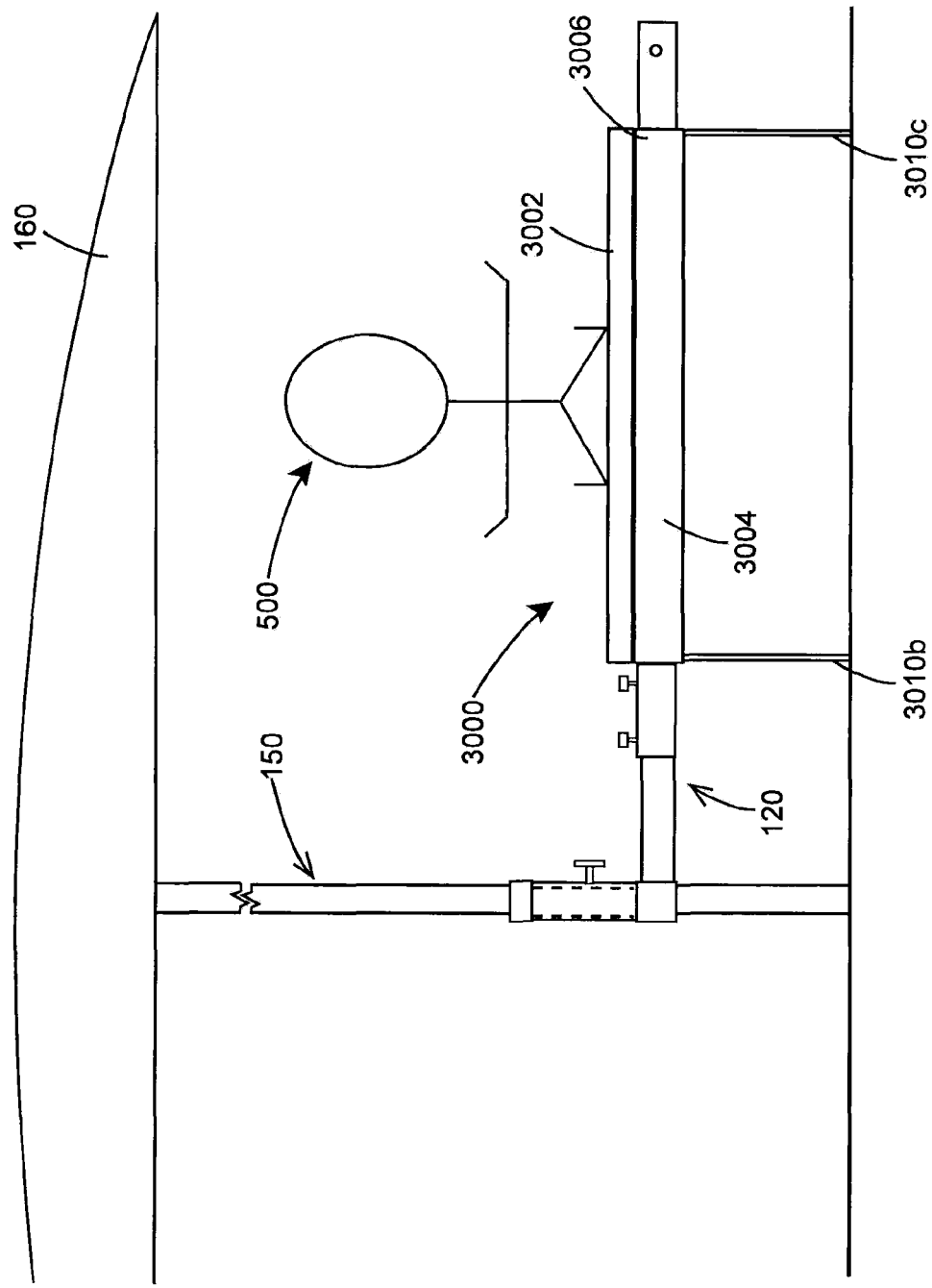
FIG. 32 shows an alternative view of the sleeping assembly of FIG. 30.
Figure 33:
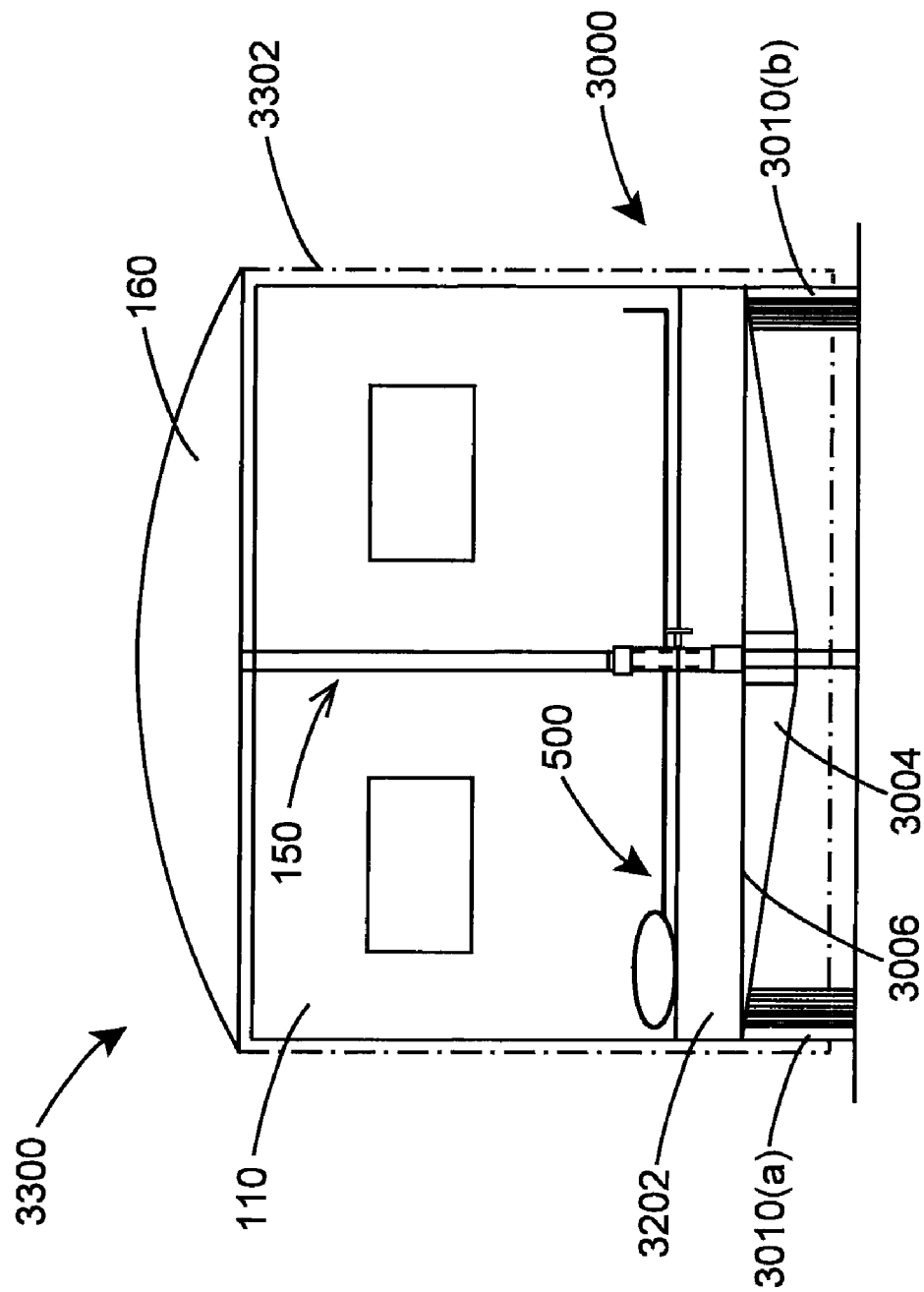
FIG. 33 shows the sleeping assembly of FIG. 30 in combination with a vehicle.
Figure 34A:
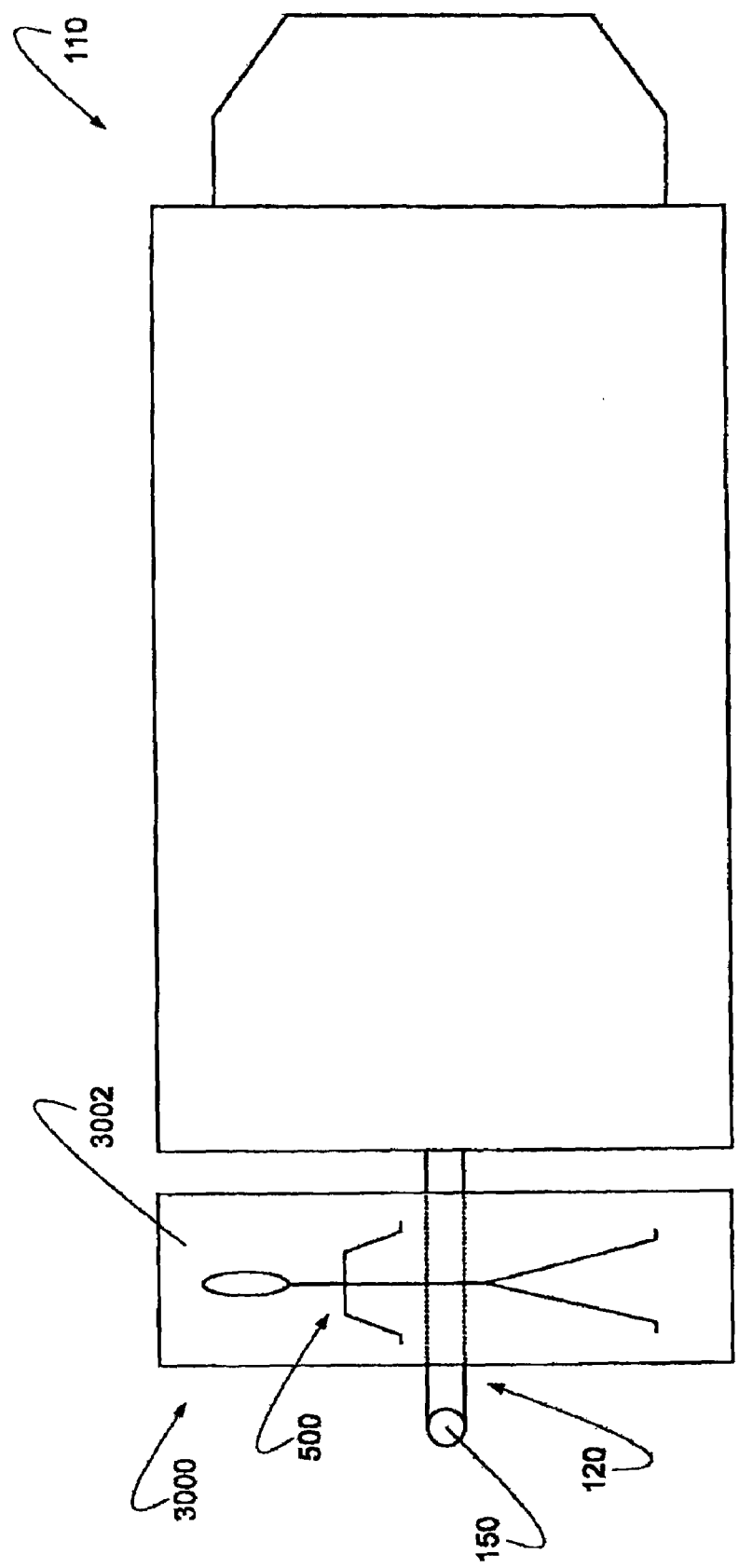
FIG. 34A shows an alternative view of the sleeping assembly of FIG. 30 in combination with a vehicle.
Figure 34B:
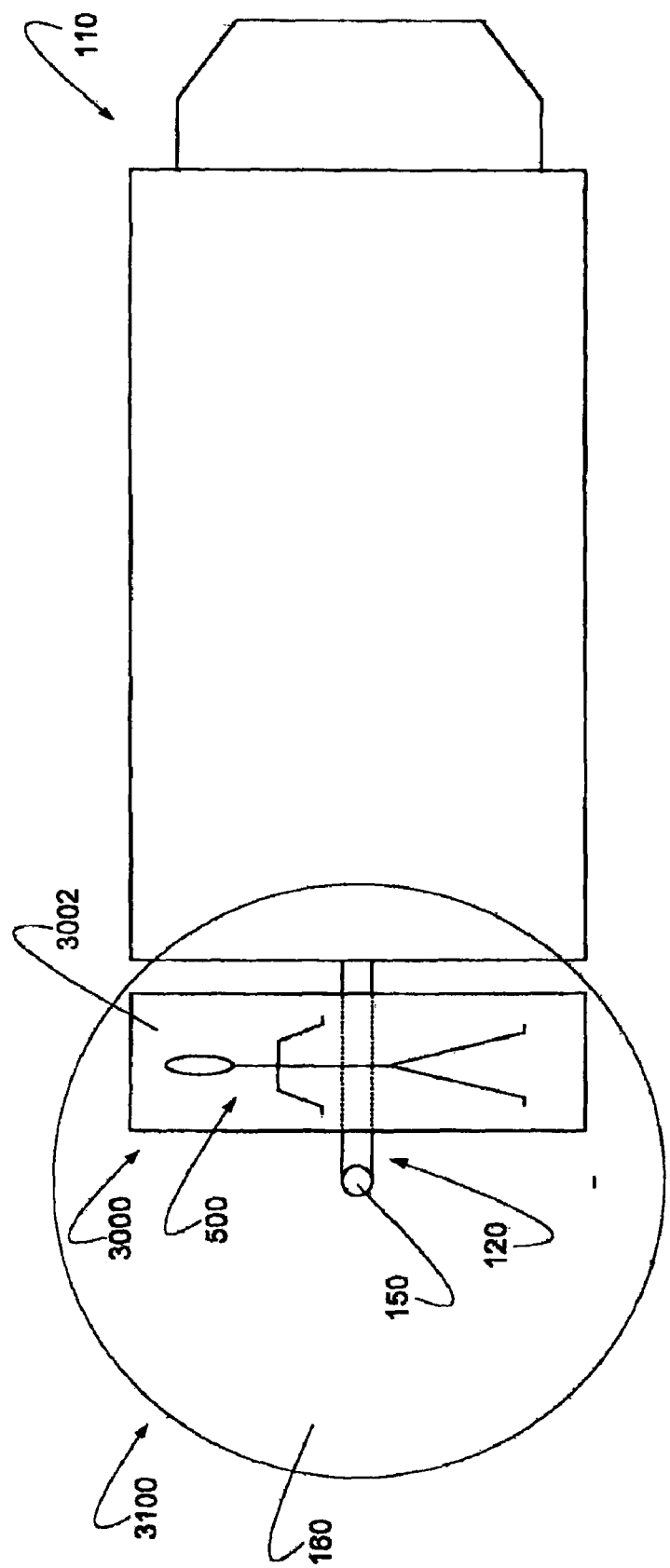
FIG. 34B shows an alternative view of the sleeping assembly of FIG. 30 in combination with a vehicle

In the illustrated embodiment of FIG. 30, bed assembly 3000 is shown with privacy assembly 2900 attached to umbrella assembly 160. In certain embodiments, bed assembly 3000 may be used as a portable bed. In certain embodiments, bed assembly 3000 may be used for an injured or ill individual. In other embodiments, bed assembly 3000 may be used as an operating table.

Referring now to FIGS. 30, 31, 32, 33, 34A, and 34B, bed assembly 3000 comprises frame 3004 securely attached to assembly 120. More specifically, in certain embodiments frame 3004 comprises horizontal platform 3006 formed to include aperture 3003. The orientation of frame 3004 can be adjusted in a first plane orthogonal to assembly 120, i.e. the Y/Z plane, by rotating frame 3004. and then fixturing frame 3004 to tubular member 210.

In certain embodiments, frame 3004 further comprises fixturing means 3005, comprising a T-shaped apparatus comprising a handle 3007 and a threaded shaft 3009. In these embodiments, frame 3004 is further formed to include a threaded aperture into which threaded shaft 3009 can be threadedly engaged. In order to fixture tubular member 210 within frame 3004, handle 3007 is rotated in a first direction such that shaft 3009 is moved inwardly into aperture 3003 until the distal end of shaft 3009 contacts tubular member 210 and forces tubular member 220 against the interior of aperture 3003 thereby fixturing frame 3004 in place. In order to release frame 3004 from tubular member 220, handle 3007 is rotated in a second direction such that shaft 3009 is moved outwardly such that the distal end of shaft 3009 is no longer forced against the interior of aperture 3003 thereby releasing frame 3004.

In certain embodiments, tubular member 220 comprises a round cross-section. In these embodiments, aperture 3003 also comprises a round cross-section. In other embodiments, tubular member 220 comprises a square cross-section. In these embodiments, aperture 3003 also comprises a square cross-section. In yet other embodiments, tubular member 220 comprises a hexagonal cross-section. In these embodiments, aperture 3003 also comprises a hexagonal cross-section. In still other embodiments, tubular member 220 comprises a octagonal cross-section. In these embodiments, aperture 3003 also comprises a octagonal cross-section.

Frame 3004 further comprises horizontal platform 3006 and legs 3010(*a*)-(*d*) (leg 3010(*d*) not shown) capable of supporting an individual in a prone position. In certain embodiments legs 3010(*a*)-(*d*) are adjustable such that horizontal platform 3006 can be made gravitationally level even when the ground is uneven. In certain embodiments, legs 3010(*a*)-(*d*) each further comprise a adjustable member 3012(*a*)-(*d*) (adjustable members 3012(*c*) and (*d*) not shown), respectively, comprising feet 3014(*a*)-(*d*) (feet 3014(*c*) and (*d*) not shown) and threaded shaft 3016(*a*)-(*d*) (threaded shaft 3016(*c*) and (*d*) not shown), respectively. In these embodiments, legs 3010 are further formed to include a threaded aperture into which threaded shafts 3016(*a*)-(*d*) can be threadedly engaged. In such embodiments, the length of legs 3010(*a*)-(*d*) can therefore be independently adjusted by rotating adjustable members 3012(*a*)-(*d*) such that threaded shafts 3016(*a*)-(*d*) are moved inwardly or outwardly of legs 3010(*a*)-(*d*) until horizontal platform 3006 is gravitationally level.

In certain embodiments, horizontal platform 3006 comprises a flexible material such as, and without limitation, polyester or nylon. In other embodiments, horizontal platform 3006 comprises a hard, rigid material such as, and without limitation, wood or hard plastic. In such embodiments, horizontal platform 3006 may be detachable such that a patient lying on horizontal platform 3006 can be transported without the need to move the patient.

In certain embodiments, bed assembly 3000 further comprises mattress 3002, wherein mattress 3002 is supported by horizontal platform 3006. In certain embodiments, mattress 3002 is a foam cushion.

In certain embodiments, bed assembly 3000 is foldable for easy transport. In other embodiments, bed assembly 3000 can be disassembled for transport.

While the preferred embodiments of the present invention have been illustrated in detail, it should be apparent that modifications and adaptations to those embodiments may occur to one skilled in the art without departing from the scope of the present invention as set forth in the following claims.

I claim:

1. An adjustable portable table assembly, comprising:
   a horizontal assembly comprising:
      a first tubular member;
      a second member having a first end and a second end, wherein part of the second member is slidingly and rotatably disposed within the first tubular member; and
      a first fixturing means capable of releaseably attaching the second member to the first tubular member;
      wherein an overall length of the horizontal assembly can be adjusted by increasing or decreasing a length of the second member inserted into the first tubular member;
   a tubular vertical assembly having a diameter, wherein the tubular vertical assembly comprises a first open end and a second open end, wherein the second end of the second member is attached to the vertical assembly adjacent to the first open end;
   a table comprising a top surface and a bottom surface, wherein the table is formed to include an aperture having the diameter extending therethrough, wherein the table can be releaseably attached to the vertical assembly at the second open end such that the aperture is aligned with the second open end; and
   a shield assembly comprising a handle, wherein the shield assembly can be releaseably attached to the table;
   wherein:
      rotating the second member within the first tubular member also causes rotation of the vertical assembly with respect to the horizontal assembly; and
      the top surface of the table can be placed in a gravitationally level orientation by rotating the second member within the first tubular member until objects placed on the top surface of the table will not slide or roll off the table.

2. The portable table assembly of claim 1, wherein the bottom surface of the table is curved, wherein the shield assembly is releaseably attached to the top surface of the table.

3. The portable table assembly of claim 1, wherein the shield assembly further comprises a threaded shaft having the diameter, wherein when the table is not attached to the vertical assembly, the shield assembly is releaseably attached to the table such that the threaded shaft is mated with the aperture.

4. An adjustable portable table assembly, comprising:
   a horizontal assembly comprising:
      a first tubular member;
      a second member having a first end and a second end, wherein part of the second member is slidingly and rotatably disposed within the first tubular member; and
      a first fixturing means capable of releaseably attaching the second member to the first tubular member;
      wherein an overall length of the horizontal assembly can be adjusted by increasing or decreasing a length of the second member inserted into the first tubular member;
   a tubular vertical assembly having a diameter, wherein the tubular vertical assembly comprises a first open end and a second open end, wherein the second end of the second member is attached to the vertical assembly adjacent to the first open end;
   a table comprising a top surface and a center point, wherein the table is formed to include an aperture having the diameter extending through the center point, wherein the table can be releaseably attached to the vertical assembly at the second open end such that the aperture is aligned with the second open end; and
   a shower assembly comprising:
      a spray nozzle;
      a shaft comprising a first end and a second end, wherein the first end of the shaft is attached to the spray nozzle, and wherein the shaft extends through the aperture and through the vertical assembly; and
      a fluid source connected to the spray nozzle by a first water conduit, wherein the spray nozzle emits a fluid from the fluid source;
   wherein:
      rotating the second member within the first tubular member also causes rotation of the vertical assembly with respect to the horizontal assembly; and
      the top surface of the table can be placed in a gravitationally level orientation by rotating the second member within the first tubular member until objects placed on the top surface of the table will not slide or roll off the table.

5. The portable table assembly of claim 4, wherein the shower assembly further comprises an umbrella, wherein the umbrella is attached to the shaft.

6. The portable table assembly of claim 4, wherein the shower assembly further comprises an electric pump connected to the first water conduit and to the fluid source by a second water conduit.

7. The portable table assembly of claim 4, wherein the shower assembly further comprises a catch basin to catch the fluid emitted by the spray nozzle.

8. An adjustable portable table assembly, comprising:
a horizontal assembly comprising:
  a first tubular member;
  a second member having a first end and a second end, wherein part of the second member is slidingly and rotatably disposed within the first tubular member; and
  a first fixturing means capable of releaseably attaching the second member to the first tubular member;
  wherein an overall length of the horizontal assembly can be adjusted by increasing or decreasing a length of the second member inserted into the first tubular member;
a tubular vertical assembly having a diameter, wherein the tubular vertical assembly comprises a first open end and a second open end, wherein the second end of the second member is attached to the vertical assembly adjacent to the first open end;
a table comprising a top surface and a center point, wherein the table is formed to include an aperture having the diameter extending through the center point, wherein the table can be releaseably attached to the vertical assembly at the second open end such that the aperture is aligned with the second open end; and
a mister assembly comprising:
  an umbrella;
  a plurality of misters each connected to at least one other mister by a first water conduit, wherein the plurality of misters are attached to the umbrella;
  a shaft comprising a first end and a second end, wherein the first end of the shaft is attached to the umbrella, and wherein the shaft extends through the aperture and through the vertical assembly; and
  a fluid source connected to the plurality of misters by a second water conduit, wherein the misters emit a fluid from the fluid source;
wherein:
  rotating the second member within the first tubular member also causes rotation of the vertical assembly with respect to the horizontal assembly; and
  the top surface of the table can be placed in a gravitationally level orientation by rotating the second member within the first tubular member until objects placed on the top surface of the table will not slide or roll off the table.

9. An adjustable portable table assembly, comprising:
a horizontal assembly comprising:
  a first tubular member;
  a second member having a first end and a second end, wherein part of the second member is slidingly and rotatably disposed within the first tubular member; and
  a first fixturing means capable of releaseably attaching the second member to the first tubular member;
  wherein an overall length of the horizontal assembly can be adjusted by increasing or decreasing a length of the second member inserted into the first tubular member;
a tubular vertical assembly having a diameter, wherein the tubular vertical assembly comprises a first open end and a second open end, wherein the second end of the second member is attached to the vertical assembly adjacent to the first open end;
a table comprising a top surface and a center point, wherein the table is formed to include an aperture having the diameter extending through the center point, wherein the table can be releaseably attached to the vertical assembly at the second open end such that the aperture is aligned with the second open end; and
a privacy assembly comprising:
  an umbrella;
  a shaft comprising a first end and a second end, wherein the first end of the shaft is attached to the umbrella, and wherein the shaft extends through the aperture and through the vertical assembly; and
  a curtain attached to the umbrella;
wherein:
  rotating the second member within the first tubular member also causes rotation of the vertical assembly with respect to the horizontal assembly; and
  the top surface of the table can be placed in a gravitationally level orientation by rotating the second member within the first tubular member until objects placed on the top surface of the table will not slide or roll off the table.

10. An adjustable portable table assembly, comprising:
a horizontal assembly comprising:
  a first tubular member;
  a second member having a first end and a second end, wherein part of the second member is slidingly and rotatably disposed within the first tubular member; and
  a first fixturing means capable of releaseably attaching the second member to the first tubular member;
  wherein an overall length of the horizontal assembly can be adjusted by increasing or decreasing a length of the second member inserted into the first tubular member;
a tubular vertical assembly having a diameter, wherein the tubular vertical assembly comprises a first open end and a second open end, wherein the second end of the second member is attached to the vertical assembly adjacent to the first open end;
a table comprising a top surface and a center point, wherein the table is formed to include a first aperture having the diameter extending through the center point, wherein the table can be releaseably attached to the vertical assembly at the second open end such that the first aperture is aligned with the second open end; and
a bed assembly comprising:
a frame comprising a horizontal platform and a plurality of legs, wherein the horizontal platform is formed to include a second aperture, wherein part of the horizontal assembly is slidingly and rotatably disposed within the second aperture;
wherein:
  rotating the second member within the first tubular member also causes rotation of the vertical assembly with respect to the horizontal assembly; and
  the top surface of the table can be placed in a gravitationally level orientation by rotating the second member within the first tubular member until objects placed on the top surface of the table will not slide or roll off the table.

11. The portable table assembly of claim 10, wherein the bed assembly further comprises a plurality of adjustable members each disposed on one of the plurality of legs, wherein an overall length of each of the plurality of legs can be changed by adjusting the associated adjustable member.

12. The portable table assembly of claim 10, wherein the bed assembly further comprises a mattress disposed on the horizontal platform.

13. A portable table assembly which can be releaseably attached to a vehicle, comprising:

a horizontal tubular member comprising a first open end and a second open end, wherein said first open end is configured to be releaseably attached to a vehicle, wherein said horizontal tubular member is formed to include an aperture extending therethrough adjacent said first end;

a solid member comprising a first end and a second end, said first end of said solid member is configured to be slidingly inserted into said second open end of said horizontal tubular member, wherein said second end of said solid member extends outwardly from said second open end of said horizontal tubular member;

a vertical tubular member comprising a first open end and a second open end, wherein said second end of said solid member is releaseably attached to said vertical tubular member adjacent said first open end of said vertical tubular member;

a table formed to include an aperture releaseably attached to said vertical tubular member at said second open end;

wherein said horizontal tubular member further comprises a first U-shaped handle and a second U-shaped handle.

14. The portable table assembly of claim 13, wherein said horizontal tubular member further comprises a third handle.

15. The portable table assembly of claim 14, wherein said third handle comprises a circular shape.

16. The portable table assembly of claim 14, wherein said third handle comprises a U-shape.

17. The portable table assembly of claim 16, further comprises a fourth handle.

18. The portable table assembly of claim 17, wherein said fourth handle comprises a circular shape.

19. The portable table assembly of claim 13, further comprising:
a backup tool comprising a tubular body having an open end and a closed end, a planar member attached to said closed end;
wherein said first end of said horizontal tubular member can be inserted into, and attached to, said tubular body.

20. The portable table assembly of claim 13, further comprising:
a leverage tool comprising a tubular body having an open end and a closed end, a metal rod attached to said closed end of said tubular body and extending outwardly therefrom, and a triangular member attached to the distal end of said metal rod;
wherein said first end of said horizontal tubular member can be inserted into, and attached to, said tubular body.

21. The portable table assembly of claim 13, further comprising:
a jackhammer point tool comprising a tubular body having an open end and a closed end, an extension member attached to said closed end and extending outwardly therefrom, wherein the distal end of said extension member tapers to a point;
wherein said first end of said horizontal tubular member can be inserted into, and attached to, said tubular body.

22. The portable table assembly of claim 13, further comprising:
a chisel tool comprising a tubular body having an open end and a closed end, an extension member attached to said closed end and extending outwardly therefrom, wherein the distal end of said extension member comprises a chisel;
wherein said first end of said horizontal tubular member can be inserted into, and attached to, said tubular body.

23. The portable table assembly of claim 13, further comprising:
a shovel tool comprising a tubular body having an open end and a closed end, an extension member attached to said closed end and extending outwardly therefrom, and a shovel head attached to the distal end of said extension member;
wherein said first end of said horizontal tubular member can be inserted into, and attached to, said tubular body.

24. The portable table assembly of claim 13, further comprising:
a rake tool comprising a tubular body having an open end and a closed end, an extension member attached to said closed end and extending outwardly therefrom, and a rake head attached to the distal end of said extension member;
wherein said first end of said horizontal tubular member can be inserted into, and attached to, said tubular body.

25. The portable table assembly of claim 13, further comprising:
a hoe tool comprising a tubular body having an open end and a closed end, an extension member attached to said closed end and extending outwardly therefrom, and a hoe head attached to the distal end of said extension member;
wherein said first end of said horizontal tubular member can be inserted into, and attached to, said tubular body.

26. The portable table assembly of claim 13, further comprising:
a hammer tool comprising a tubular body having an open end and a closed end, wherein the closed end is weighted;
wherein said first end of said horizontal tubular member can be inserted into, and attached to, said tubular body.

* * * * *